US012240134B2

(12) United States Patent
Schneider et al.

(10) Patent No.: US 12,240,134 B2
(45) Date of Patent: Mar. 4, 2025

(54) ELECTRIC GROOMING DEVICE

(71) Applicant: Spectrum Brands, Inc., Middleton, WI (US)

(72) Inventors: Paul Anthony Schneider, Middleton, WI (US); Richard Kirk Maguire, Middleton, WI (US); Timin Musallam, Middleton, WI (US); Grant Oberhauser, Torrance, CA (US); Benjamin Miles Cleppe, Verona, WI (US)

(73) Assignee: SPECTRUM BRANDS, INC., Middleton, WI (US)

( * ) Notice: Subject to any disclaimer, the term of this patent is extended or adjusted under 35 U.S.C. 154(b) by 472 days.

(21) Appl. No.: 17/624,305

(22) PCT Filed: Jul. 1, 2020

(86) PCT No.: PCT/US2020/040422

§ 371 (c)(1),
(2) Date: Dec. 31, 2021

(87) PCT Pub. No.: WO2021/003218

PCT Pub. Date: Jan. 7, 2021

(65) Prior Publication Data

US 2022/0355497 A1 Nov. 10, 2022

Related U.S. Application Data

(60) Provisional application No. 62/869,417, filed on Jul. 1, 2019.

(51) Int. Cl.
*B26B 19/38* (2006.01)
*B26B 19/10* (2006.01)
(Continued)

(52) U.S. Cl.
CPC ............ *B26B 19/388* (2013.01); *B26B 19/28* (2013.01); *B26B 19/3853* (2013.01); *B26B 19/102* (2013.01); *B26B 19/14* (2013.01)

(58) Field of Classification Search
CPC ..... B26B 19/388; B26B 19/28; B26B 19/102; B26B 19/14
(Continued)

(56) References Cited

U.S. PATENT DOCUMENTS 2,809,425 A * 10/1957 Tettis ...................... B26B 19/20 30/233.5
3,149,418 A * 9/1964 Milbourne ............. B26B 19/20 30/201
(Continued)

FOREIGN PATENT DOCUMENTS

CN 1128970 A 8/1996
CN 1174609 A 2/1998
(Continued)

OTHER PUBLICATIONS

International Search Report and Written Opinion for Patent Application PCT/US20/40422 mailed Oct. 1, 2020; 9 pp.

*Primary Examiner* — Sean M Michalski
(74) *Attorney, Agent, or Firm* — Armstrong Teasdale LLP

(57) ABSTRACT

An electric grooming appliance includes a housing, a grooming device, an electric motor, and a controller. In some embodiments, the electric grooming appliance is capable of operating in different modes and includes a user interface which allows a user to communicate with the controller and select at least one of the modes. The electric grooming appliance may provide information to the user relating to information determined and/or detected during a grooming session. In addition, the electric grooming appliance may record or store grooming session information on a memory and estimate future operating parameters based on the
(Continued)

grooming session information. The electric grooming appliance may include a trimmer assembly that is positionable between a stowed position and an operative position.

14 Claims, 35 Drawing Sheets

(51) Int. Cl.
*B26B 19/28* (2006.01)
*B26B 19/14* (2006.01)

(58) Field of Classification Search
USPC .......................................................... 30/277.4
See application file for complete search history.

(56) References Cited

U.S. PATENT DOCUMENTS

| | | | | |
|---|---|---|---|---|
| 3,264,735 | A * | 8/1966 | Du Charme | B26B 19/20 30/201 |
| 3,797,109 | A | 3/1974 | Ikejima et al. | |
| 4,074,175 | A * | 2/1978 | Born | H02P 7/293 318/434 |
| 4,085,503 | A * | 4/1978 | Beck | B26B 19/20 30/201 |
| 4,315,316 | A * | 2/1982 | Boros | G01R 19/25 323/283 |
| 4,351,029 | A * | 9/1982 | Maxey | G01N 3/58 73/104 |
| D283,058 | S | 3/1986 | Satoh | |
| 4,638,237 | A | 1/1987 | Fernandez | |
| 4,649,642 | A | 3/1987 | Nagasaki et al. | |
| 4,688,329 | A | 8/1987 | Oord | |
| 4,775,827 | A | 10/1988 | Ijntema et al. | |
| 4,835,453 | A | 5/1989 | Munning et al. | |
| 4,931,737 | A | 6/1990 | Hishiki | |
| 5,084,967 | A | 2/1992 | Nakagawa et al. | |
| 5,130,659 | A | 7/1992 | Sloan | |
| 5,144,218 | A | 9/1992 | Bosscha | |
| 5,248,929 | A | 9/1993 | Burke | |
| 5,325,869 | A | 7/1994 | Stokes | |
| 5,694,020 | A * | 12/1997 | Lang | H02P 7/29 320/136 |
| 5,789,901 | A | 8/1998 | Lomholt | |
| 5,801,637 | A * | 9/1998 | Lomholt | B26B 19/38 340/636.15 |
| 5,983,502 | A | 11/1999 | Geertsma et al. | |
| 6,009,623 | A | 1/2000 | Orloff | |
| 6,034,509 | A | 3/2000 | Einerhand et al. | |
| D424,241 | S | 5/2000 | Wang | |
| 6,087,808 | A | 7/2000 | Pritchard | |
| 6,218,809 | B1 | 4/2001 | Downs et al. | |
| 6,433,512 | B1 | 8/2002 | Birkler et al. | |
| 6,538,449 | B2 | 3/2003 | Juncker et al. | |
| 6,708,408 | B2 * | 3/2004 | Orloff | B26B 21/4087 30/41.7 |
| 7,352,108 | B2 | 4/2008 | Diefenbach et al. | |
| 8,040,430 | B2 | 10/2011 | Ogawa | |
| 8,242,749 | B2 | 8/2012 | Xiao et al. | |
| 8,341,846 | B1 * | 1/2013 | Holmes | B26B 19/20 30/208 |
| D675,780 | S | 2/2013 | Wallace et al. | |
| 8,482,258 | B2 | 7/2013 | Jones et al. | |
| D695,961 | S | 12/2013 | Prat-Pfister | |
| 8,816,868 | B2 | 8/2014 | Tan et al. | |
| 8,922,168 | B2 | 12/2014 | Ko | |
| 9,085,086 | B2 | 7/2015 | Keijzer et al. | |
| 9,126,346 | B2 | 9/2015 | Meier et al. | |
| 9,149,942 | B2 | 10/2015 | Van Der Meer | |
| 9,488,695 | B2 | 11/2016 | Simeth | |
| 9,709,607 | B2 | 7/2017 | Tan et al. | |
| 9,853,476 | B2 | 12/2017 | Lee et al. | |
| 9,919,437 | B2 | 3/2018 | Veltman et al. | |
| 9,972,036 | B2 | 5/2018 | Zhang et al. | |
| D848,072 | S | 5/2019 | Prat-Pfister | |
| 10,589,437 | B2 | 3/2020 | Amavasai et al. | |
| 10,736,396 | B2 | 8/2020 | Kindermann | |
| D919,182 | S | 5/2021 | Chen | |
| D925,124 | S | 7/2021 | Huang | |
| D930,243 | S | 9/2021 | Prat-Pfister | |
| D942,079 | S | 1/2022 | Prat-Pfister | |
| 2004/0098862 | A1 | 5/2004 | Orloff | |
| 2008/0196258 | A1 | 8/2008 | Kraus | |
| 2009/0000124 | A1 | 1/2009 | Micinilio et al. | |
| 2009/0000126 | A1 | 1/2009 | Kraus | |
| 2009/0193255 | A1 * | 7/2009 | Baum | H04L 9/32 713/176 |
| 2010/0186234 | A1 * | 7/2010 | Binder | H04B 3/548 348/E5.022 |
| 2010/0198537 | A1 | 8/2010 | Takemori | |
| 2011/0197726 | A1 | 8/2011 | Kraus | |
| 2012/0015647 | A1 | 1/2012 | Jin et al. | |
| 2012/0233866 | A1 | 9/2012 | Kammer | |
| 2012/0320180 | A1 | 12/2012 | Binder | |
| 2013/0021460 | A1 | 1/2013 | Burdoucci | |
| 2016/0167241 | A1 | 6/2016 | Goldfarb et al. | |
| 2016/0209472 | A1 | 7/2016 | Chow et al. | |
| 2016/0259013 | A1 | 9/2016 | Basu et al. | |
| 2017/0019044 | A1 * | 1/2017 | Godlieb | H02P 7/29 |
| 2017/0214246 | A1 | 7/2017 | Wang et al. | |
| 2017/0340085 | A1 | 11/2017 | Kindermann | |
| 2018/0059770 | A1 | 3/2018 | Kingma | |
| 2019/0118396 | A1 * | 4/2019 | Zak | B26B 19/16 |
| 2019/0224863 | A1 | 7/2019 | Robinson et al. | |
| 2019/0224864 | A1 | 7/2019 | Robinson et al. | |
| 2019/0224865 | A1 | 7/2019 | Robinson et al. | |
| 2019/0224867 | A1 | 7/2019 | Robinson et al. | |
| 2019/0224869 | A1 | 7/2019 | Robinson et al. | |
| 2019/0224870 | A1 | 7/2019 | Robinson et al. | |
| 2019/0224871 | A1 | 7/2019 | Amavasai et al. | |
| 2019/0299432 | A1 | 10/2019 | Fuerst et al. | |
| 2019/0299434 | A1 | 10/2019 | Fuerst et al. | |
| 2019/0299435 | A1 | 10/2019 | Fuellgrabe et al. | |
| 2019/0306259 | A1 * | 10/2019 | Burghardt | B26B 21/4081 |
| 2020/0122348 | A1 | 4/2020 | Good et al. | |
| 2020/0337432 | A1 | 10/2020 | Kindermann | |

FOREIGN PATENT DOCUMENTS

| | | | |
|---|---|---|---|
| CN | 1116964 | C | 8/2003 |
| CN | 201122924 | Y | 9/2008 |
| CN | 201941027 | U | 8/2011 |
| CN | 208046493 | U | 11/2018 |
| CN | 109591058 | A | 4/2019 |
| CN | 209224121 | U | 8/2019 |
| CN | 110614656 | A | 12/2019 |
| DE | 102008005549 | B4 | 7/2009 |
| EP | 1441398 | A1 | 7/2004 |
| EP | 2396150 | B1 | 11/2014 |
| EP | 3401065 | A1 | 11/2018 |
| FR | 2749793 | A1 | 12/1997 |
| JP | 2004209116 | A | 7/2004 |
| JP | 2005198966 | A | 7/2005 |
| JP | 2010227223 | A | 10/2010 |
| JP | 2010227224 | A | 10/2010 |
| JP | 2010227225 | A | 10/2010 |
| JP | 2020089600 | A | 6/2020 |
| JP | 2020089706 | A | 6/2020 |
| JP | 2020089707 | A | 6/2020 |
| JP | 2020089708 | A | 6/2020 |
| JP | 2020089709 | A | 6/2020 |
| KR | 451654 | Y1 | 12/2010 |
| KR | 462955 | Y1 | 10/2012 |
| KR | 462956 | Y1 | 10/2012 |
| KR | 1398875 | B1 | 5/2014 |
| KR | 1741905 | B1 | 5/2017 |
| WO | 2009065280 | A1 | 5/2009 |
| WO | 2016107198 | A1 | 7/2016 |
| WO | 2016168532 | A1 | 10/2016 |
| WO | 2018068329 | A1 | 4/2018 |

* cited by examiner

ELECTRIC GROOMING DEVICE

This application is a 371 national stage of PCT Application No. PCT/US2020/040422 filed on Jul. 1, 2020 which claims the benefit of U.S. Provisional Patent Application Ser. No. 62/869,417 filed on Jul. 1, 2019, which are incorporated by reference herein in their entirety.

FIELD OF THE DISCLOSURE

The present disclosure relates generally to an electric grooming appliance, and more specifically, to an electric grooming appliance with features to improve the user's grooming experience.

BACKGROUND OF THE DISCLOSURE

Many different types of electric grooming appliances are available. For example, electric grooming appliances for grooming hair include curling irons, flat irons (which are also sometimes referred to as heated tongs or hair straighteners), blow dryers, hair setters (also known as hot rollers or curlers), and electric hair cutting or removing devices, such as foil shavers, rotary shavers, trimmers, clippers, and epilators. The electric grooming appliances are operated in an ON state in which power is supplied to the electric grooming appliance and the appliance is used to perform a grooming operation.

The electric grooming appliances may be used routinely by one or more users to perform grooming operations. Parameters of the appliance and the manner of use by the users may affect the grooming operations performed by the one or more users. Moreover, operation of at least some grooming appliances could be adjusted to improve the user's experience. For example, sometimes a user may press the grooming appliance against the skin with an amount of force that prevents the grooming appliance from flexing relative to the skin and may reduce the operating efficiency of the electric grooming appliances. However, typical grooming appliances are not capable of determining certain operating parameters of the appliance during the grooming operation. Accordingly, the grooming appliances are unable to adjust operation or indicate to a user to adjust operation of the grooming appliance before, during, and/or after the grooming operation.

SUMMARY

In one aspect, an electric grooming appliance includes a housing, a hair cutting device, an electric motor, a sensor and a controller. The hair cutting device is supported by the housing and includes at least one moveable blade configured to cut hair. The electric motor is contained in the housing. The electric motor is configured to drive the at least one moveable blade when the electric motor receives an amperage draw from a power supply. The sensor is configured to detect the amperage draw of the electric motor from the power supply. The controller is contained in the housing and is configured to receive information from the sensor. The controller is configured to compare the amperage draw to a threshold amperage, and, if the amperage draw is greater than the threshold amperage, the controller may adjust a power output of the power supply.

In another aspect, an electric grooming appliance includes a housing, a hair cutting device, an electric motor, a battery, a user interface, and a controller. The hair cutting device is supported by the housing. The hair cutting device includes at least one moveable blade configured to facilitate cutting of hair. The electric motor is contained in the housing and is configured to drive the at least one moveable blade. The battery is configured to deliver a power output to the electric motor. The user interface includes a display and the user interface may receive at least one input from a user to switch the hair grooming appliance between an ON mode and an OFF mode. The electric motor drives the at least one moveable blade in the ON mode. The controller is contained in the housing. The controller includes a memory and the controller may identify a plurality of grooming sessions and store a start time and an end time in the memory for each of a respective grooming sessions. The start time is a time when the user selects the ON mode and the end time is a time when the user selects the OFF mode. The controller may determine and store in the memory an elapsed time for each grooming session. The elapsed time is the amount of time from the start time to the end of the respective grooming session. Elapsed times that are less than a threshold time are not stored. The controller may determine an average elapsed time. The average elapsed time is the average of the elapsed times stored in the memory for a plurality of elapsed times. The controller may determine the number of the elapsed times prior to a parameter of the battery falling below a threshold level. The number of elapsed times remaining includes the battery life divided by the average elapsed time.

In another aspect, an electric grooming appliance includes a housing, a hair cutting device, an electric motor, a sensor, a user interface, and a controller. The hair cutting device is supported by the housing and includes at least one moveable blade configured to cut hair. The electric motor is contained in the housing. The electric motor is configured to drive the at least one moveable blade. The controller is contained in the housing and communicatively coupled to the electric motor, the user interface, and the sensor. The controller includes a memory. The controller may interpret a signal from the sensor to determine a parameter related to a force exerted on the moveable blades from a surface of a skin of a user, and the controller may send a signal to the user interface when the parameter reaches a threshold.

DETAILED DESCRIPTION OF THE DRAWINGS

The present disclosure contemplates multiple embodiments of an electric grooming appliance illustrated in the accompanying figures. For example, the electric grooming appliance includes at least one grooming device configured to perform a grooming operation. The electric grooming appliance is capable of operating in different modes and includes a user interface which allows a user to communicate with a controller of the electric grooming appliance and select at least one of the modes of the electric grooming appliance. The electric grooming appliance may provide information to the user relating to information determined and/or detected during a grooming session. For example, a sensor may detect a position of the electric grooming appliance and/or a force applied to the electric grooming appliance during the grooming operation and provide feedback to the user if the position or force is outside of suggested thresholds. In addition, the electric grooming appliance may record or store grooming session information on a memory and estimate future operating parameters based on the grooming session information. In some embodiments, the electric grooming appliance may automatically adjust operation of the electric grooming appliance based on determined or detected information.

The electric grooming appliance may include a clean mode in which the controller operates the electric grooming appliance to clean a grooming device of the grooming appliance. The clean mode may include pulsed operation of the grooming device. In some embodiments, the electric grooming appliances has one or more washout ports defined in a housing to allow fluid to be directed into an interior space of the housing and remove debris from within the interior space.

The electric grooming appliance may include a grooming device that is positionable between a stowed position and an operative position. The positionable grooming device may be moved from the stowed position to the operative position by pressing directly on the grooming device to displace it and release a catch. A biasing device biases the grooming device toward the operative position in which the grooming device extends beyond an end of a housing of the electric grooming appliance.

Figure 1:
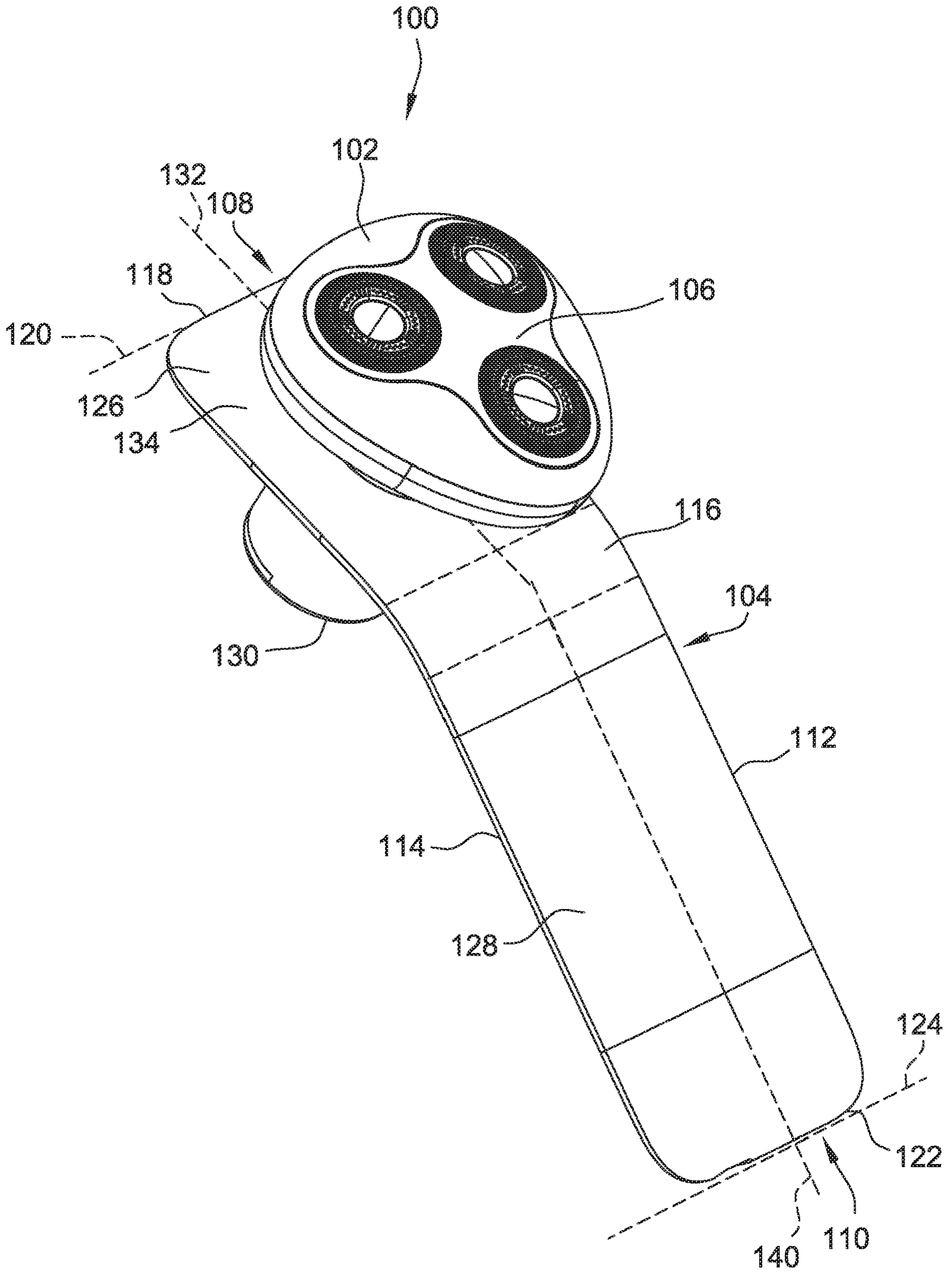
FIG. 1 is a perspective view of one suitable embodiment of an electric grooming appliance, the electric grooming appliance including a grooming device and having different operating modes.

Referring to FIG. 1, an electric grooming appliance is indicated generally at 100. The electric grooming appliance 100 includes a head 102, a body 104, and a cutting assembly 106. The body 104 includes a first end 108, a second end 110, a first side 112, a second side 114, and a bend 116. The first end 108 includes a first edge 118 extending along a first axis 120. The second end 110 includes a second edge 122 extending along a second axis 124. The first axis 120 and the second axis 124 are substantially parallel. The first side 112 and the second side 114 are substantially parallel to each other and lie within a plane substantially perpendicular to the first axis 120 and the second axis 124. Accordingly, the body 104 is generally rectangular. In other embodiments, the body 104 may be circular, triangular, trapezoidal, or any other suitable shape.

In the illustrated embodiment, the electric grooming appliance 100 is configured as a hair grooming appliance having at least one grooming operation which cuts or otherwise grooms hair. In other embodiments, the grooming appliance 100 may be any suitable grooming appliance including, for example and without limitation, a shaver, an epilator, a hair trimming device, an intense pulsed light (IPL) device, a laser device, a skincare device, a brush, a massager, and/or any other suitable grooming device.

Figure 2A:
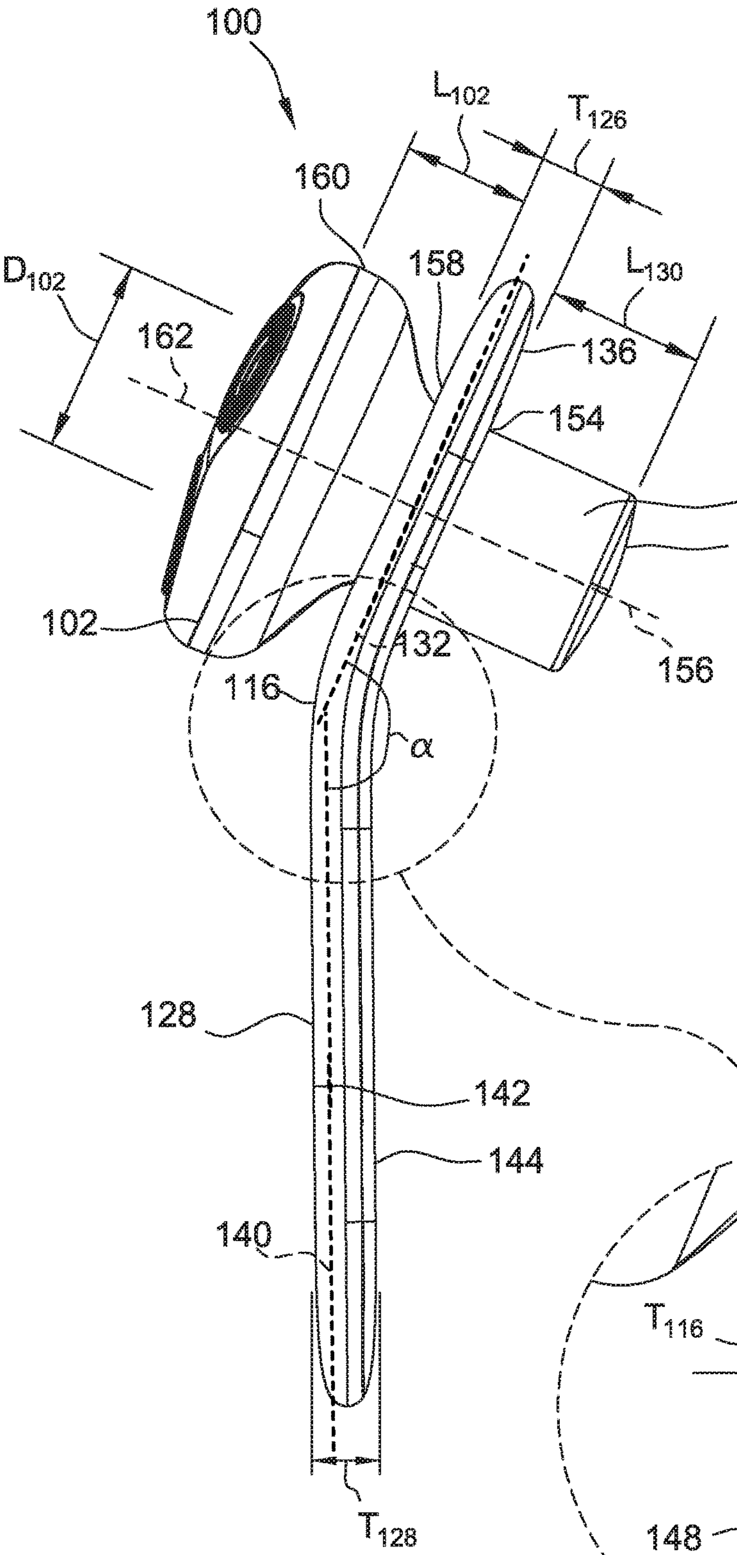
FIG. 2 is a side view of the electric grooming appliance shown in FIG. 1, the grooming appliance including a housing having a bend defining an angle.
Figure 2B:
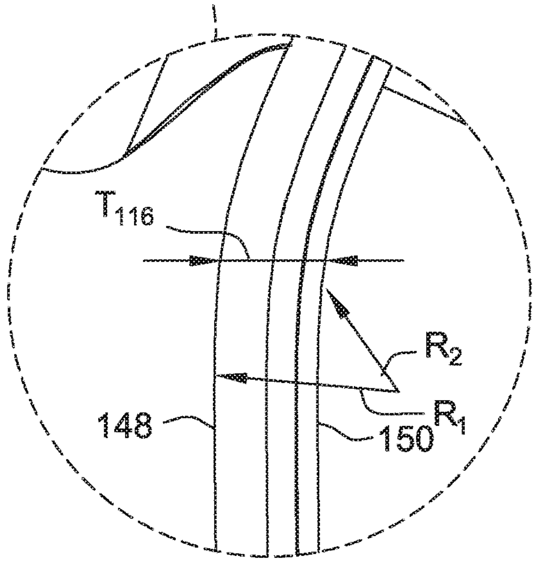
Figure 3:
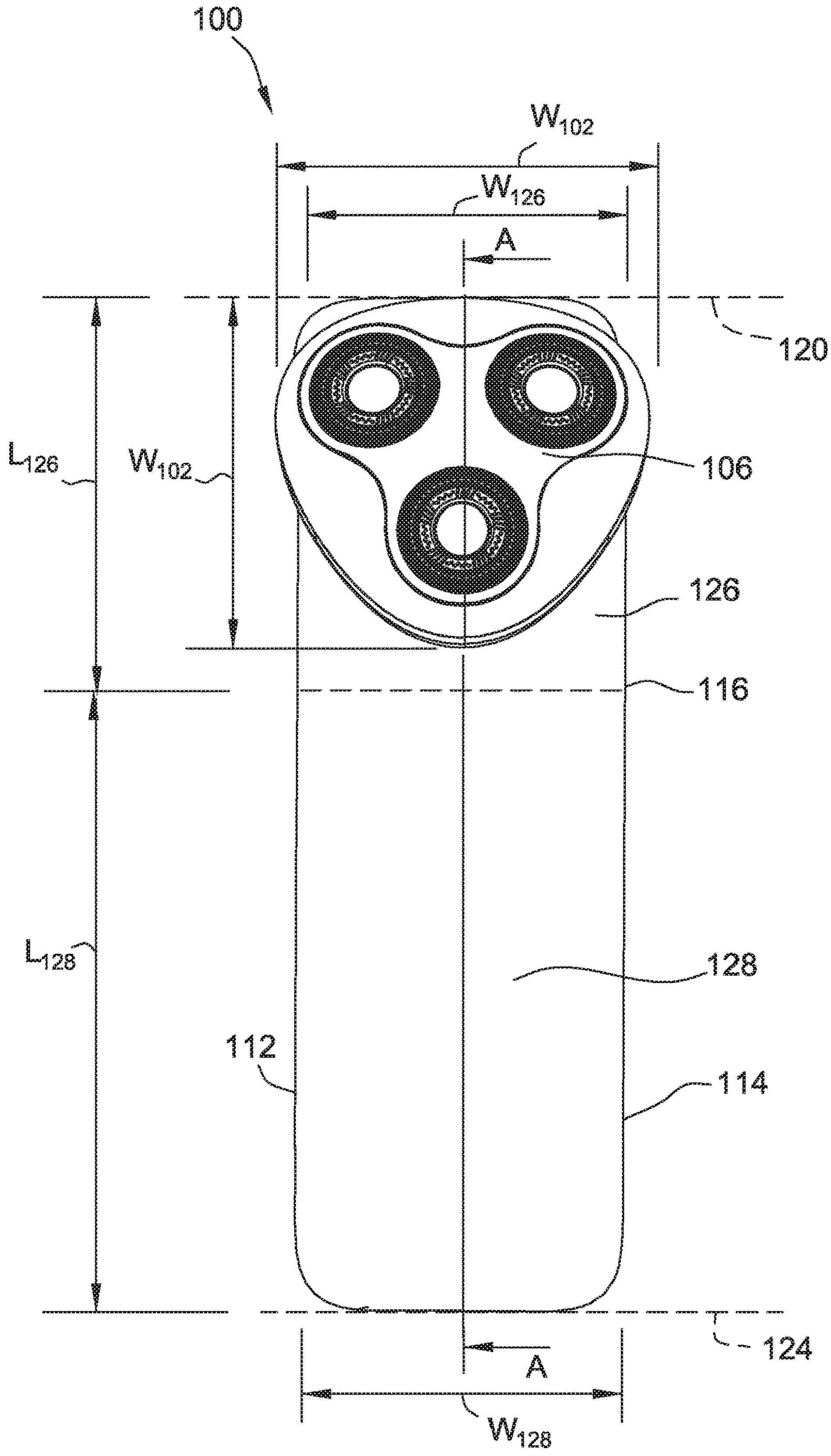
FIG. 3 is a front view of the electric grooming appliance shown in FIGS. 1 and 2.
Figure 4:
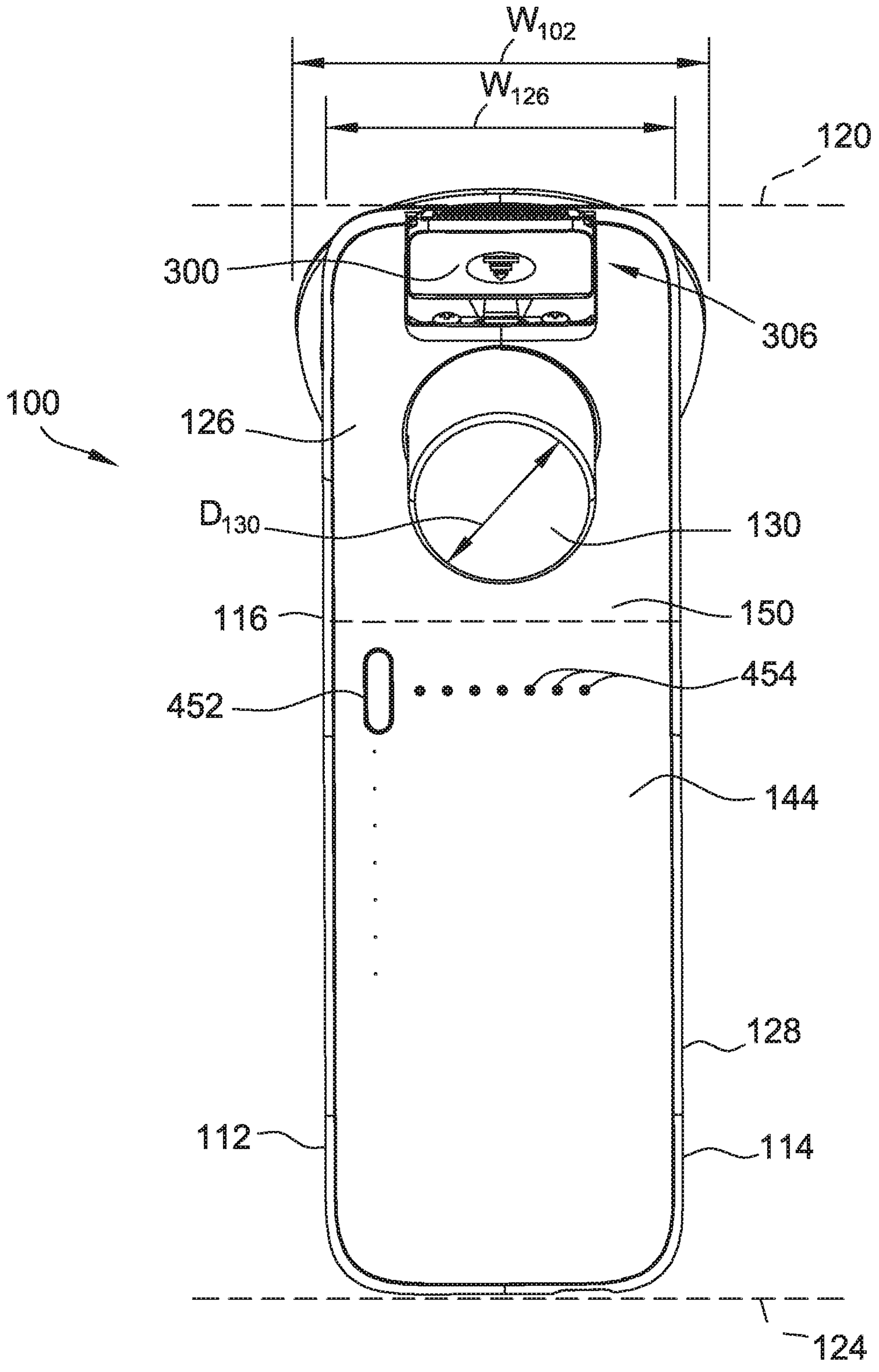
FIG. 4 is a back view of the electric grooming appliance shown in FIGS. 1-3, the electric grooming appliance including a trimmer assembly in a stowed position.
Figure 5:
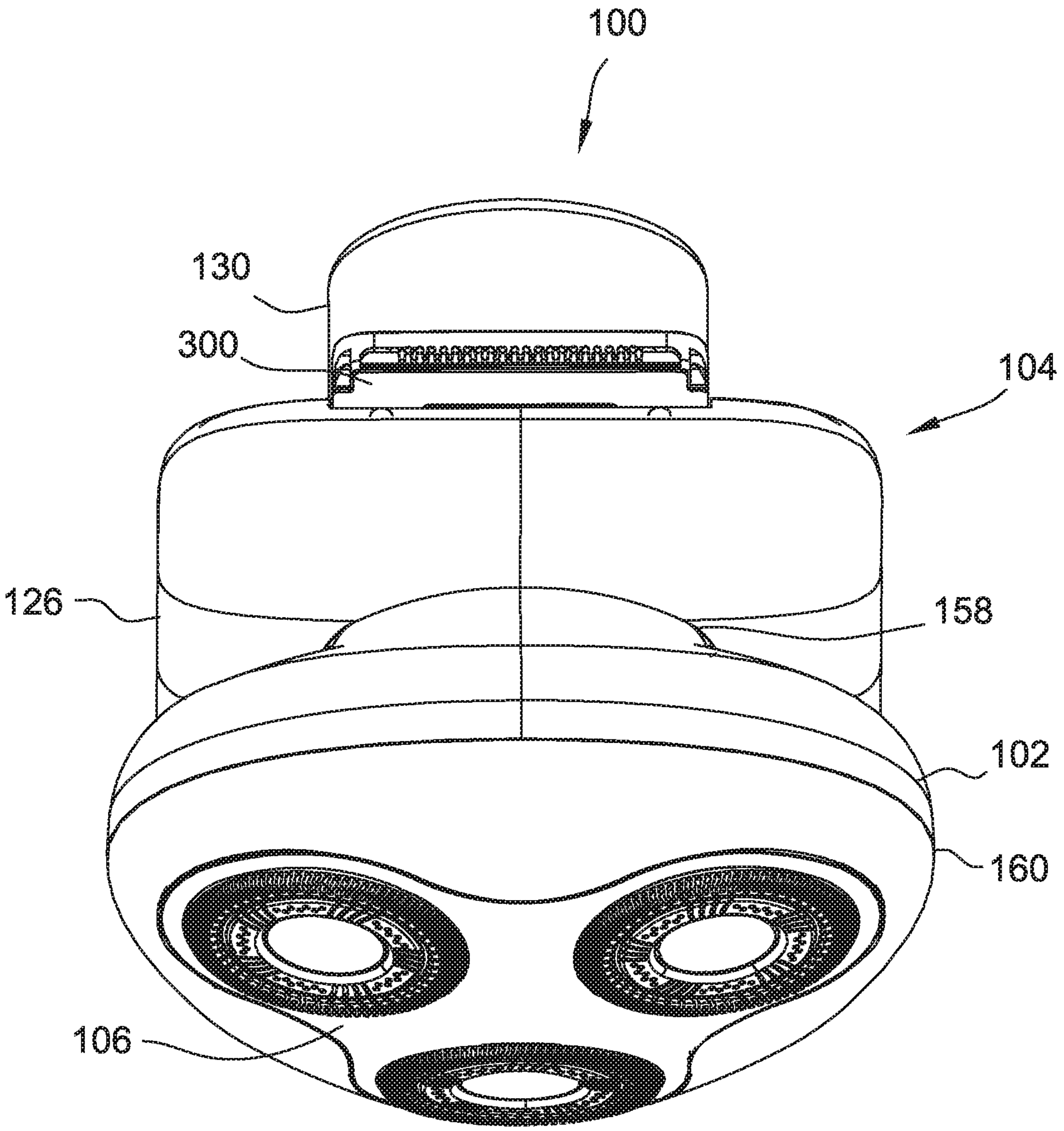
FIG. 5 is a top view of the electric grooming appliance shown in FIGS. 1-4.
Figure 6:
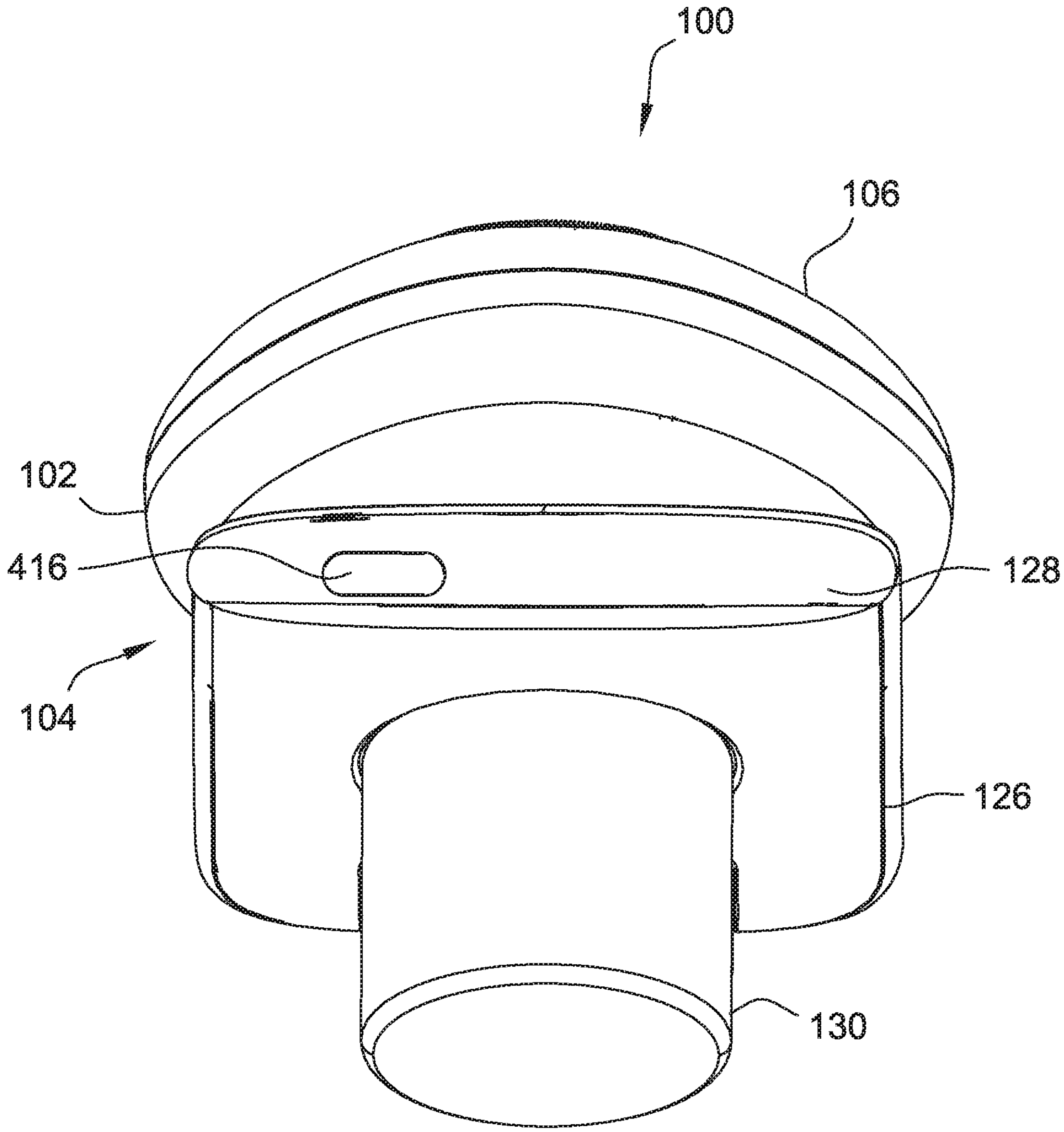
FIG. 6 is a bottom view of the electric grooming appliance shown in FIGS. 1-5.

With reference to FIGS. 2-4, the body 104 includes a planar portion 126, a handle 128, and a motor housing 130. The planar portion 126 extends from the bend 116 to the first edge 118. An axis 132 extends through a midline of the planar portion 126 from the first edge 118 to the bend 116. The planar portion 126 includes a front plate 134 and a back plate 136. The front plate 134 and the back plate 136 are substantially flat and rectangular in shape.

The front plate 134 and the back plate 136 each have a length $L_{126}$ defined between the first axis 120 and the bend 116. The front plate 134 and the back plate 136 each have a width $W_{126}$ defined between the first side 112 and the second side 114. In this illustrated embodiment, the length $L_{126}$ is substantially greater than the width $W_{126}$.

The front plate 134 and the back plate 136 are substantially parallel and separated by a distance of $T_{126}$. The front plate 134 and the back plate 136 are connected by the first edge 118, the first side 112 and the second side 114. The front plate 134, the back plate 136, the first edge 118, the first side 112, and the second side 114 define a cavity 138 (shown in FIG. 7). In alternative embodiments, the planar portion 126 may have other dimensions without departing from some aspects of the disclosure.

The handle 128 extends from the bend 116 to the second edge 122. A handle axis 140 extends through a longitudinal axis of the handle 128 from the second end 110 to the bend 116. The handle 128 includes a handle front plate 142 and a handle back plate144. The handle front plate 142 and the handle back plate 144 are substantially flat and rectangular in shape. The handle front plate 142 and the handle back plate 144 each have a length of $L_{128}$ defined between the second axis 124 and the bend 116. The handle front plate 142 and the handle back plate 144 each have a width of $W_{128}$ defined between the first side 112 and the second side 114. In this illustrated embodiment, the length $L_{128}$ is substantially greater than the width $W_{128}$. The width $W_{128}$is equal to the width $W_{126}$ and the length $L_{128}$ is greater than the length $L_{126}$. Accordingly, the handle 128 is larger than the planar portion 126.

The handle front plate 142 and the handle back plate 144 are substantially parallel and separated by a distance of $T_{128}$. The handle front plate 142 and the handle back plate 144 are connected around their perimeter by the second edge 122, the first side 112, and the second side 114. The handle front plate 142, the handle back plate 144, the second edge 122, the first side 112, and the second side 114 define a handle cavity 146 (shown in FIG. 7). The handle 128 is suitably sized and shaped such the handle 128 may be easily held in a user's hand during a grooming session. In alternative embodiments, the handle 128 may have other dimensions without departing from some aspects of the disclosure.

Still referring to FIGS. 2-4, the bend 116 extends parallel to the first edge 118 and the second edge 122 and connects the planar portion 126 and the handle 128. The bend 116 includes a bend front surface 148 and a bend back surface 150. The bend front surface 148 has a curve of radius $R_1$ and extends between the front plate 134 and the handle front plate 142. The bend back surface 150 includes a smooth curve of radius $R_2$ extending between the back plate 136 and the handle back plate 144. The radius $R_2$ is substantially equal to the radius $R_1$.The bend front surface 148 and the bend back surface 150 are substantially parallel and are separated by a distance of $T_{116}$. The bend front surface 148 and the bend back surface 150 are connected at the first side 112 and the second side 114. In this illustrated embodiment, the distance $T_{116}$, distance $T_{126}$, and the distance $T_{128}$ are substantially equal to each other.

In this illustrated embodiment, the axis 132 and the handle axis 140 intersect at the bend 116 and define an angle α. The angle α may be obtuse. For example, in some embodiments the angle α is in a range of about 90 degrees)(° to about 180°. The angle α is at least partially determined by the shape of the bend 116, specifically by the radius $R_1$ and radius $R_2$. For example, if the radius $R_1$ and $R_2$ are increased, the angle α will decrease.

Referring to FIGS. 2 and 4-6, the motor housing 130 is attached to the back plate 136. The motor housing 130 may be any shape. For example, in some embodiments, the motor housing 130 may be substantially cylindrical, spherical, cuboid, prismatic, conical, or any other suitable shape. In this illustrated embodiment, the motor housing 130 is substantially cylindrical in shape and has a diameter of $D_{130}$. The motor housing 130 includes a first end 152, a second end 154, and a length of $L_{130}$ defined between the first end 152 and the second end 154. The motor housing 130 includes a motor housing axis 156 extending from the first end 152 to the second end 154 and passing through the center of the motor housing 130. The motor housing 130 extends outward from the back plate 136. The motor housing axis 156 is substantially perpendicular to the back plate 136. The motor housing 130 is substantially centered on the back plate 136.

Figure 10:
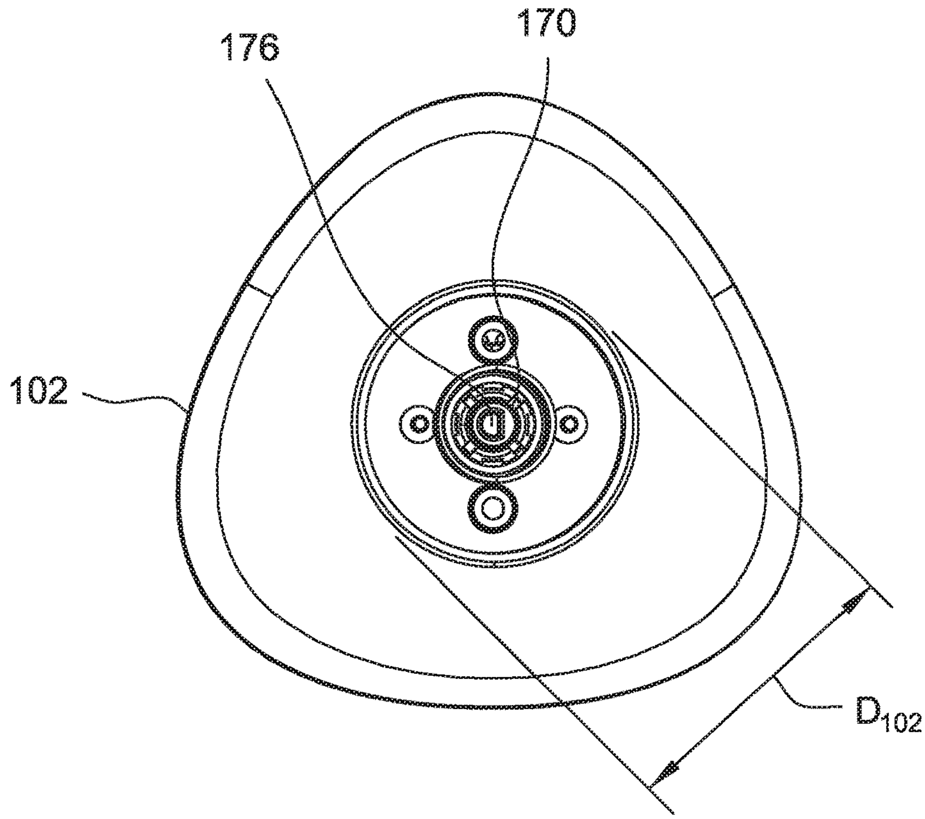
FIG. 10 is a back view of the head shown in FIG. 9, the head including a first drive unit.
Figure 11:
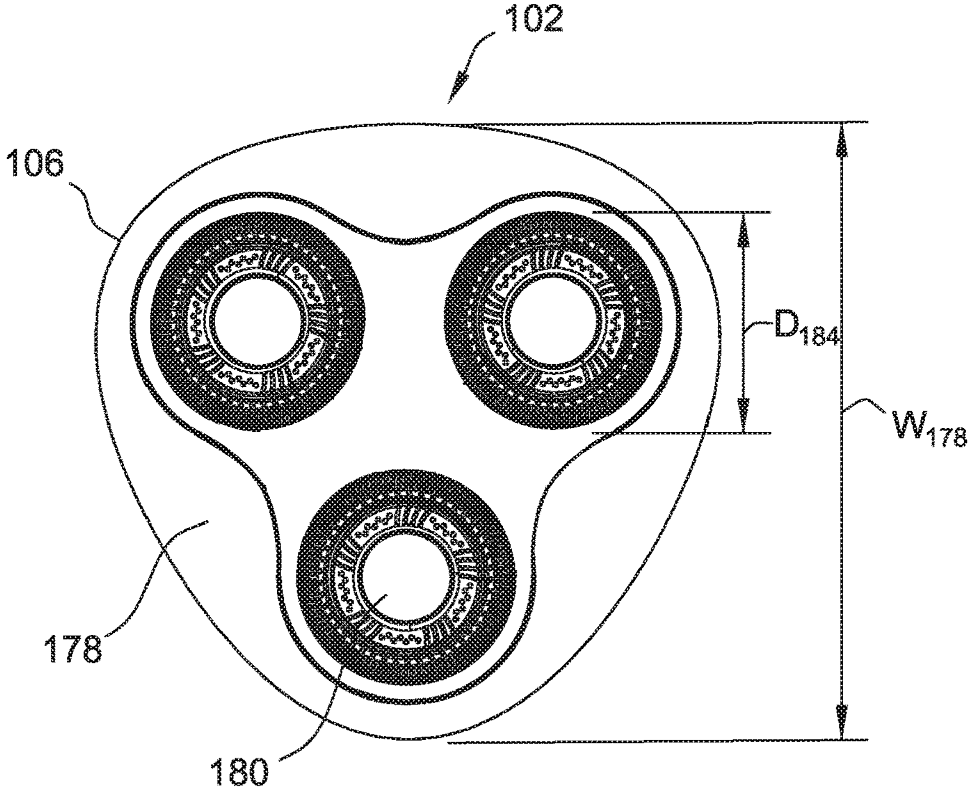
FIG. 11 is a front view of the head shown in FIGS. 9 and 10, the head including a cutting assembly.
Figure 12:
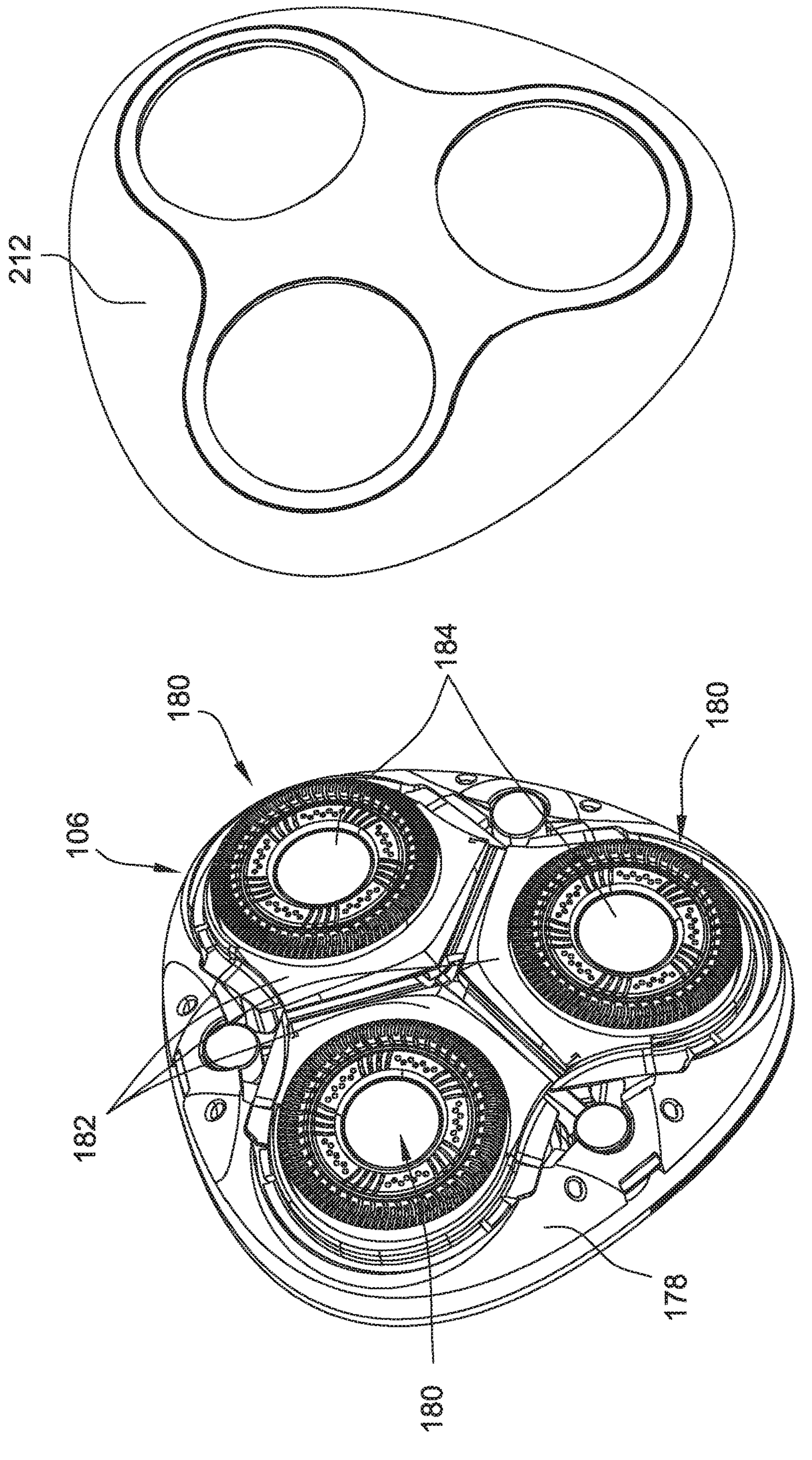
FIG. 12 is an assembly view of the head shown in FIGS. 9-11 with a casing detached from the head to show an outer frame and blade assemblies of the cutting assembly.

The head 102 includes a first end 158 and a second end 160. The first end 158 is connected to the front plate 134. The head 102 extends outward from the front plate 134 along a head axis 162 extending from the first end 158 to the second end 160. The head axis 162 is substantially perpendicular to the front plate 134 and coaxial with the motor housing axis 156. The head 102 has a length of $L_{102}$ defined from the first end 158 to the second end 160. The first end 158 is circular and has a diameter of $D_{102}$. The diameter $D_{102}$ (shown in FIG. 10) and the diameter $D_{130}$ (shown in FIG. 4) may be equal to each other.

The second end 160 of the head 102 is a reuleaux triangle and has a width of $W_{102}$ (shown in FIG. 3). The width $W_{102}$ is greater than the diameter $D_{102}$. In some embodiments, the width $W_{102}$ may be greater than the width $W_{126}$.

Figure 7:
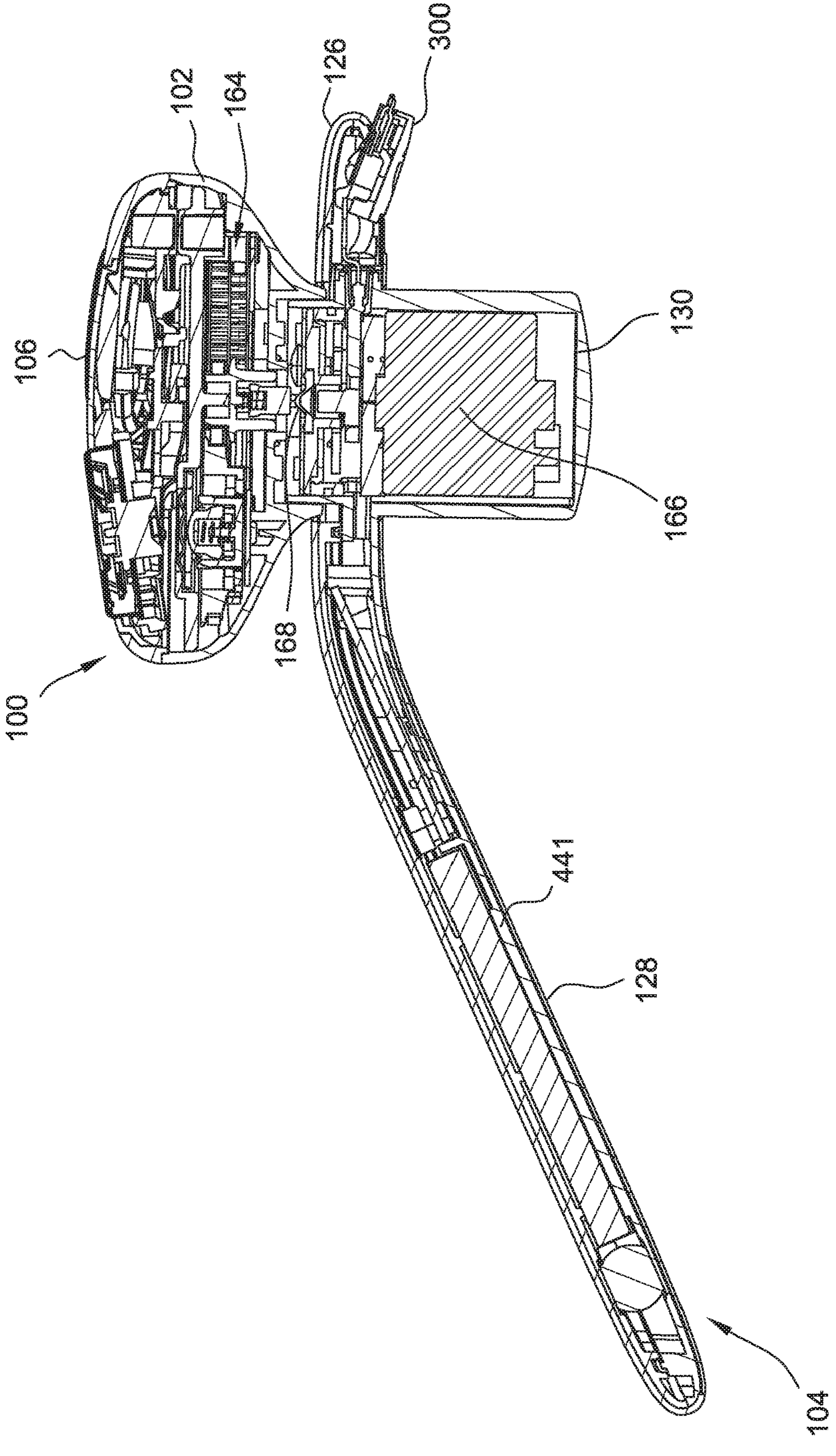
FIG. 7 is a sectional view of the electric grooming appliance along line A-A shown in FIG. 3, the electric grooming appliance including a motor and power supply.
Figure 8:
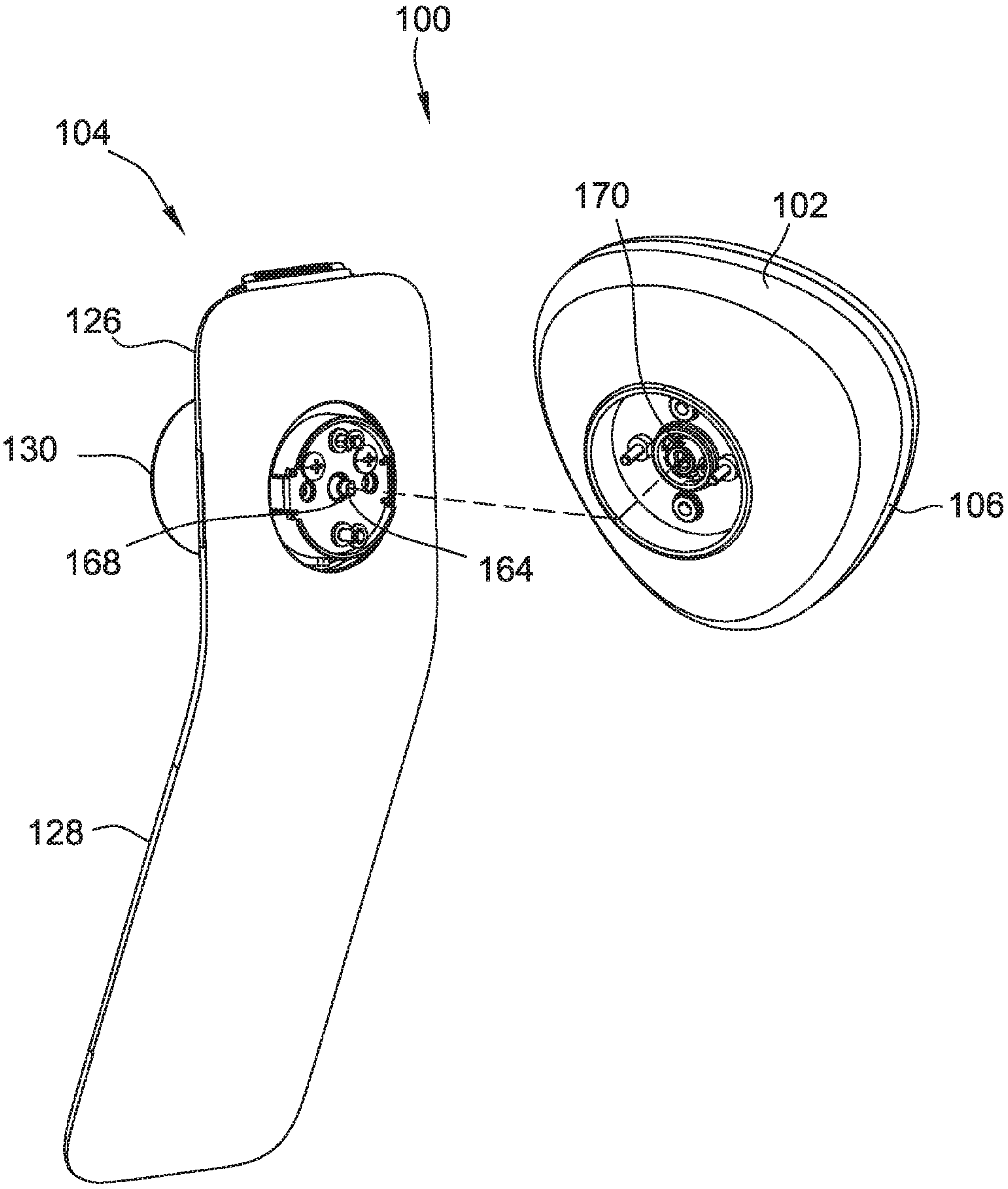
FIG. 8 is a perspective view of the electric grooming appliance shown in FIGS. 1-7 with a head detached from a handle of the electric grooming appliance.
Figure 9:
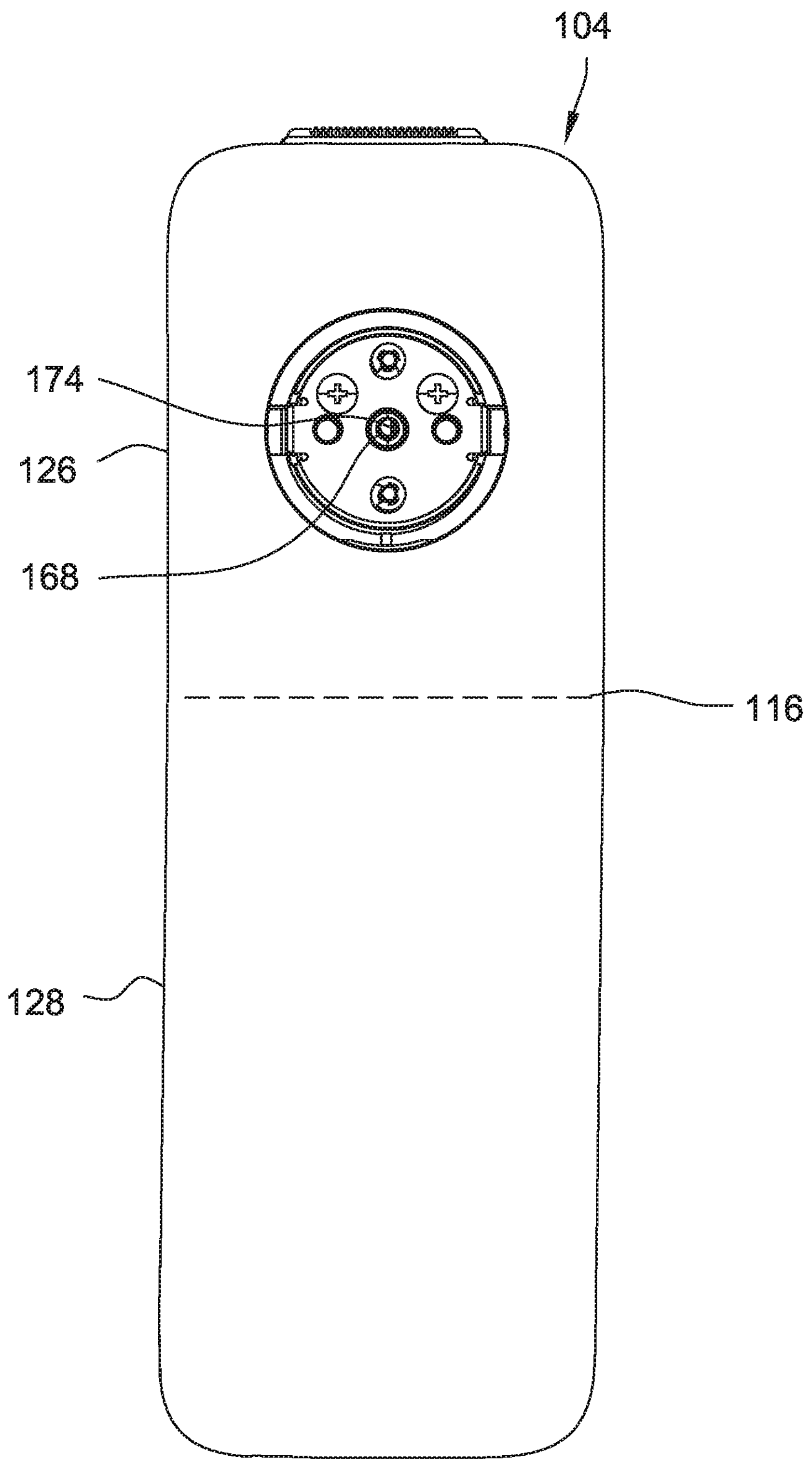
FIG. 9 is a front view of the handle of the electric grooming appliance shown in FIG. 8 with the head of the electric grooming appliance removed.

With reference to FIG. 7, the grooming appliance 100 may receive power from an external and/or internal power supply 434. For example, the power supply 434 may include a battery 440 positioned within a battery compartment 441defined by the handle 128. The electric grooming appliance 100 includes a port 416 (shown in FIG. 6) extending from the battery compartment 442 to an exterior of the handle 128 (shown in FIG. 6). The port 416 may receive a cable to connect the battery 440 to an external power supply to provide power to grooming appliance 100 during a grooming operation and/or to charge battery 440. For example, the port 416 may be a universal serial bus (USB) type port or another standardized power port configured to receive one or more power cords for charging and/or for receiving power from an external power supply to operate the electric grooming appliance 100.

Referring to FIGS. 7-10, the electric grooming appliance 100 includes a drive assembly 164. The drive assembly 164 is contained within the motor housing 130, the planar portion 126, and the head 102. The drive assembly 164 includes an electric motor 166, a first drive shaft 168, a first coupling unit 170, and a drive train 172. At least a portion of the electric motor 166 is contained within the motor housing 130. The first drive shaft 168 is connected to the electric motor 166. The electric motor 166 may cause the first drive shaft 168 to rotate at one or more predetermined speeds. The first drive shaft 168 may be connected to the electric motor 166 in any manner that enables the electric grooming appliance 100 to function as described herein such as, for example and without limitation, linkages, adhesives, and or welding. The first drive shaft 168 extends outward from the electric motor 166 along the motor housing axis 156 and at least a portion of the first drive shaft 168 extends into the head 102. The first drive shaft 168 rotates about the motor housing axis 156. The electric grooming appliance 100 may include different drive assemblies without departing from some aspects of the disclosure.

The first drive shaft 168 includes a key 174 that is configured to engage the first coupling unit 170 when the head 102 is attached to the planar portion 126. The first coupling unit 170 is at least partially contained within the head 102 and configured to receive the key 174. For example, the first coupling unit 170 defines a keyed slot 176 sized and shaped to receive the key 174 (shown in FIG. 10). The key 174 is configured to mate with the keyed slot 176 such that the key 174 and the keyed slot 176 couple the first drive shaft 168 and the first coupling unit 170 together. Rotation of the first drive shaft 168 causes rotation of the first coupling unit 170 when the key 174 is engaged with the first coupling unit 170. In alternative embodiments, the drive assembly 164 may include any additional mechanisms which enable the electric grooming appliance 100 to function as described herein.

Still referring to FIGS. 7-10, the head 102 includes the cutting assembly, broadly a grooming device, 106 at the second end 160. A cutting plane of the cutting assembly 106 is defined by the portions (e.g., blade assemblies 180) of the cutting assembly 106 that contact skin during a shaving operation. The cutting plane is substantially parallel to the planar portion 126. The cutting assembly 106 is positioned such that the handle 128 is spaced from the cutting assembly 106 a distance that allows a user to perform a grooming operation without significant impediment from the gripping hand of the user. Specifically, the cutting plane of the cutting assembly 106 is spaced from the handle 128 by the length $L_{102}$ of the head 102, and a portion of the length $L_{126}$. Moreover, the bend 116 allows the head 102 and the cutting assembly 106 to be at an angle relative to the handle 128 and provides additional space between the handle 128 and a cutting plane of the cutting assembly 106.

Referring to FIGS. 11-14, the cutting assembly 106 includes an outer frame 178 and at least one blade assembly 180. In this illustrated embodiment, the cutting assembly 106 includes three blade assemblies 180. The outer frame 178 is a reuleaux triangle and has a width $L_{178}$. The outer frame 178 is sized and shaped to mate with the second end 160 of a housing 161 of the head 102. For example, the width $W_{178}$ is substantially equal to the width $W_{102}$ of the head 102. The blade assemblies 180 include a blade frame 182 and a blade unit 184. The blade frame 182 includes an opening 186. The opening 186 is circular and includes a diameter of $D_{186}$. The opening 186 is sized and shaped to receive at least a portion of the blade unit 184. The blade frame 182 is configured to engage and support the blade unit 184 when the blade unit 184 is positioned within the opening 186.

The outer frame 178 includes at least one pin 188 (shown in FIG. 13) formed thereon. The blade frame 182 includes at least one opening 190 sized and shaped to receive at least a portion of the pin 188. The blade frame 182 is rotatable relative to the outer frame 178 when the pin 188 is positioned in the opening 190. As a result, the blade assembly 180 may flex and pivot relative to the outer frame 178 such that the blade assembly 180 may deflect in response to forces applied to the blade assemblies 180 applied during a grooming operation.

Figure 13:
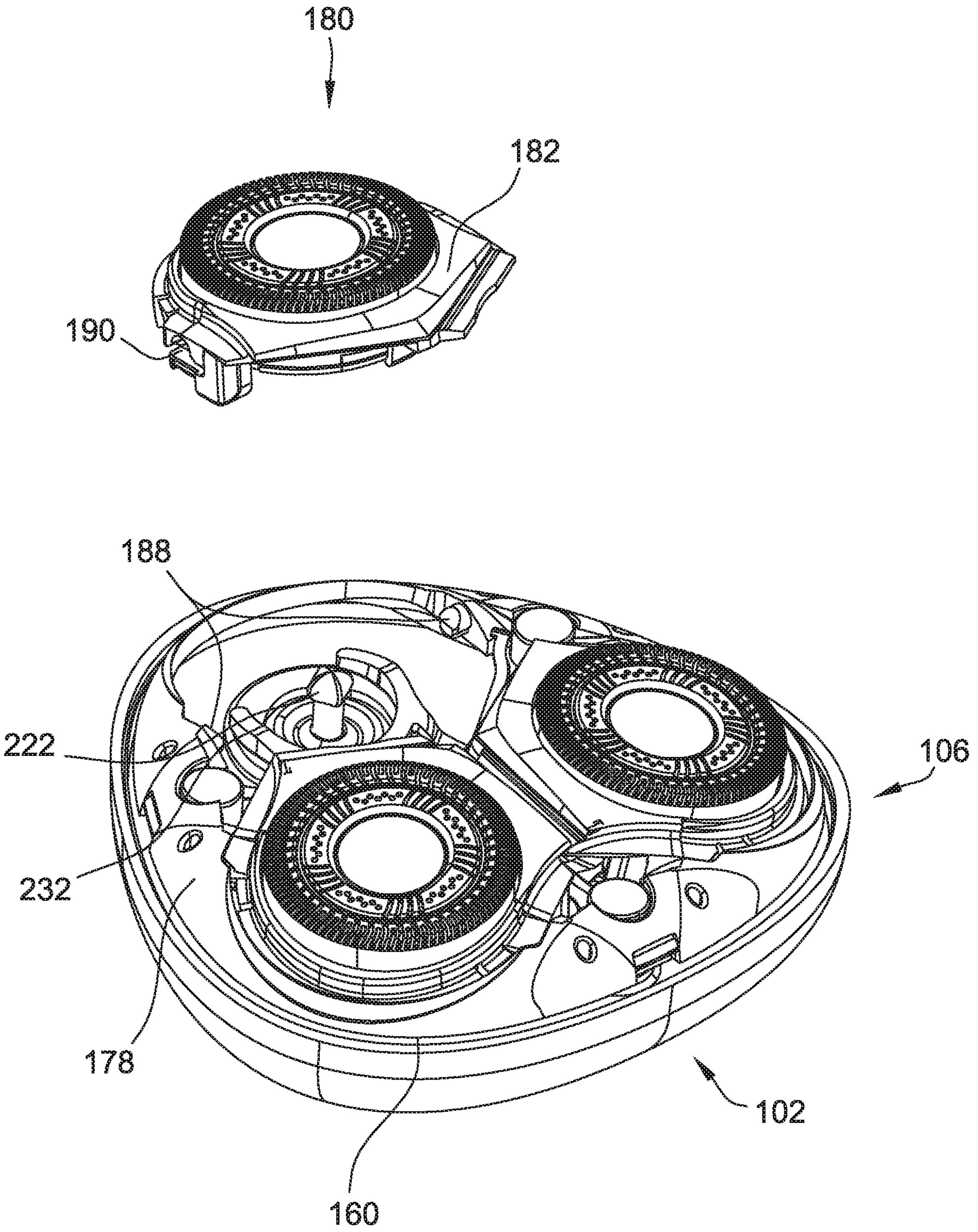
FIG. 13 is an assembly view of the head shown in FIGS. 9-12 with the casing removed from the head and with a blade unit detached from the head.
Figure 14:
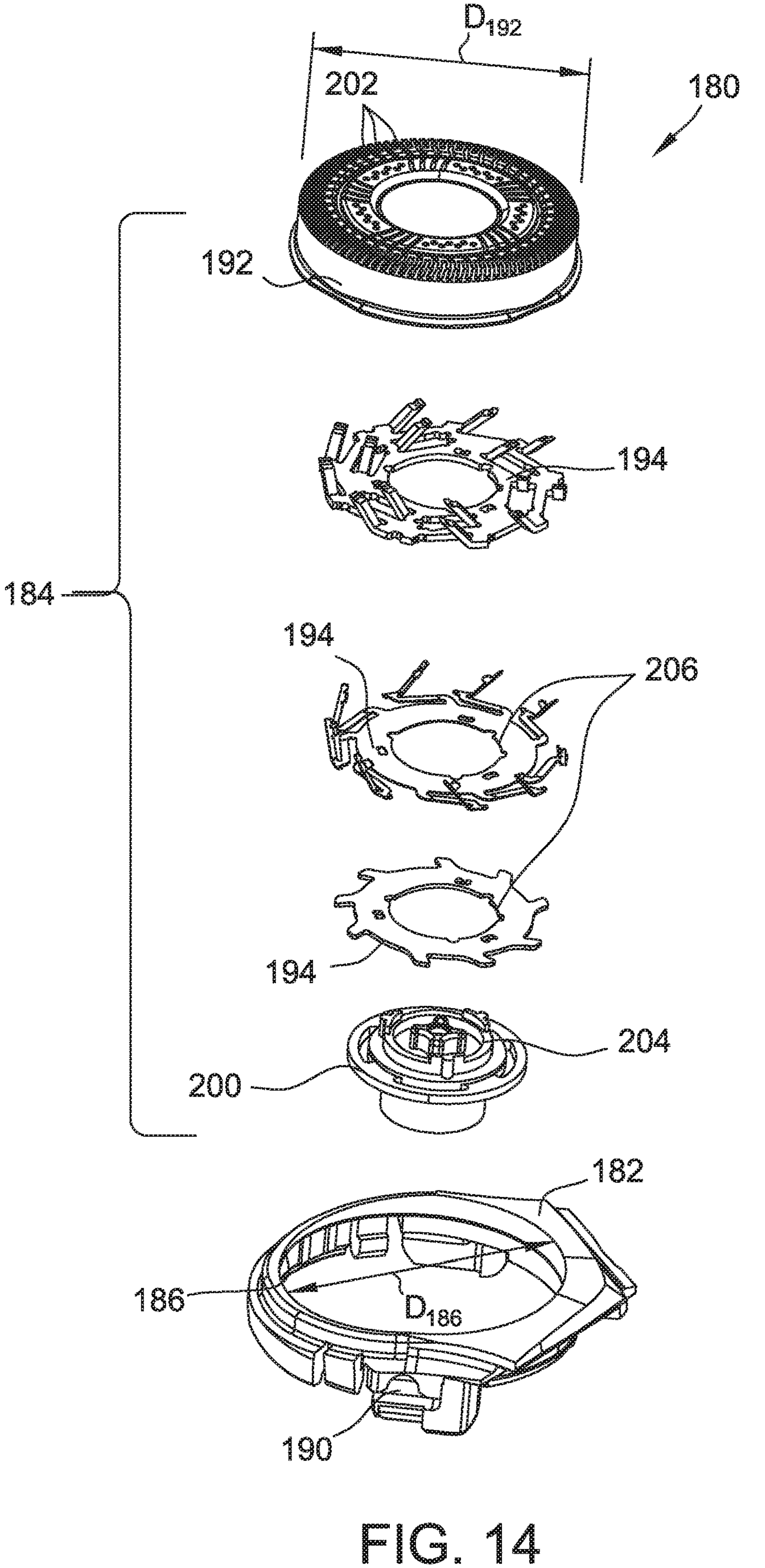
FIG. 14 is a perspective assembly view of a blade assembly of the electric grooming appliance shown in FIGS. 1-7.

Referring to FIGS. 13 and 14, the blade unit 184 includes a stationary blade 192, at least one moveable blade 194, and a blade coupling unit 200. The stationary blade 192 is circular and has a diameter of $D_{192}$. The moveable blades 194 and at least a portion of the blade coupling unit 200 are received within a cavity of the stationary blade 192. The diameter $D_{192}$ of the stationary blade 192 is substantially equal to the diameter $D_{186}$ such that the stationary blade 192 may fit within the opening 186 of the blade frame 182. The stationary blade 192 includes a plurality of perforations 202 formed thereon. The perforations 202 are sized and shaped such that a hair may pass through the stationary blade 192 and extend between the moveable blade 194 and the stationary blade 192. Hair disposed between the stationary blade 192 and the moveable blade 194 is cut as the moveable blade 194 rotates relative to the stationary blade 192. The blade assemblies 180 are arranged in an equilateral triangular pattern relative to the outer frame 178. The blade frames 182 are arranged such that there is sufficient clearance between adjacent blade assemblies 180 to allow each blade assembly 180 to flex with limited interference from an adjacent blade assembly 180. In alternative embodiments, the blade assemblies 180 may be arranged in any configuration which enables the cutting assembly 106 to perform as described herein. In some embodiments, the electric grooming appliance 100 may include one blade assembly 180 or a plurality of blade assemblies 180 arranged in any suitable manner.

The blade coupling unit 200 includes a mount 204 formed thereon. Each of the moveable blades 194 includes a central aperture 206. The central aperture 206 is sized and shaped to receive at least a portion of the mount 204 for coupling each of the moveable blades 194 to the blade coupling unit 200. The blade coupling unit 200 engages the moveable blades 194 such that rotation of the blade coupling unit 200 causes rotation of the moveable blade 194.

Referring again to FIGS. 12, in this illustrated embodiment, the cutting assembly 106 includes a casing 212. The casing 212 is supported by the outer frame 178 and at least partially surrounds each of the blade assemblies 180 and at least a portion of the blade frame 182. The casing 212 may cover the boundary between the blade assemblies 180 to prevent hair or other materials from becoming trapped between the blade assemblies 180 on the blade frame 182. The casing 212 may be made of a flexible and elastic material. Suitably, the casing 212 is able to stretch, bend, or flex along with the motion of the blade assemblies 180. The casing 212 is substantially smooth such that the casing 212 slides along a user's skin to reduce skin irritations and skin abrasion. The casing 212 has a coefficient of friction less than the coefficient of friction on the blade frame 182. For example, the casing 212 may be made from thermoplastic polyurethane (TPU). In alternative embodiments, the casing 212 is made from any suitable material, for example and without limitation, silicone.

Additionally, the casing 212 may include a coating to provide a desired surface characteristic for the casing 212. For example, the coating may decrease surface friction between the casing 212 and the skin and allow the cutting assembly 106 to glide smoothly along the skin of a user. In addition, the coating may increase the durability of the casing 212 and inhibit hair or debris from collecting on the casing 212. In alternative embodiments, the cutting assembly 106 may include other casings without departing from some aspects of the disclosure. In some embodiments, the casing 212 may be omitted.

Figure 15:
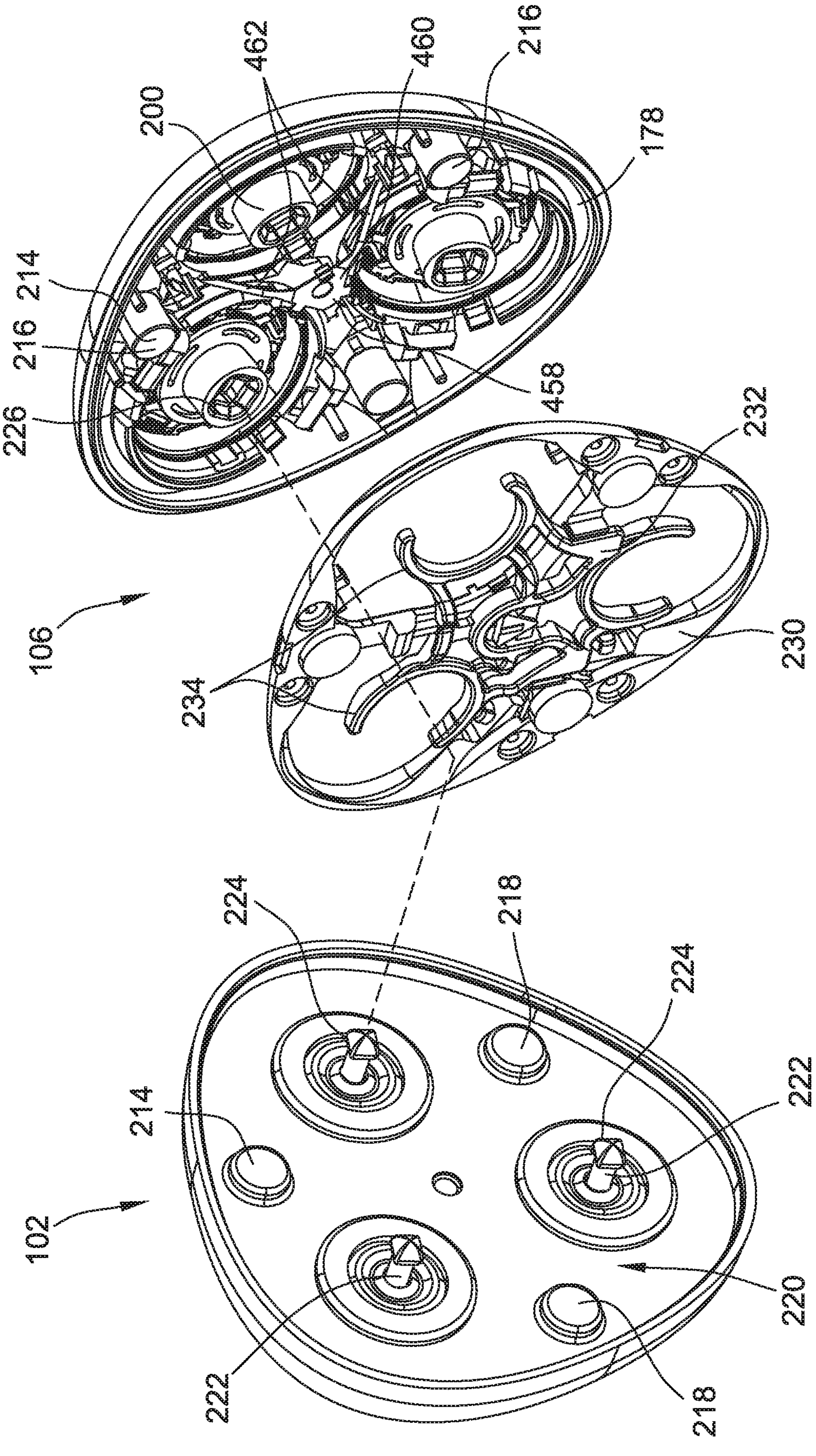
FIG. 15 is a perspective assembly view of a portion of the electric grooming appliance shown in FIGS. 1-7with the cutting assembly detached from the head of the electric grooming appliance.

Referring to FIG. 15, in this illustrated embodiment, the electric grooming appliance 100 includes a magnetic coupling 214 releasably attaching the cutting assembly 106 to the housing 161. The magnetic coupling 214 includes at least one first magnet 216 and at least one second magnet 218. The first magnets 216 are mounted to the cutting assembly 106 and the second magnets 218 are mounted to the housing 161. The second magnets 218 are located substantially near the perimeter of the housing 161 of the head 102 and extend substantially along the head axis 162. The first magnets 216 and the second magnets 218 are positioned to align with and attract each other to retain the cutting assembly 106 to the housing 161. The first magnets 216 and the second magnets 218 are arranged in a corresponding pattern such that each of the first magnets 216 has an opposing second magnet 218 for the first magnet 216 to magnetically engage.

Each of the first magnets 216 and the second magnets 218 includes a circular disc with a substantially planar surface. The substantially planar surfaces of the first magnets 216 are positioned within proximity to the planar surfaces of the second magnets 218 when the cutting assembly 106 is attached to the head 102. In alternative embodiments, the first magnets 216 and the second magnets 218 may directly contact each other. In alternative embodiments, the magnetic coupling 214 may be any type or shape that enables the magnetic coupling 214 to releasably attach the cutting assembly 106 to the head 102. For example, at least one of the first magnet 216 and/or the second magnet 218 may be attracted to a ferromagnetic material.

The magnetic coupling 214 provides an attractive force sufficient to retain the cutting assembly 106 to the housing 161 of the head 102 during a grooming operation. In addition, the magnetic coupling 214 is arranged to allow a user to selectively detach the cutting assembly 106 from the housing 161 when a user applies a detaching force to the cutting assembly 106. The detaching force is applied by a user in a direction substantially along the head axis 162 in a direction outward from the front plate 134. The detaching force is substantially greater than the grooming forces applied to the cutting assembly 106 during a grooming operation. Additionally, the detaching force is in a substantially different direction than the grooming force.

In other embodiments, the cutting assembly 106 may be attached to the housing 161 in any suitable manner. For example, in some embodiments, the electric grooming appliance 100 may include a hinge connecting the cutting assembly 106 to the housing 161.

In this illustrated embodiment, the head 102 and the cutting assembly 106 collectively define a hair pocket 220. The attachment of the cutting assembly 106 to the head 102 encloses the hair pocket 220. The hair pocket 220 is configured to capture and store hair that is cut during a grooming session. The selectively attached cutting assembly 106 allows a user to detach the cutting assembly 106 from the head 102 to expose the hair pocket 220 for cleaning. For example, the user may remove cut hair and debris from the hair pocket 220 as described in more detail later herein when the cutting assembly 106 is removed.

Referring again to FIG. 15-17, in this illustrated embodiment, the drive assembly 164 further includes a second drive shaft 222 for each blade assembly 180. Each of the second drive shafts 222 includes a stem 222*a*, a base 222*b*, and a bit 224. The bit 224 is substantially cubic in shape. The second drive shaft 222 further includes at least one tab 222*d* that extends outward from the base 222*b*. Each of the second drive shafts 222 extends outward from within the housing 161 toward the cutting assembly 106. The drive assembly 164 includes the drive train 172 that transfers reciprocation of the electric motor 166 into driving movement of each of the second drive shafts 222 which are rotationally coupled to the cutting assembly 106 during operation of the electric grooming appliance 100 (shown in FIG. 15).

The blade coupling unit 200 has an opening 226 defined thereon. The opening 226 is substantially cuboidal in shape (shown in FIG. 15).The opening 226 is sized and shaped to receive at least a portion of the bit 224. The bit 224 is at least partially engaged with the blade coupling unit 200 such that each of the second drive shafts 222 is rotationally coupled with one of the blade coupling units 200. Rotation of the second drive shaft 222 causes rotation of the blade coupling unit 200 which further cause rotation of at least one of the moveable blades 194. The blade coupling unit 200 may flex and extend relative to the second drive shaft 222.

The head 102 is arranged to align and guide the blade coupling unit 200 into operative alignment with the second drive shaft 222 when the cutting assembly 106 is attached to the housing 161. More specifically, each of the bits 224 is arranged to press fit into a corresponding one of the openings 226 when the cutting assembly 106 is secured to the housing 161. The electric grooming appliance 100 may include one or more alignment features, for example and without limitation, clips or grooves that engage the cutting assembly and the housing 161 and guide the blade coupling unit 200 into operative alignment with the second drive shaft 222.

Referring now to FIG. 15, the electric grooming appliance 100 includes a base frame 230 and a clip 232. The clip 232 includes a plurality of semicircular prongs 234 defining apertures sized and shaped to receive at least a portion of the blade coupling unit 200. The semicircular prongs 234 are at least partially in contact with the base frame and the blade coupling units 200, and the clip 232 retains the cutting assembly 106 in position relative to the base frame 230. The clip 232 is displaceable relative to the base frame 230 to release the cutting assembly 106 from the base frame 230.

Figure 16:
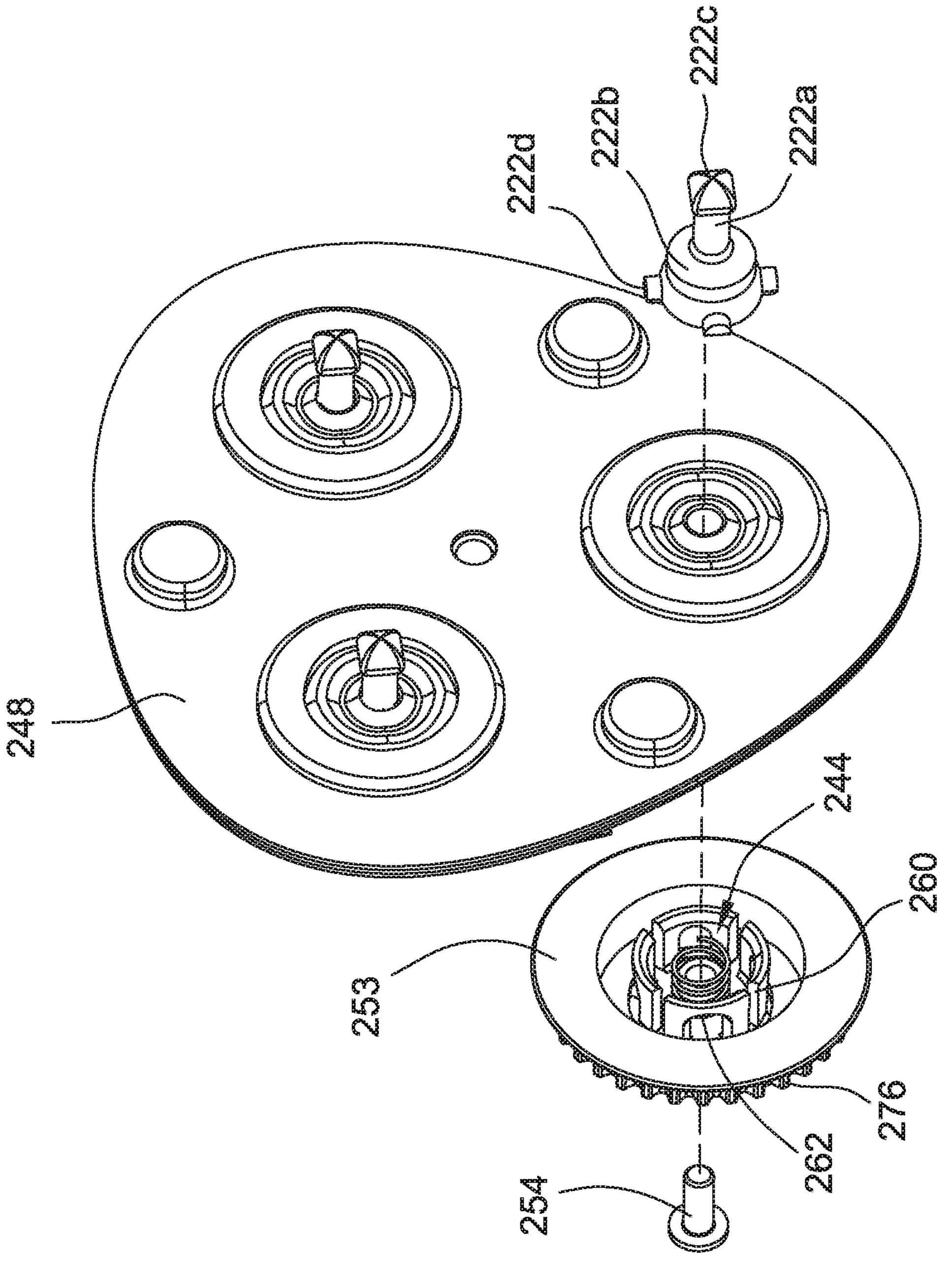
FIG. 16 is an assembly view of a portion of the electric grooming appliance shown in FIGS. 1-7, the electric grooming appliance including a second drive shaft, a follower unit, and an alignment plate.

Referring now to FIG. 16, each of the follower units 210, 272 is mounted axially on a pin 254 and the follower units 210 may rotate about the pin 254. The pin 254 is mounted to an alignment plate 248. The alignment plate 248 is mounted to the housing 161 (shown in FIG. 15).

Figure 17:
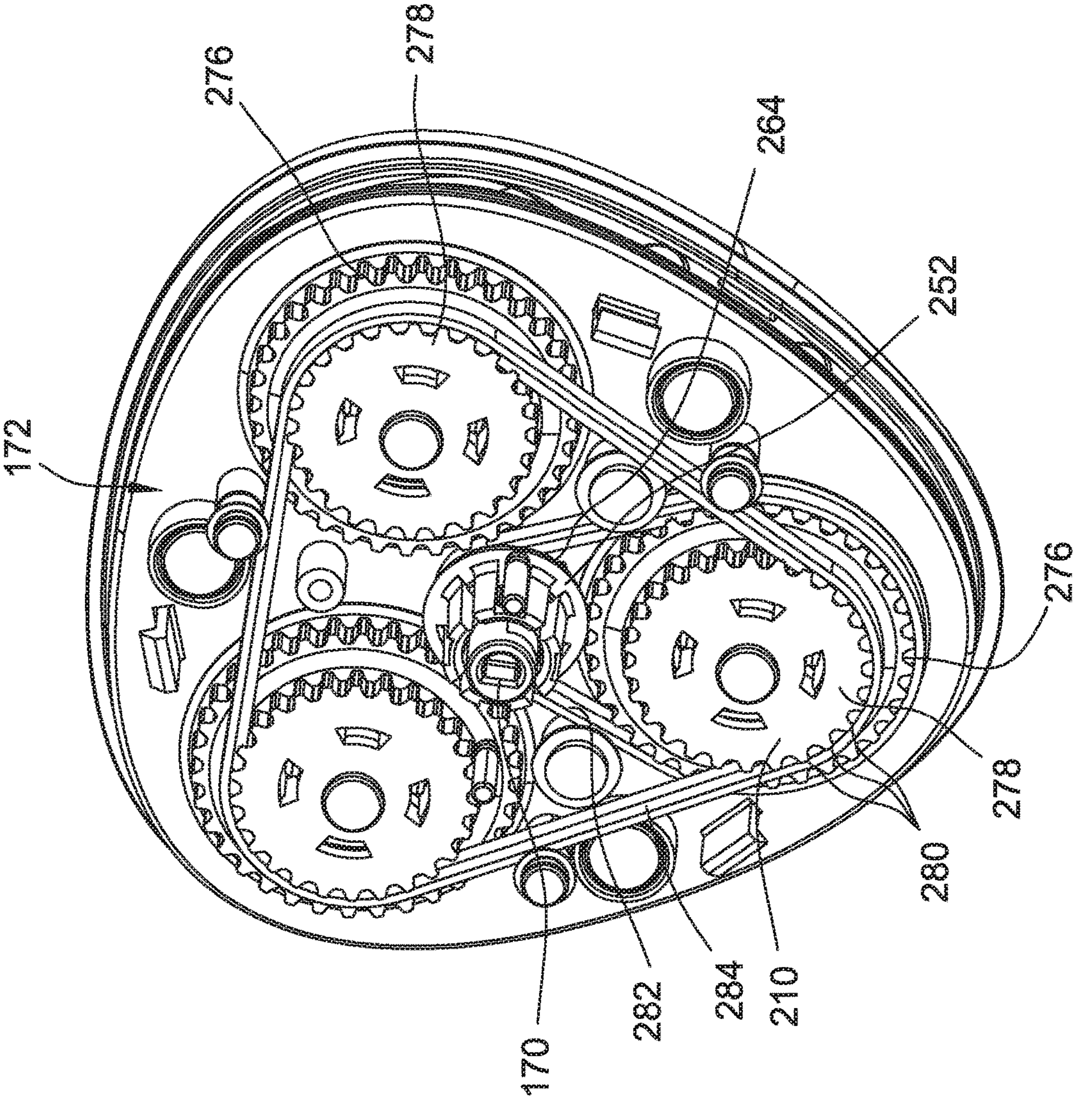
FIG. 17 is a back view of a portion of the electric grooming appliance shown in FIGS. 1-7, the electric grooming appliance including a drive train.
Figure 18:
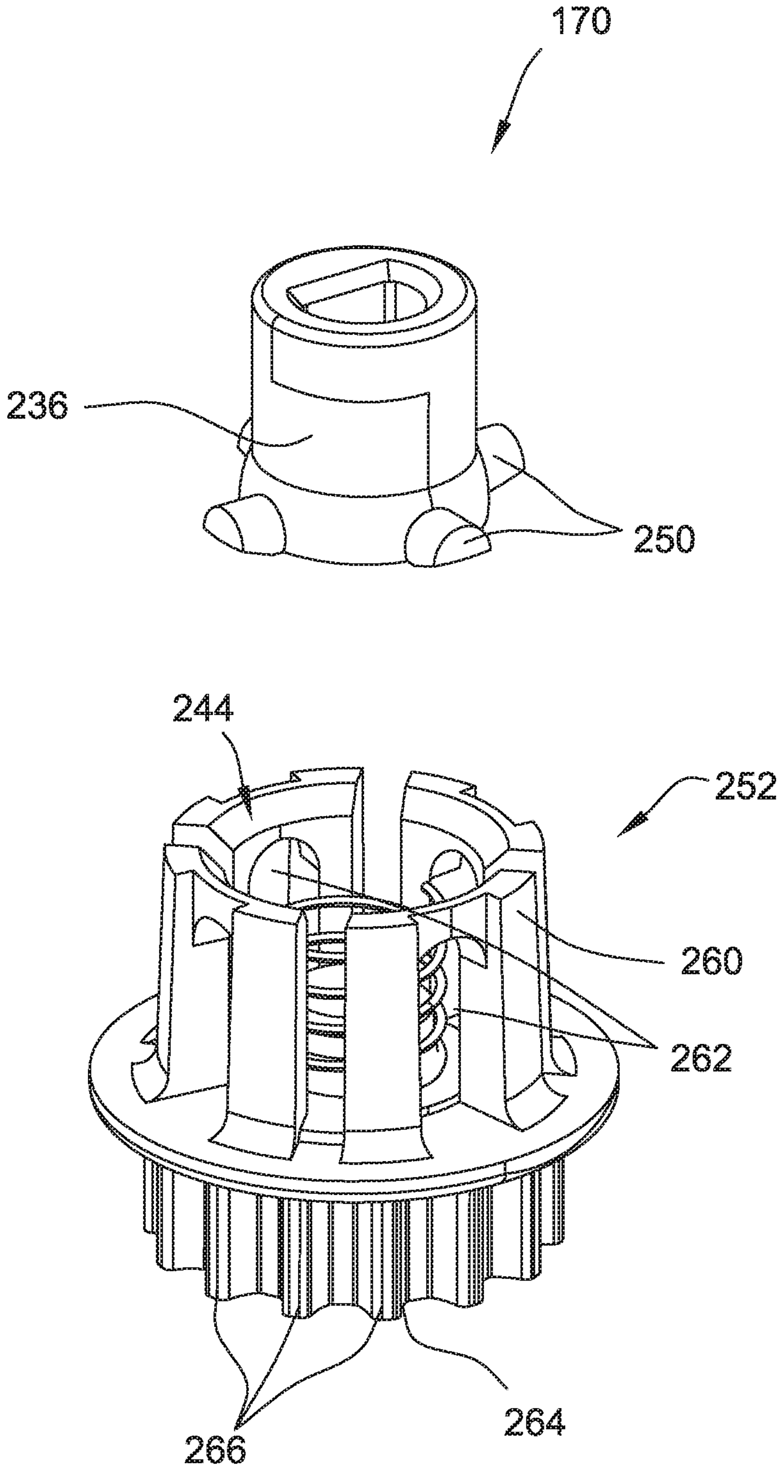
FIG. 18 is a perspective assembly view of a drive unit and a first coupling unit of a first drive system of the electric grooming appliance shown in FIGS. 1-7.
Figure 19:
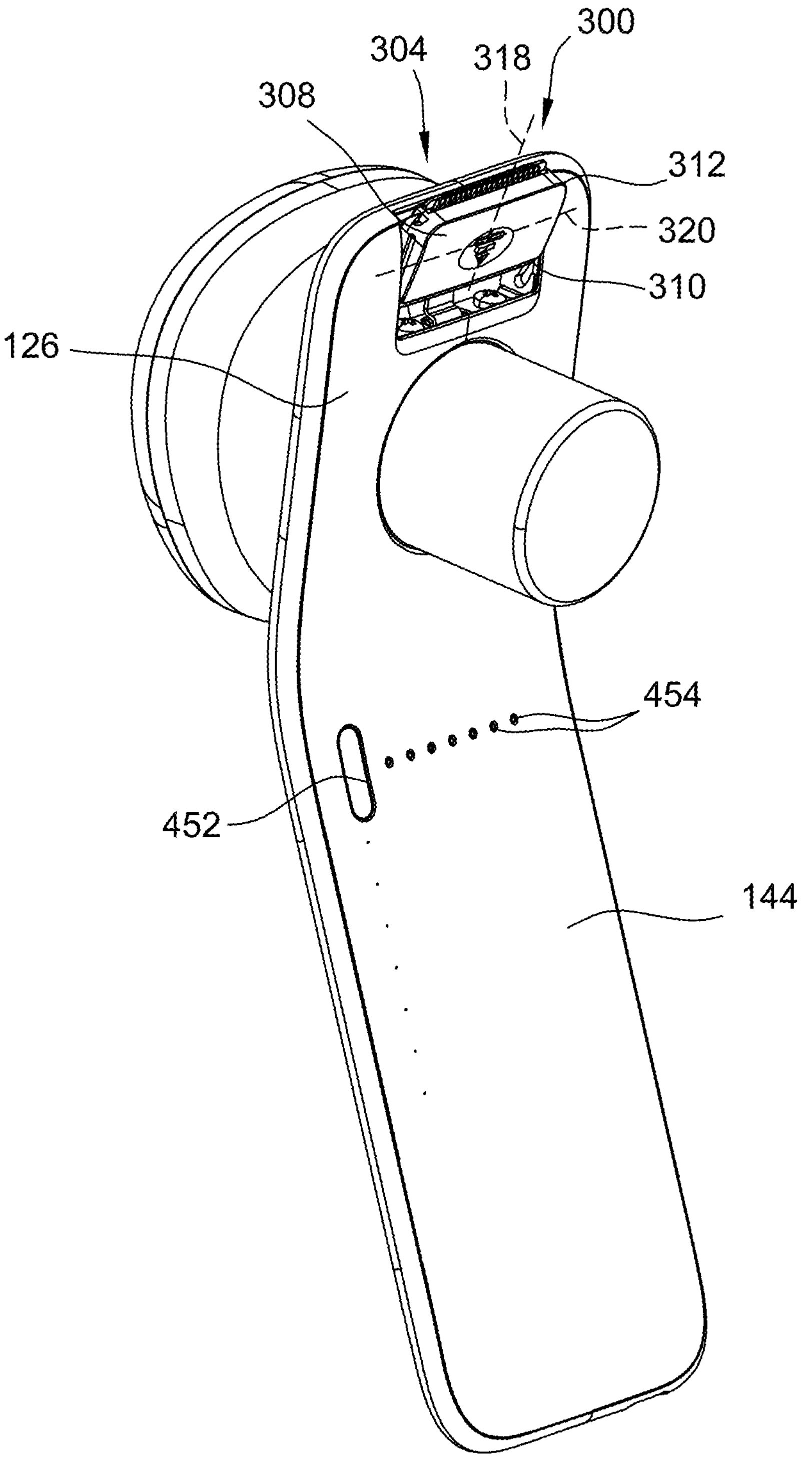
FIG. 19 is a back perspective view of the electric grooming appliance shown in FIGS. 1-7, the electric grooming appliance including the trimmer assembly arranged in an operative position.
Figure 20:
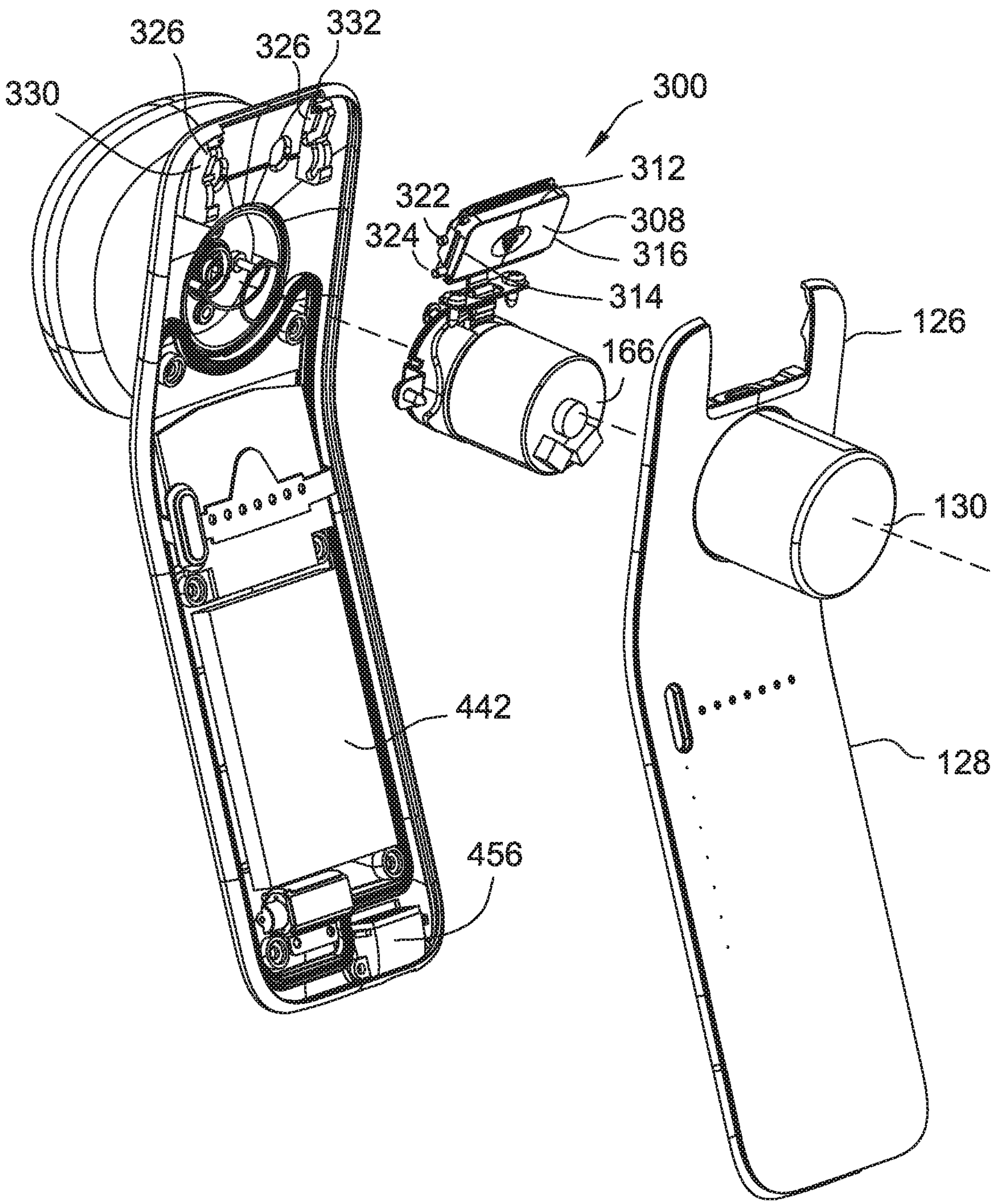
FIG. 20 is an assembly view of the electric grooming appliance the electric grooming appliance shown in FIGS. 1-7, the electric grooming appliance including the trimmer assembly shown in FIG. 19 and a biasing member that biases the trimmer assembly to the operative position.
Figure 21:
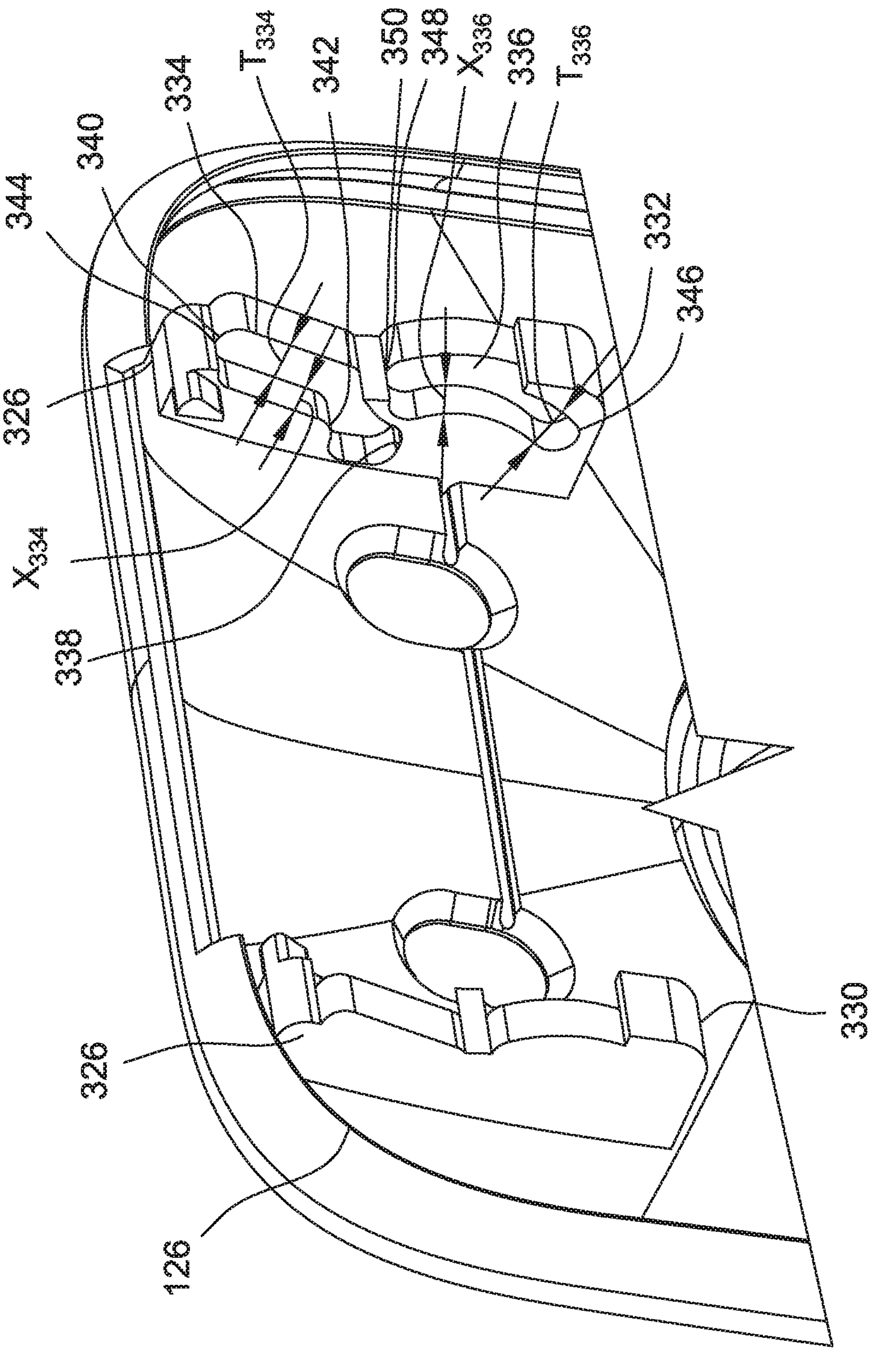
FIG. 21 is an enlarged perspective view of a portion of the housing of the electric grooming appliance shown in FIGS. 1-7, the electric grooming appliance including a bracket to receive the trimmer assembly shown in FIGS. 19 and 20.

Referring now to FIGS. 16-18, the drive train 172 includes a first coupling unit 170 coupling the first drive shaft 168 to the drive train 172. The first coupling unit 170 further includes a body 236 and tabs 250 which protrude from the body 236 of the first coupling unit 170 (shown in FIG. 18). The drive train 172 further includes a drive unit 252 and three follower units 210, 272. The follower units 210, 272 are arranged in an equilateral triangular pattern. The follower units 210, 272 include a first follower unit 210 and a plurality of second follower units 272. The drive unit 252 includes a shell 260 that defines a cavity 244.

At least one slot 262 is defined on the shell 260. The shell 260 of the drive unit 252 is sized and shaped to receive at least a portion of the body 236 of the first coupling unit 170, and at least one tab 250 is sized and shaped to fit within the slots 262. The drive unit 252 is at least partially engaged with the first coupling unit 170 such that the first coupling unit 170 is rotationally coupled to the drive unit 252. Rotation of the first drive shaft 168 causes rotation of the first coupling unit 170. In alternative embodiments, the first coupling unit 170 may be coupled to the drive unit 252 in any manner which enables the electric grooming appliance 100 to function as described herein. The drive unit 252 includes a drive gear 264. The drive gear 264 includes a plurality of teeth 266 formed thereon.

Each follower unit 210, 272 includes a shell 260 that defines a cavity 244. At least one slot 262 is defined on the shell 260. The cavity 244 of the follower units 210, 272 is sized and shaped to receive at least a portion of the base **222*b* of the second drive shaft 222. At least one tab 222*d* of the second drive shaft 222 is sized and shaped to fit within the slot 262**.

The follower unit 253 includes a first gear 276 and a second gear 278. Both the first gear 276 and the second gear 278 include a plurality of teeth 280 formed thereon. The follower units 210 engage the second drive shafts 222 such that the each of the follower units 210 is coupled to one of the second drive shafts 222. The first gear 276 of the first follower unit 210 is connected to the drive gear 264 by a first belt 282. The first belt 282 is flexible and sized such the first belt 282 wraps around the perimeter of the first gear 276 and the perimeter of the drive gear 264. The first belt 282 transfers the rotational motion of the drive gear 264 to the first gear 276 which causes the first follower unit 210 to rotate. The first follower unit 210 is connected to the second follower units 272 by a second belt 284. The second belt 284 is substantially triangular in shape, such that at least a portion of the second belt 284 wraps around the perimeter of the second gear 278 of the first follower unit 210 and the second gears 278 of the second follower units 272.

In this illustrated embodiment, the first follower unit 210 and both of the second follower units 272 are substantially equal in shape and size. In alternative embodiments, the follower units 210, 272 may be any form which enables the electric grooming appliance 100 to function as described herein. For example, the follower units 210, 272 may include a single gear.

Referring to FIGS. 19- 27, in this illustrated embodiment, the electric grooming appliance 100 includes a trimmer assembly 300 attached to the planar portion 126 by a trimmer bracket 326. The trimmer assembly 300 may be selectively positioned between an operative position 304 (shown in FIG. 19) and a stored position 306 (shown in FIG. 4). In the stowed position 306, the trimmer assembly 300 does not protrude or extend outward from the planar portion 126 of the electric grooming appliance 100 and at least a portion of the trimmer assembly 300 is contained within the planar portion 126. In the operative position 304, at least a portion of the trimmer assembly 300 extends outward from the planar portion 126 beyond an edge of the planar portion 126 and is exposed for performing a grooming operation.

The trimmer assembly 300 includes a trimmer housing 308 including a first end 310, a second end 312, a first side 314, and a second side 316. A trimmer longitudinal axis 318 extends from the first end 310 to the second end 312. The trimmer longitudinal axis 318 is substantially parallel to the axis 132. A transverse trimmer axis 320 extends from the first side 314 to the second side 316 and is perpendicular to the trimmer longitudinal axis 318. The first side 314 and the second side 316 extend between the first end 310 and the second end 312 and in a direction parallel to the trimmer longitudinal axis 318. The first end 310 and the second end 312 are parallel to the transverse trimmer axis 320. Accordingly, the trimmer housing 308 is a rectangular cuboid.

The trimmer housing 308 includes at least one first pin 322 and at least one second pin 324. The first and second pins 322, 324 extend from the sides 314, 316. Specifically, one first pin 322 and one second pin 324 extend from the first side 314 and one first pin 322 and one second pin 324 extend from the second side 316. The first pins 322 and the second pins 324 are substantially cylindrical in shape. The first pins 322 have a diameter of $T_{322}$ and a length $X_{322}$ (not shown). The second pins 324 have a diameter $T_{324}$ and a length $X_{324}$ (not shown).

The planar portion 126 includes a trimmer bracket 326 extending from the back plate 136. The trimmer bracket 326 is sized and shaped to receive and support the trimmer housing 308. The trimmer bracket 326 includes a first wall 330 and a second wall 332. The first wall 330 and the second wall 332 are spaced apart to allow the trimmer housing 308 to fit between the walls 330, 332. The first wall 330 and the second wall 332 each include a first channel 334 and a second channel 336 formed thereon and configured to receive the first and second pins 322, 324. The first pins 322 on the first side 314 of the trimmer assembly 300 are aligned with the first channel 334 on the first wall 330 and the second pins 324 on the first side 314 of the trimmer assembly 300 are aligned with the second channel 336 on the first wall 330. In addition, the first pins 322 on the second side 316 are aligned with the first channel 334 on the second wall 332 and the second pins 324 on the second side 316 are aligned with the second channel 336 on the second wall 332

The first channel 334 includes a first end 338, a second end 340, a locking feature 342, and the stopping feature 344. The stopping feature 344 is substantially near the second end 340. The first channel 334 has a width of $T_{334}$ and a depth of $X_{334}$. The first channel 334 is sized and shaped such that the first pin 322 may fit within the first channel 334 and the first pin 322 may move along the first channel 334 from the first end 338 to the second end 340. The second channel 336 includes a first end 346, a second end 348, and a second stopping feature 350. The second stopping feature 350 is substantially near the second end 348. The second channel 336 has a width of $T_{336}$, a depth of $X_{336}$. The second channel 336 is sized and shaped such that the second pin 324 may fit within the second channel 336 and the second pin 324 may move along the first channel 334 from the first end 346 to the second end 348.

The electric grooming appliance 100 includes a biasing member 352 (shown in FIG. 20) positioned between the trimmer assembly 300 and at least one of the planar portion 126 and the trimmer bracket 326. The biasing member 352 may have a first configuration when the trimmer assembly 300 is in the stored position 306 and a second configuration when the trimmer assembly is in the operational position 304. The biasing member 352 includes a first end 354 and a second end 356. The first end 354 may be engaged with at least one of the planar portion 126 and/or the trimmer bracket 326. The second end 356 is engaged with the trimmer assembly 300. In this illustrated embodiment, the biasing member 352 is a spring mechanism including a coil 358. In the stored position 306, the first pins 322 are engaged with the locking feature 342 retaining the trimmer assembly 300 in the stored position 306 and the biasing member 352 in the first configuration. The biasing member 352 is compressed when the trimmer assembly 300 is in the stored position 306 and stores potential energy. The biasing member 352 moves to the second configuration and releases the stored potential energy when the trimmer assembly 300 is released and the biasing member 352 provides a bias force to transition the trimmer assembly 300 into the operative position 304. In the second configuration, the second end 356 applies a biasing force to the trimmer assembly 300, pushing the trimmer assembly 300 outwards from the planar portion 126 and/or the trimmer bracket 326.

A user may selectively position the trimmer assembly 300 from the stored position 306 to the operative position 304 by applying a first force to the trimmer housing 308. The first force may be applied on the trimmer housing 308 in a direction substantially perpendicular to the back plate 136 and towards the front plate 134. The first force causes the first pins 322 to become disengaged from the locking features 342 in the first channels 334. When the first pins 322 are disengaged from the locking features 342, the biasing member 352 releases the stored energy and transitions from the first configuration to the second configuration. The biasing member 352 biases the trimmer assembly toward the operative position 304. As the trimmer assembly 300 transitions to the operative position 304, the first pins 322 travel along the first channel 334 and the first pins 322 move from the locking feature 342 to the second end 340 and the second pins 324 travel along the second channel 336 from the first end 346 to the second end 348. The trimmer assembly 300 is in the operative position 304 when the first pins 322 are engaged with the locking feature 342 and the second pins 324 are engaged with the second stopping feature 350.

When in the operative position 304, the trimmer assembly 300 is suitably distanced from the cutting assembly 106 and the handle 128 such that a grooming operation performed by the trimmer assembly 300 is unimpeded by the cutting assembly 106 and the hands of a user. The first channel 334 and second channel 336 are curved such that movement of the first pin 322 and second pin 324 along the respective first and second channels, 334, 336 causes the trimmer assembly 300 to move in at least two directions relative to the planar portion 126. Specifically, as the first and second pins 322, 324 move along the channels 334, 336, the trimmer assembly 300 moves in a direction parallel to the axis 132 and in a direction away from the back plate 136 along a direction substantially perpendicular to the axis 132. When the pins 322, 324 engage the stopping features 344, 350, the trimmer assembly 300 is secured in position and extends beyond the first end 108. The shape of the channels 334, 336 retains the trimmer assembly 300 in the operative position 304 to prevent the trimmer assembly 300 from being inadvertently displaced during a grooming operation. Further, the trimmer assembly 300 is at least partially supported in the operative position 304 by the biasing member 352 and the stopping features 344, 350.

A user may apply a force to the trimmer assembly 300 greater than the force of the biasing member 352 to switch the trimmer assembly 300 from the operative position 304 to the stored position 306. The second force may be directed substantially perpendicular to the axis 132 and directed from the back plate 136 to the front plate 134. The force causes the first pins 322 to move along the first channel 334 until the pins 322 engage with the locking feature 342. The trimmer assembly 300 compresses the biasing member 352 and causes the biasing member 352 to switch to the first configuration.

Referring to FIGS. 22-27, the trimmer assembly includes a blade assembly 362. The blade assembly 362 includes a plate 364, a first blade 366, a second blade 368, and a blade bracket 370. The plate 364 is substantially flat and is connected to the first blade 366 and to the trimmer housing 308 by a pair of screws 372. The first blade 366 and the plate 364 are connected in any manner that enables the trimmer assembly 300 to function as described herein. For example, and without limitation, the first blade 366 may be welded or screwed to the plate 364.

The first blade 366 includes a plurality of teeth 374. The second blade 368 includes a plurality of teeth 376. The second blade 368 is disposed between the first blade 366 and the trimmer housing 308, generating a clamping force on the second blade 368, such that the teeth 374, 376 are in shearing engagement and cut hairs that extend therebetween. The second blade 368 and the first blade 366 are in sliding contact and the second blade 368 may translate relative to the first blade 366 along the transverse trimmer axis 320. In alternative embodiments, the first blade 366 and the second blade 368 may include alignment features, for example and without limitation, grooves or rails or any structure that may assist in the alignment and translation of the second blade 368 relative to the first blade 366.

The blade bracket 370 supports the second blade 368 and allows movement of the second blade 368 relative to the first blade 366. The blade bracket 370 is configured to engage a trimmer drive train 378 which drives movement of the second blade 368 via the blade bracket 370. The blade bracket 370 includes a body 380, a stem 382, and a distal end 384. A pair of tabs 386 spaced apart by a distance of $T_{370}$ extends from the stem 382 at the distal end 384. The second blade 368 is coupled to the body 380 of the blade bracket 370. The second blade 368 and the body 380 may be connected by, for example and without limitation, using welding, screws, press fits, etc.

Figure 22:
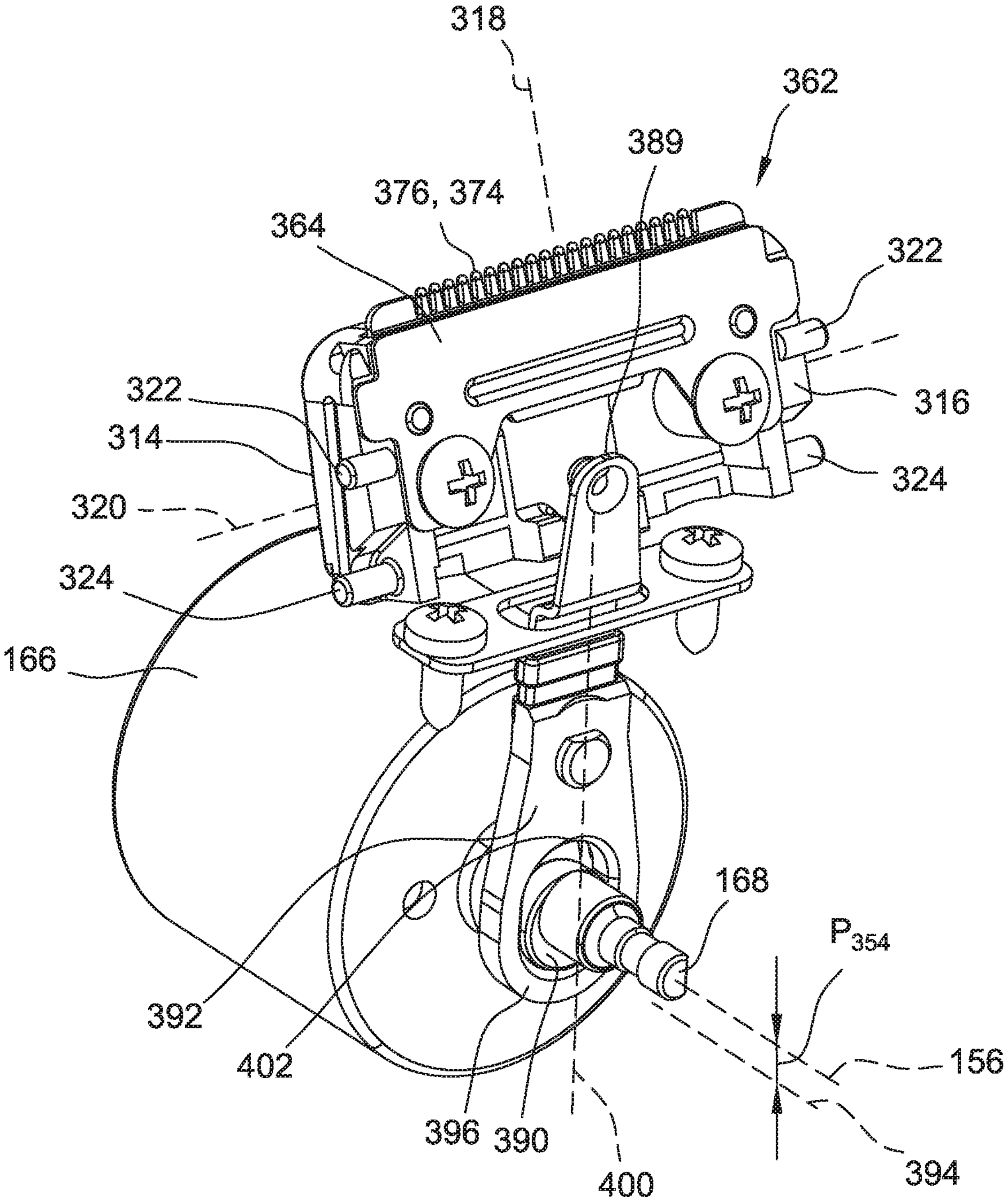
FIG. 22 is a perspective view of a portion of the electric grooming appliance shown in FIGS. 1-7, the electric grooming appliance including the trimmer assembly and a drive system coupled to the trimmer assembly, the trimmer assembly is in the stowed position.
Figure 23:
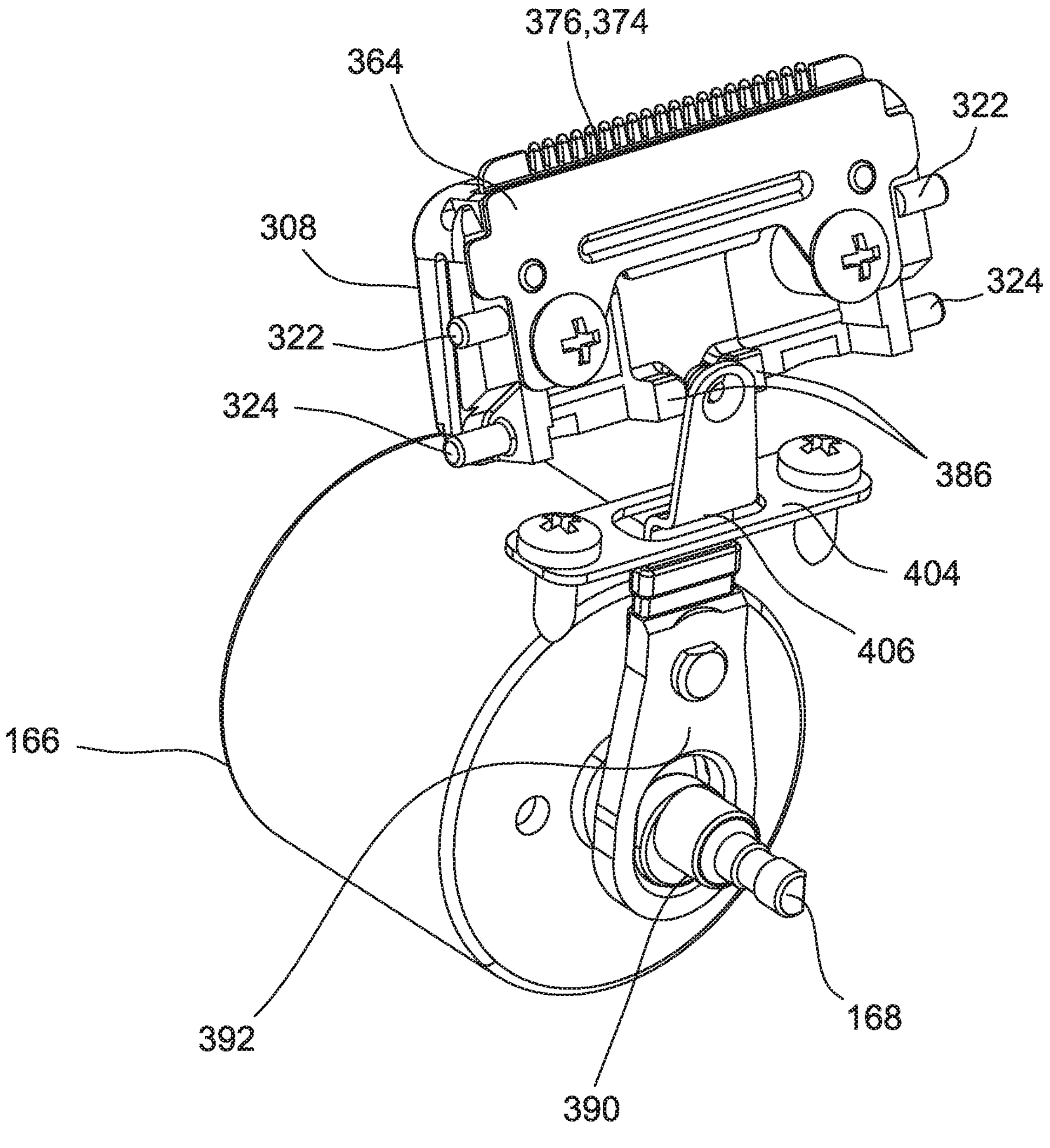
FIG. 23 is a perspective view of a portion of the electric grooming appliance shown in FIGS. 1-7, the electric grooming appliance including the trimmer assembly and a drive system coupled to the trimmer assembly, the trimmer assembly is in the operative position.
Figure 24:
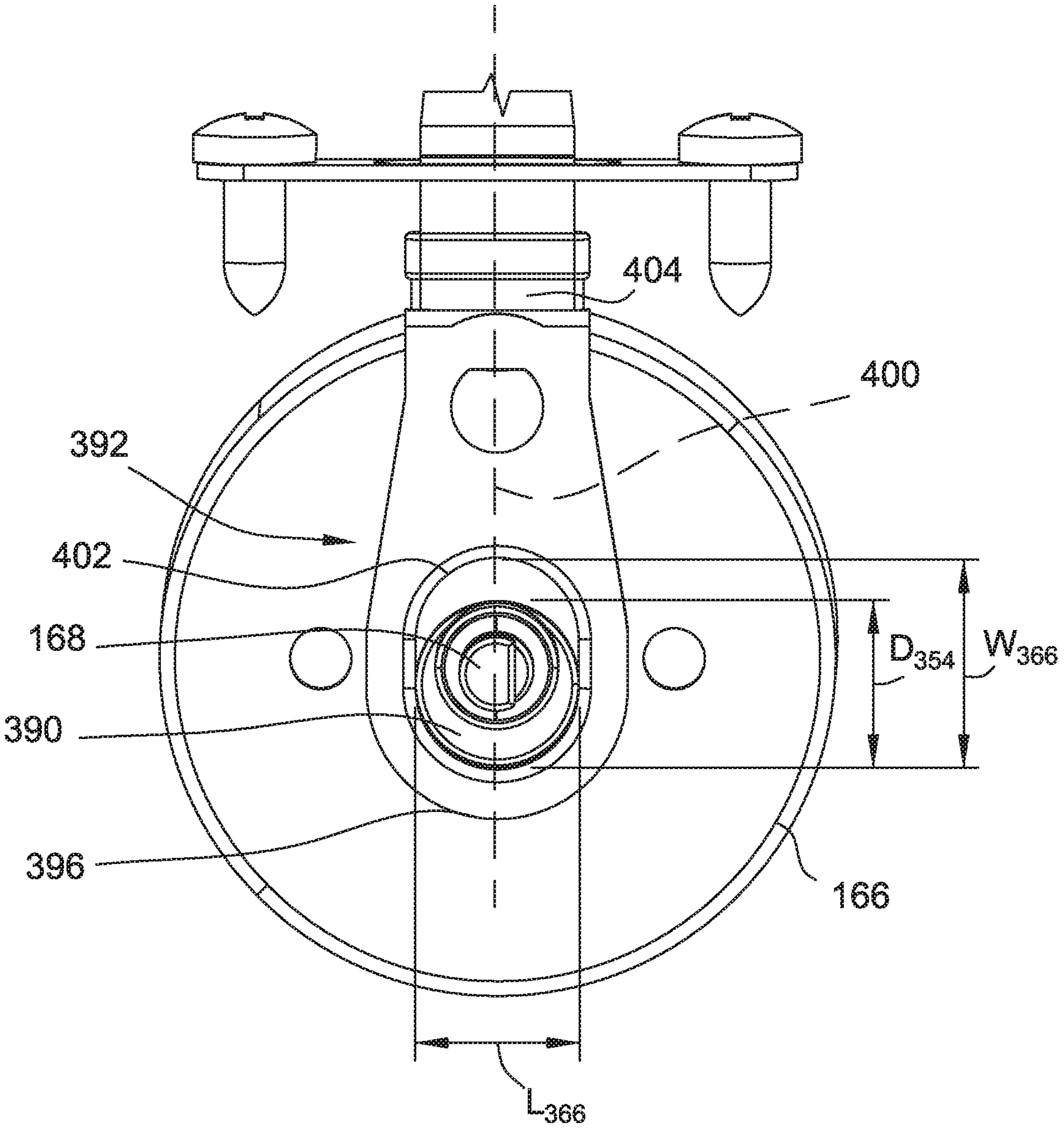
FIG. 24 is an front view of the trimmer assembly and drive system shown in FIGS. 22 and 23 with the drive system in a first position.

Referring in particular to FIG. 22, the electric grooming appliance 100 includes the trimmer drive train 388 coupled to the first drive shaft 168. In the stowed position 306, the trimmer drive train 388 is disengaged from the trimmer assembly 300. In the operative position 304, the trimmer assembly 300 is operatively engaged with the trimmer drive train 388. The trimmer drive train 388 includes a trimmer cam 390 and a trimmer follower 392. The trimmer cam 390 is mounted to the first drive shaft 168 which is coupled to the electric motor 166, such that rotation of the first drive shaft 168 causes the trimmer cam 390 to rotate. The trimmer cam 390 may be substantially cylindrical in shape and includes a center axis 394 and a diameter $D_{390}$. The trimmer cam 390 is connected to the first drive shaft 168 such that the trimmer cam 390 rotates about the motor housing axis 156. The motor housing axis 156 is parallel to the center axis 394 and is offset from the center axis 394 by a distance $P_{394}$ defined from the center axis 394 to the motor housing axis 156.

The trimmer follower 392 includes a first follower end 396 and a second follower end 398 and a follower axis 400 extending therebetween. The first follower end 396 includes an aperture 402 defining an opening on the trimmer follower 392. The aperture 402 is substantially oblong in shape and has a length $L_{402}$ and a width $W_{402}$. The length $L_{402}$ is defined along the follower axis 400. The width $W_{402}$ is greater than the diameter $D_{390}$. The length $L_{402}$ is substantially greater than the width $W_{402}$. The aperture 402 is shaped such that the trimmer cam 390 may fit within the aperture 402. Rotation of the trimmer cam 390 about the motor housing axis 156 causes the trimmer cam 390 to be arranged between at least two positions, a contact position (shown in FIG. 25) and a neutral position (shown in FIG. 24). In the contact position the trimmer cam 390 is rotated about the motor housing axis 156 such that at least a portion of the trimmer cam 390 is in contact with the boundary of the aperture 402, such that the trimmer cam 390 applies a force on the trimmer follower 392. This contact between the trimmer cam 390 and the trimmer follower 392 causes the trimmer follower 392 to translate along the transverse trimmer axis. In the neutral positon, the trimmer cam 390 is not applying a significant force to the trimmer follower 392 such that the trimmer cam 390 does not cause the trimmer follower 392 to translate.

Figure 25:
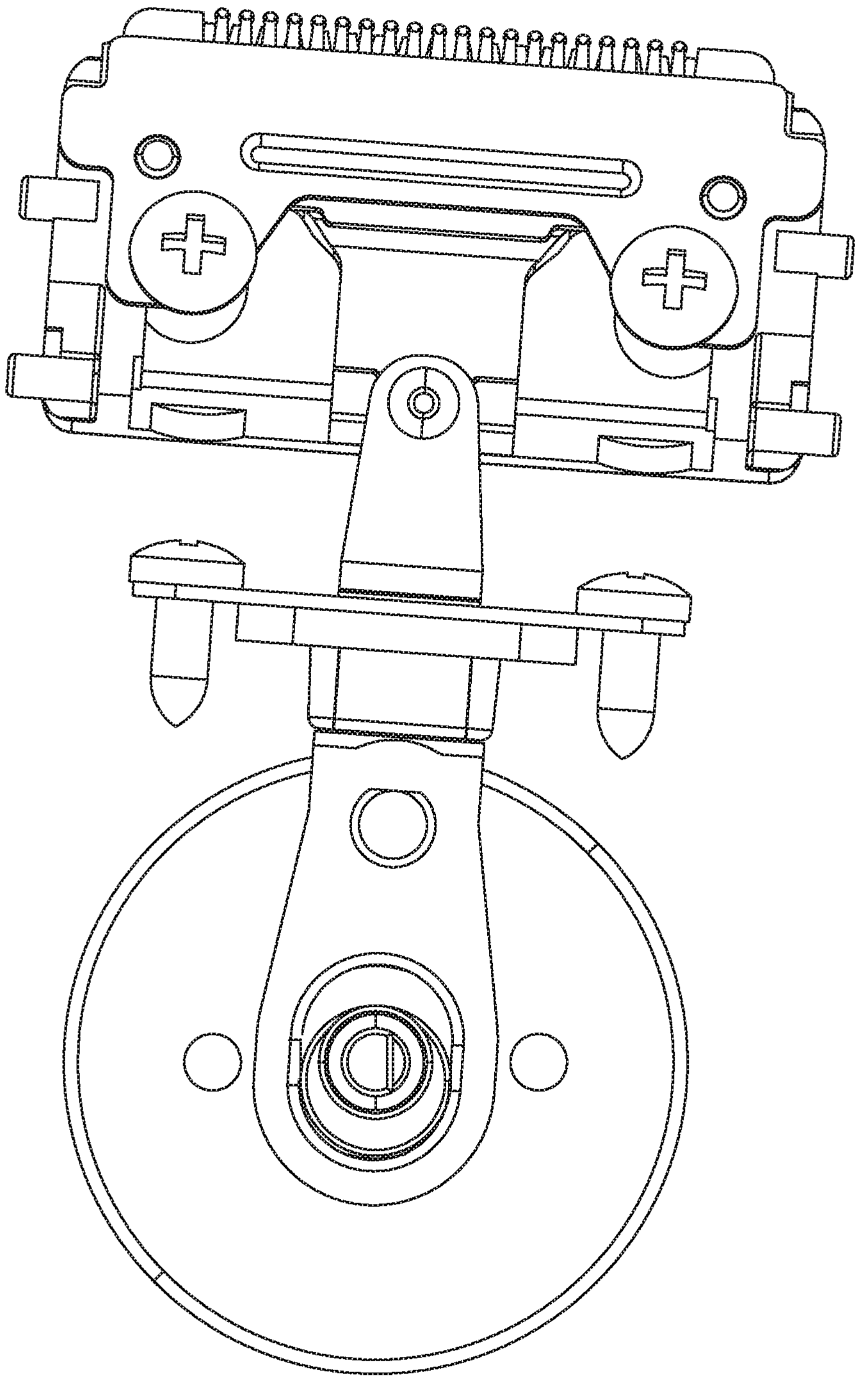
FIG. 25 is a front view of the trimmer assembly and drive system shown in FIGS. 22 and 23 with the drive system in a second position.
Figure 26:
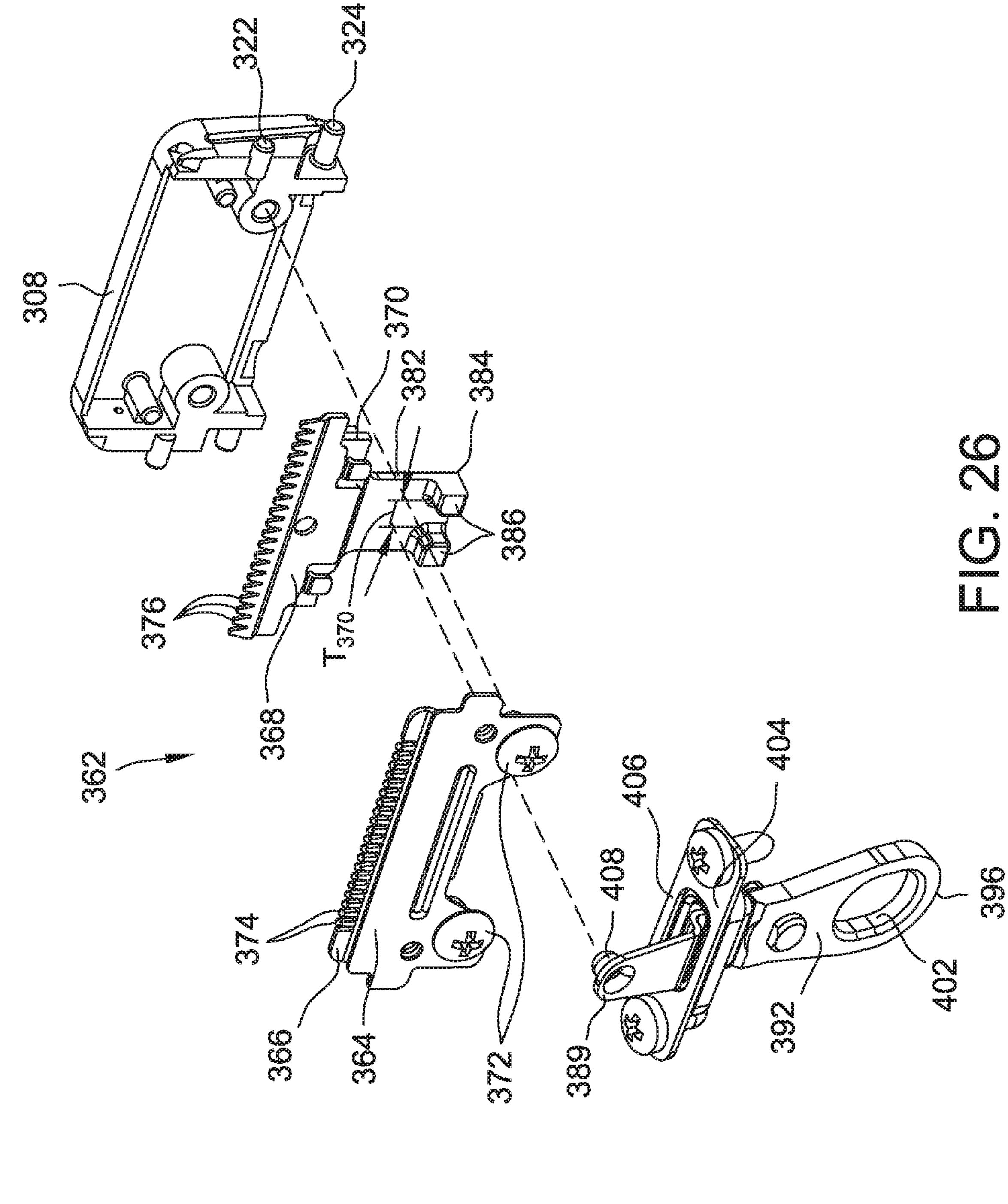
FIG. 26 is a perspective assembly view of the trimmer assembly of the electric grooming appliance shown in FIGS. 1-7.
Figure 27:
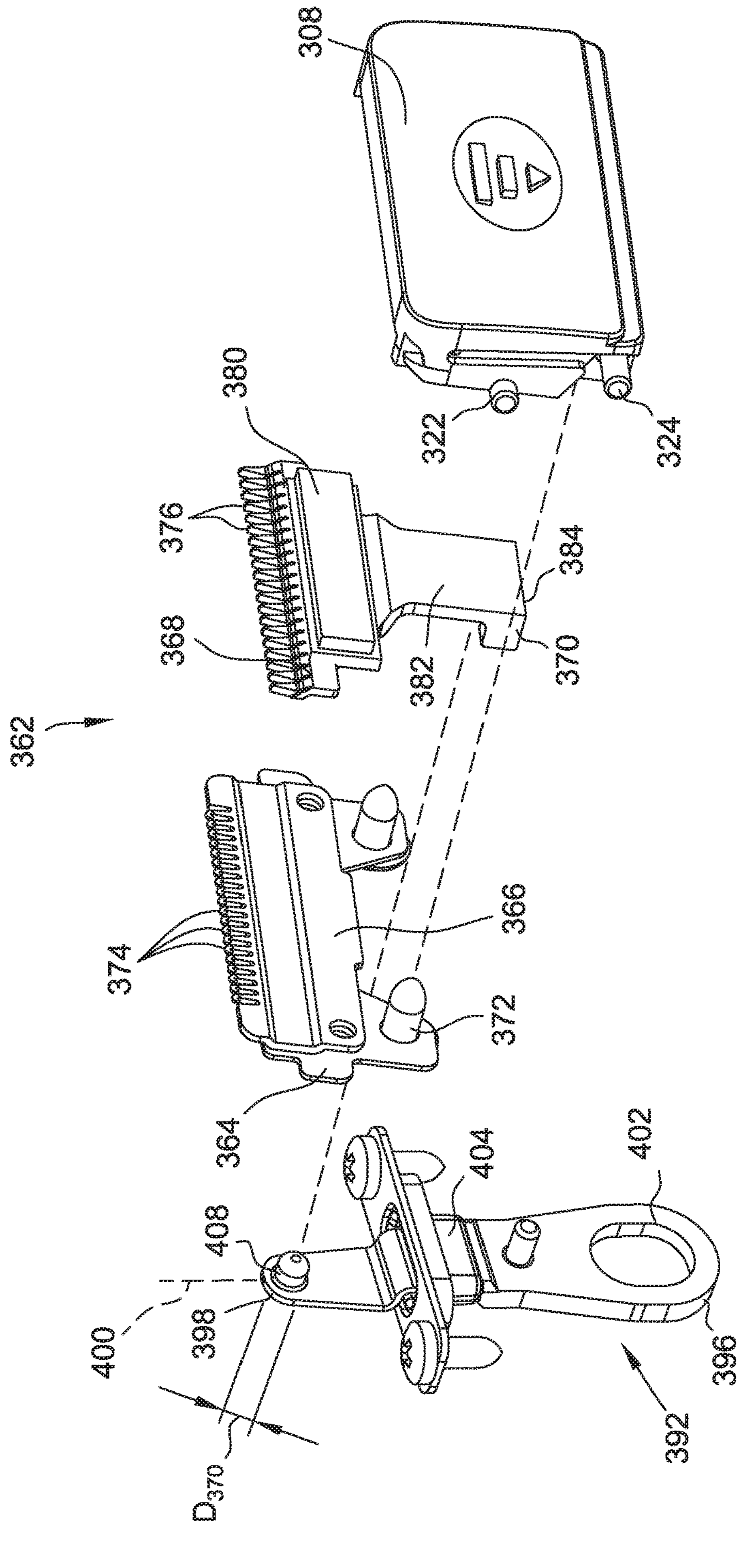
FIG. 27 is a front perspective assembly view of the trimmer assembly of the electric grooming appliance shown in FIGS. 1-7.

Referring to FIGS. 25 and 26, the trimmer follower 392 may be supported by a follower bracket 404 and includes a knob 408. The follower bracket 404 is attached to the back plate 136 and includes a slot 406. The slot 406 is sized and shaped such that at least apportion of the trimmer follower 392 may pass through the slot with limited clearance. The knob 408 extends outward from the trimmer follower 392 near a second end 389. The knob 408 is substantially cylindrical and has a diameter $D_{408}$ (not shown). The knob 408 is sized and shaped to fit between the pair of tabs 386 when the trimmer assembly 300 is in the operative position 304 (shown in FIG. 25). In the stored position 306 (shown in FIG. 22), the knob 408 is substantially spaced from the tabs 386 such that oscillating motion of the trimmer follower 392 does not cause contact between the tabs 386 and the knob 408. When the trimmer assembly 300 is positioned in the operative position 304, the blade assembly 362 is positioned such that the knob 408 is received between the tabs 386 and oscillating motion of the trimmer follower 392 causes contact between the knob 408 and tabs 386. The tabs 386 transmit the oscillating motion of the trimmer follower 392 to translational motion of the second blade 368 relative to the first blade 366. The motion between the first blade 366 and the second blade 368 causes the teeth 376, 374 to trim or cut hair disposed in between the teeth 376, 374.

Figure 28:
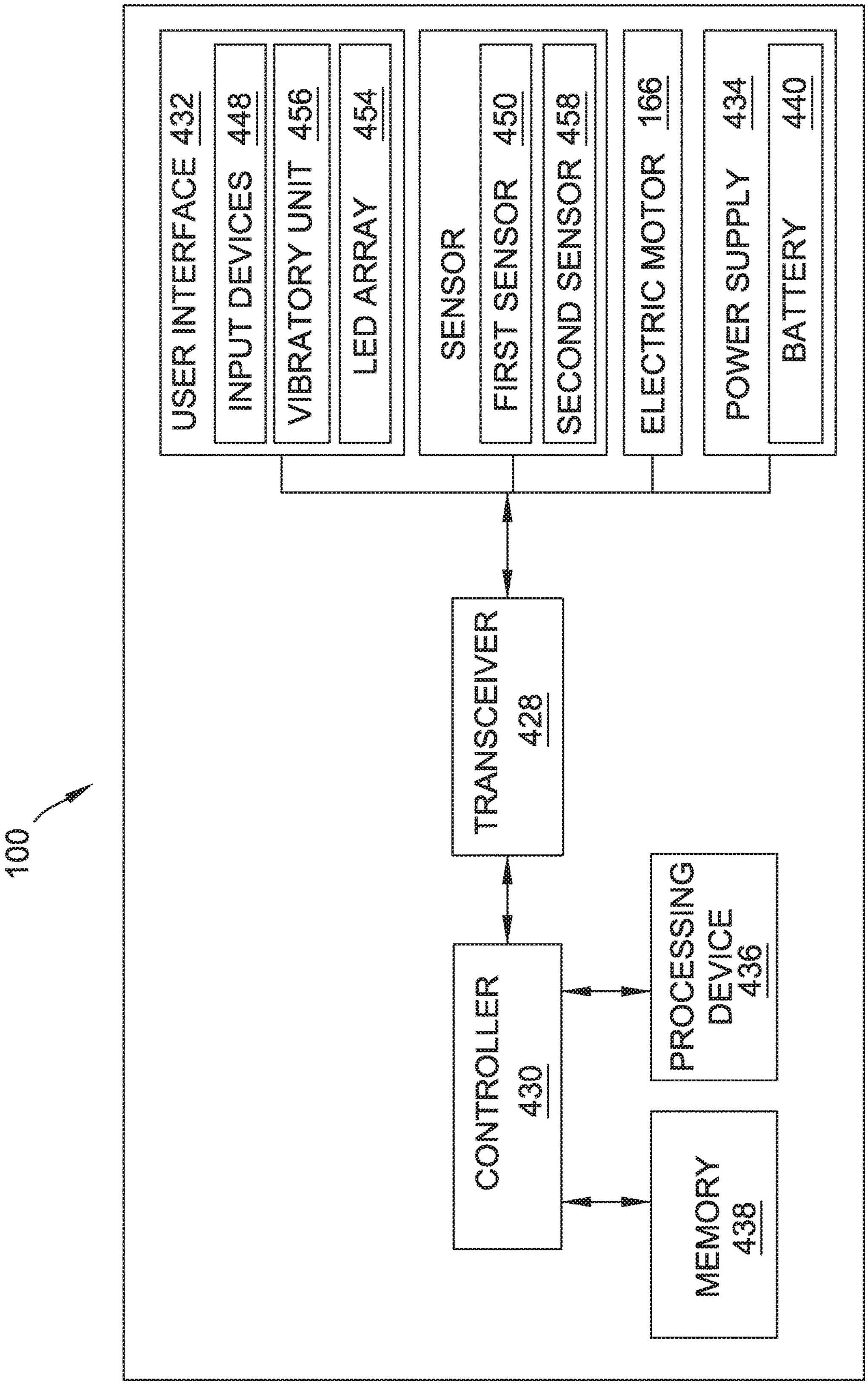
FIG. 28 is a schematic diagram of the electric grooming appliance shown in FIGS. 1-7 with components of the electric grooming appliance represented by boxes, the electric grooming appliance including a controller and one or more sensors.

Referring to FIG. 28, in this illustrated embodiment, the electric grooming appliance 100 includes a controller 430, a user interface 432, sensors 450, 458, and a power supply 434. The controller 430 is at least partially contained in at least one of the mount housing 127, the handle housing 129, and/or the motor housing 130. The controller 430 includes at least one processing device 436, which may include a single controller (e.g., microcontroller) or one or more controllers (e.g., microcontrollers), and a memory 438 and may include or be connected to a transceiver 428. The transceiver 428 facilitates the controller 430 transmitting and receiving signals to and from the electric motor 166, the power supply 434, and the user interface 432, and sensors 450, 458. The electric grooming appliance 100 may also include one or more other electrical devices (e.g., input/output peripherals) in communication with the processing device 436 and the memory 438. The memory 438 stores a plurality of preprogrammed routines to be executed by the controller 430. The controller 430 is configured to transmit a signal to at least one of the user interface 432, the electric motor 166, and/or the power supply 434.

The power supply 434 is configured to supply power to the electric motor 166. In some embodiments, the power supply 434 may include a voltage regulator. In alternative embodiments, the power supply 434 may be unregulated. In this illustrated embodiments, the power supply 434 is a battery 440 (shown in FIG. 7). Accordingly, the electric grooming appliance 100 is configured to function in a cordless mode and does not require an external power supply during operation. In some embodiments, the electric grooming appliance 100 includes a power cord and is configured to receive at least some power from an external power supply during operation.

The first sensor 450 may detect a characteristic of the of the power supply 434. For example, the first sensor 450 may detect the power draw, power output, amperage draw, or a remaining capacitance of the battery 440. The first sensor 450 may transmit a signal to the controller 430 indicating the characteristic. The power draw is the amount of current drawn from the battery 440 by the electric motor 166 over a period of time. The power output is the amount of current supplied by the battery 440 to the electric motor 166 over a period of time. The remaining capacitance is the amount of potential electrical charge difference across the battery 440. In alternative embodiments, the first sensor 450 may detect any characteristics which enable the electric grooming appliance 100 to function as described herein.

The first sensor 450 is communicatively coupled to the controller 430 such that the controller 430 may receive an input signal from the first sensor 450 based on a characteristic detected by the first sensor 450. The controller 430 may determine a battery parameter based on the input received from the first sensor 450. The battery parameter may include at least one of an average draw, an available capacitance, battery power level, power output, and/or a remaining battery life. The battery power level is associated with the amount of time energy stored on the battery divided by the time over which the energy is released. The average draw is the average of the current draw from the battery to the electric motor 166 for a plurality of draw samples. The controller 430 may determine the available capacity by subtracting a threshold battery capacity from the remaining capacitance. The controller 430 may determine the remaining battery life by dividing the available capacitance by the average draw. The remaining battery life is an estimation of the time that the electric grooming appliance 100 could operate using the average draw until the remaining capacitance reaches the threshold level. In alternative embodiments, the controller 430 may determine the remaining battery life by any means which enable the electric grooming appliance 100 to function as described herein.

In some embodiments, the controller 430 may transmit a signal to the power supply 434 to change a property of the power supply 434. For example, the controller 430 may transmit a signal to the power supply 434 to adjust the power output transferred from the power supply 434 to the electric motor 166.

The user interface 432 includes at least one user input device 448 configured to receive at least one input from a user. In this illustrated embodiment, the user input device 448 includes at least one button 452 (shown in FIG. 20). The button 452 is positioned through an opening in the handle back plate 144 and is sized and shaped such that the button 452 may be easily be pressed by a user. In alternative embodiments, the user interface 432 may include any additional user input devices 448 which may receive an input from a user. In some embodiments, user input devices 448 may include for example and without limitation, a screen, switches, speakers, dials, knobs, touchscreens, and/or toggles.

The input devices 448 may transmit information to the controller 430 based on an input received from the user. For example, the user input devices 448 allows a user to select one or more modes, e.g., grooming mode, clean mode, and off mode. The user interface 432 sends a signal to controller 430 to switch the electric grooming appliance 100 to the selected mode. The user interface 432 may generate at least one of an auditory signal, a visual signal, or a tactile signal to be interpreted by a user. The auditory signal, the visual signal, and the tactile signals indicate to a user a parameter related to the electric grooming appliance 100. For example, the parameters may include, without limitation, battery life and the mode selected by a user. In alternative embodiments, the parameters may include any parameters which indicate to a user a characteristic of the electric grooming appliance 100.

The user interface 432 further includes a plurality of light-emitting diodes (LEDs) 454 attached to the back plate 136 (shown in FIG. 4). The controller 430 may transmit a signal to the LEDs 454 causing the LEDs 454 to illuminate or turn off. In addition to or in place of the LEDs 454, the user interface 432 may include a vibratory unit 456 at least partially contained within the handle (shown in FIG. 21). The vibratory unit 456 is configured to provide a tactile signal to a user. The vibratory unit 456 is connected to at least a portion of the handle such that vibration of the vibratory unit 456 causes at least the handle 128 of the electric grooming appliance 100 to vibrate. The vibratory unit 456 is communicatively connected to the controller 430 and the controller 430 may transmit a signal to the vibratory unit 456 causing the vibratory unit 456 to turn on or off. The user interface 432 may include other output devices in addition to or in place of the LEDs 454 and/or the vibratory unit 456. For example, in some embodiments, the user interface 432 may include a speaker to generate an auditory signal to indicate to the user a parameter related to the electric grooming appliance 100.

The electric grooming appliance 100 includes a second sensor 458 (shown in FIG. 15). The second sensor 458 may detect a parameter related to the deflection of the blade assemblies 180 when a user presses the cutting assembly 106 against the skin during a grooming operation. The parameter may include, for example and without limitation, force, displacement, and/or pressure. The second sensor 458 includes a first end 460 and a second end 462. The first end 460 is coupled to the base frame 230 and the second end 462 may be near or touching at least a portion of the blade assembly 180. Deflection of the blade assemblies 180 may deflect the second end 462. The second sensor 458 may transmit a signal to the controller 430 indicating the amount of deflection detected by the second sensor 458. In alternative embodiments, the second sensor 458 may include any type of sensors that enable the electric grooming appliance 100 to function as described herein. For example, the second sensor 458 may include a mechanical trigger, a pressure sensor, and/or a force sensor.

In some embodiments, the electric grooming appliance 100 includes a mechanism or sensor that provides an indication of the force, displacement, or pressure on the blade assembly 180 directly to the user in addition to or instead of transmitting a signal to the controller 430. For example, in some embodiments, the electric grooming appliance 100 includes a mechanism attached to or configured to interact with the drive system of the electric grooming appliance 100. The mechanism may provide an indication when the force or pressure on the blade assemblies 180 is at or beyond one or more set values. For example, the mechanism may include a disc attached to a rotary component of the drive system such as the drive shaft and configured to interact with a stationary component of the grooming appliance 100 when the blade assembly 180 experiences a force sufficient to overcome the bias force of a spring configured to bias the disc and stationary component away from each other. In some embodiments, the mechanism may include a clutch system incorporated into the drive system and configured to at least temporarily disengage the drive system when the blade assembly 180 experiences a force above one or more threshold values. In some embodiments, the mechanism may include an engageable material, such as a thin plastic flash material, that is configured to engage a rotating component of the drive system when the force or pressure on the blade assemblies 180 is at or beyond one or more set values. Accordingly, the electric grooming appliance 100 may be configured to provide the user an auditory, visual, and/or vibratory signal to indicate information related to the force or pressure on the blade assemblies 180.

The controller 430 may determine the amount of force or pressure on the blade assemblies 180 based on the signal transmitted from the second sensor 458, information from another sensor, and/or any operating parameter of the electric grooming appliance 100. For example, in some embodiments, the controller 430 may determine the amount of force or pressure on the blade assemblies 180 based on the current draw or operating speed of the motor. For example, an increase in the current draw of the motor may indicate an increase in the force on the blade assemblies 180 and a decrease in the current draw may indicate a decrease in the force on the blade assemblies. The controller 430 may include a look-up table and/or an algorithm that relates an operating parameter of the motor to the amount of force on the blade assemblies 180. In the example, the controller 430 determines the amount of force or pressure on the blade assemblies 180 based on the signal transmitted from the second sensor 458.

The controller 430 may transmit a signal to the user interface 432 to indicate information related to the amount of pressure or force on the blade assemblies 180 to the user. For example, the controller 430 may transmit a signal to the user interface 432 to indicate the force or pressure on the blade assemblies 180 and/or to indicate that a force or pressure above a threshold value is being applied to at least a portion of the cutting assembly 106. The controller 430 may store one or more threshold values associated with the parameter and determine if the parameter has exceeded the one or more threshold values. In some embodiments, the user may be able to select or adjust one or more of the threshold values and/or the controller 430 may adjust one or more of the threshold values.

In some embodiments, the user interface 432 may provide an indicator that varies based on the force or pressure on the blade assemblies 180. For example, the user interface 432 may provide an auditory signal that increases or decreases in volume based on the force or pressure on the blade assemblies 180. In addition, the user interface 432 may provide a vibratory signal that increases or decreases in frequency and/or amplitude based on the force or pressure on the blade assemblies 180.

The controller 430 may record information related to the force or pressure on the blade assemblies 180. For example, the controller 430 may record the values sent by the second sensor 458 for a plurality of samples at a first sampling frequency. The controller 430 may determine a value based on the recorded information and save the value to the memory 438. Accordingly, the controller 430 may be able to generate a user profile of the force or pressure on the blades assemblies 180 for a user during one or more groom sessions and/or the controller 430 may be configured to adjust one or more of the threshold values based on the recorded information. Moreover, the controller 430 may be able to identify patterns of use based on the force or pressure and "learn" to adjust operation of the electric grooming appliance 100 to accommodate the use patterns.

Figure 29:
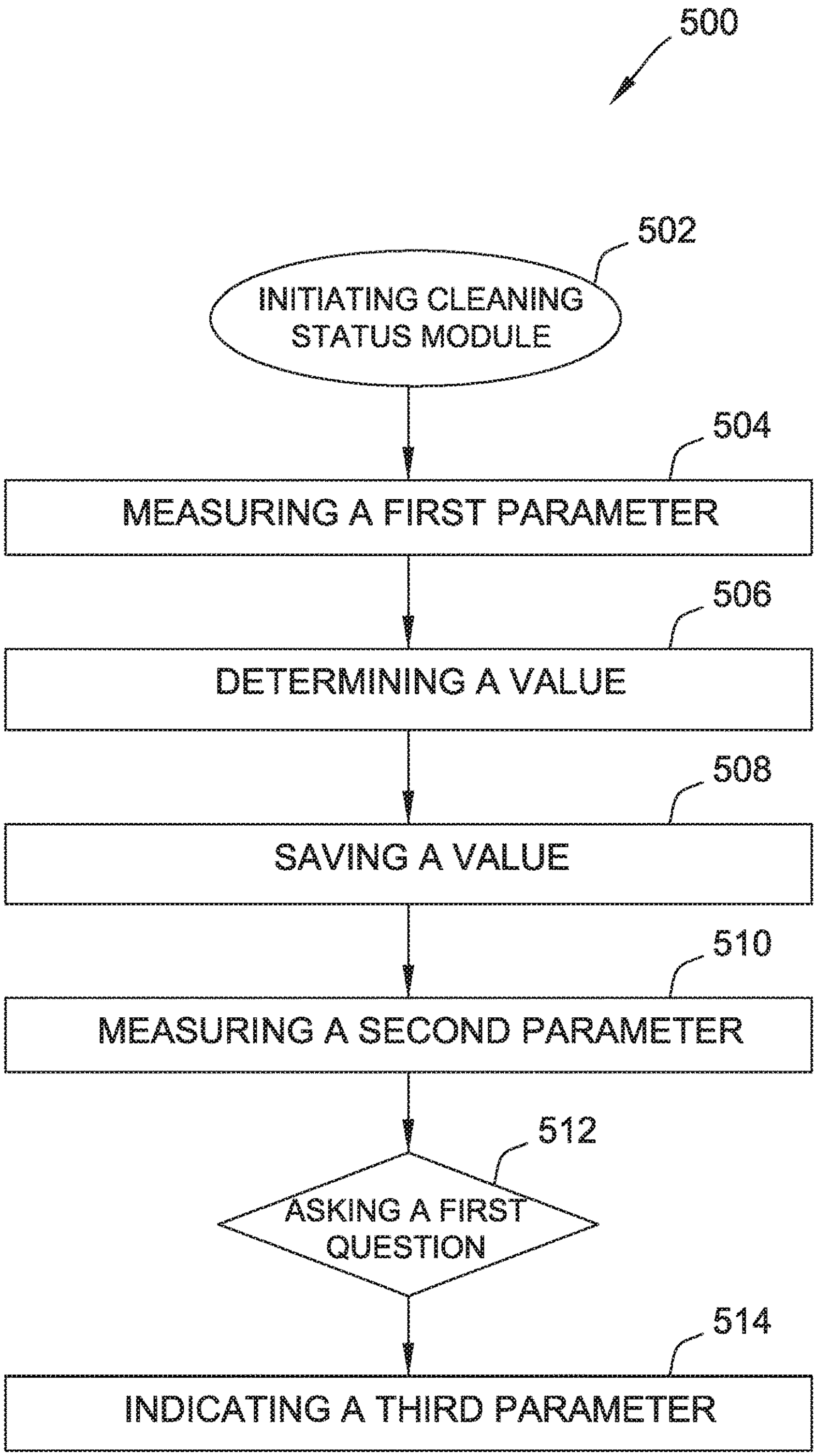
FIG. 29 is a flow diagram of a method of determining the cleaning status of the electric grooming appliance shown in FIGS. 1-7, the electric grooming appliance having a cleaning status module.

Referring to FIG. 29, the electric grooming appliance 100 includes a cleaning status module 500. The cleaning status module 500 may determine when the hair pocket 220 is substantially filled with hair and debris and then indicate to a user that the electric grooming appliance 100 should be cleaned. The cleaning status module 500 includes initiating 502 the cleaning status module 500, measuring 504 a first parameter, determining 506 a first value, saving 508 the first value, measuring 510 a second parameter, asking 512 a first question, and indicating 514 a third parameter to a user. The controller 430 initiates 502 the cleaning status module 500 when the electric grooming appliance 100 is switched to the ON mode using the user interface 432.

Measuring 504 a first parameter includes the controller 430 measuring the current draw of the electric motor 166 at a predetermined sampling frequency for an initial period of time after the electric grooming appliance 100 is switched to the ON mode. The initial period of time may be in the range of about 1 second to about 3 seconds. The first parameter may be associated with the unloaded draw of the electric motor 166 or the draw of the electric motor 166 prior to a grooming session. The controller 430 may determine 506 a value based on the measured first parameter. The value may include an average of the unloaded current draw of the electric motor 166 for a plurality of samples and/or the value may be the maximum of the unloaded current draw for a plurality of samples. The controller 430 continues to saving 508 the first value to the memory 438. The controller may then measure 510 a second parameter which includes the controller sampling the current draw of the electric motor 166 at a predetermined sampling frequency.

The controller 430 then asks 512 a first question based on the value saved to the memory and the measured second parameter. Asking 812 the first question may include the controller 430 determining if the second parameter is greater than the value saved in the memory by a predetermined threshold amount. If the first parameter has not exceeded the value by the threshold amount, the cleaning status module 500 will return to measuring 510 a second parameter. If the first parameter has exceeded the value by a threshold amount, the cleaning status module 500 will continue to indicating 514 a third parameter. Indicating 514 a third parameter includes the controller 430 transmitting a signal to the user interface 432 to cause the user interface 432 to display a signal to the user. The user may interpret this signal as an indication that the electric grooming appliance 100 should be cleaned. For example, indicating 514 a third parameter may include the controller 430 transmitting a signal to the vibratory unit 456 to cause the vibratory unit 456 to pulse.

Figure 30:
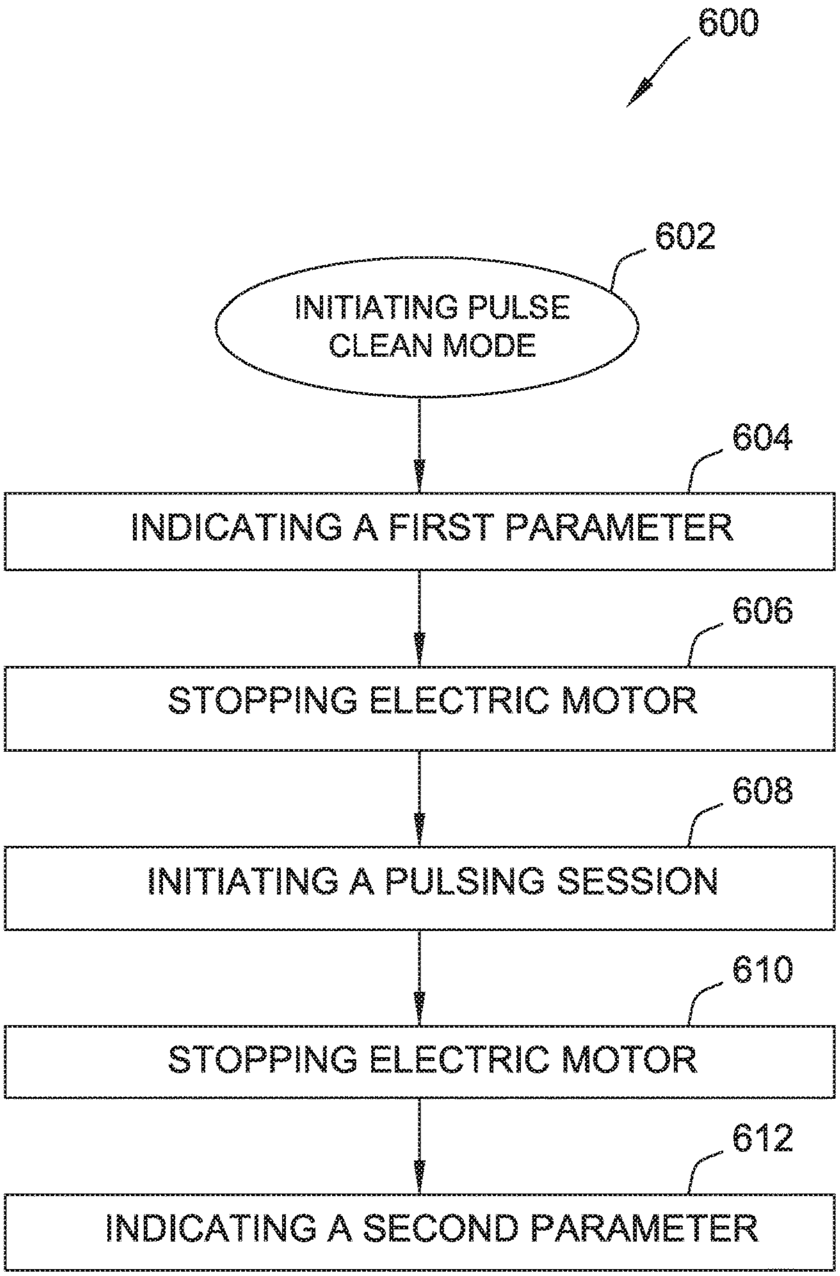
FIG. 30 is a flow diagram of a method of cleaning the electric grooming appliance shown in FIGS. 1-7, the electric grooming appliance having a pulse clean mode.

Referring to FIG. 30, to facilitate removal of hair between and around the cutting assemblies 106, the electric grooming appliance 100 includes a pulse clean mode 600, which may be used to facilitate the removal of hair and/or debris trapped around and between parts of the blade unit 184 and cutting assembly 106. The pulse clean mode 600 includes initiating 602 the pulse clean mode which may be stored in the memory 438, indicating 604 a first parameter to a user, stopping 606 the electric motor 166, initiating 608 a pulsing session for a plurality of sessions, stopping 610 the electric motor 166, and indicating 612 a second parameter to a user.

The pulse clean mode includes the controller 430(shown in FIG. 28) initiating 602 the preprogramed routine saved in the memory 438 when the electric grooming appliance 100 is switched to the pulse clean mode 600. The controller 430 may switch the electric grooming appliance 100 to the pulse clean mode 600 based on one or more user inputs to the input device 448 (shown in FIG. 28).

After initiating 602 the pulse clean program, controller 430 (shown in FIG. 28) may indicate 604 a first parameter to a user. Indicating 604 a first parameter includes the controller 430 transmitting a signal to the user interface 432 (shown in FIG. 28) to provides an indication to the user that the pulse clean mode has been initiated. For example, the controller 430 may execute a plurality of warning vibrations, wherein in each warning vibration, the controller 430 is configured to transmit a signal to the vibratory unit 456 to cause the vibratory unit 456 to vibrate the electric grooming appliance 100 for a first amount of time and then to transmit a signal to the vibratory unit 456 to cause the vibratory unit 456 to stop vibrating for a second amount of time.

The controller 430 (shown in FIG. 28) may stop 606 the electric motor 166 (shown in FIG. 7) by transmitting a signal to the electric motor 166 to cause the electric motor 166 to stop driving the rotation of the first drive shaft 168 for an amount of time after the electric grooming appliance 100 is switched to the pulse clean mode. The period of time that the electric motor 166 is stopped may allow a user to place the cutting assembly 106 to receive a fluid prior to a pulsing session being initiated 608. For example, after the warning vibrations, the user may place the cutting assembly 106 (shown in FIG. 7) under running water.

The controller 430 (shown in FIG. 28) initiates 608 the pulsing sessions by transmitting signals to the electric motor to cause the electric motor 166 (shown in FIG. 7) to drive at least one of the moveable blade 194 for a predetermined first amount of time at a predetermined first speed. Next the controller 430 transmits a signal to the electric motor 166 to cause the electric motor 166 to drive the moveable blades 194 at a predetermined second speed for a predetermined second amount of time. In this illustrated embodiment, the second speed is significantly less than the first speed. In alternative embodiments, during the second amount of time, the controller 430 is configured to transmit a signal to the electric motor 166 to cause the electric motor 166 to stop for a third amount of time. Further, during the third amount of time, the controller 430 may transmit a signal to the electric motor 166 to cause the electric motor 166 to drive the blades in a first direction and then drive the blades in a second direction.

Stopping 610 the electric motor 166, includes the controller 430 (shown in FIG. 28) transmitting a signal to the electric motor 166 to cause the electric motor 166 to stop for an amount of time. After stopping 610 the electric motor 166, electric grooming appliance 100 indicates 612 a second parameter to a user. Indicating 612 a second parameter includes the controller 430 transmitting a signal to the user interface 432 to provide an indication to the user that pulse clean mode 600 is complete. For example, the controller 430 may initiate a plurality of warning vibrations, wherein during the warning vibrations, the controller 430 is configured to transmit a signal to the vibratory unit 456 to cause the vibratory unit 456 to vibrate the electric grooming appliance 100 (shown in FIG. 7) for a first amount of time and then to transmit a signal to the vibratory unit 456 (shown in FIG. 28) to cause the vibratory unit 456 to stop vibrating for a second amount of time.

In this illustrated embodiment, a user may apply cleaning fluid, for example and without limitation, a liquid, gas, or a combination to further facilitate cleaning of the hair pocket 220 (shown in FIG. 15), prior, during, and/or after initiating pulse clean mode 600.

Figure 31:
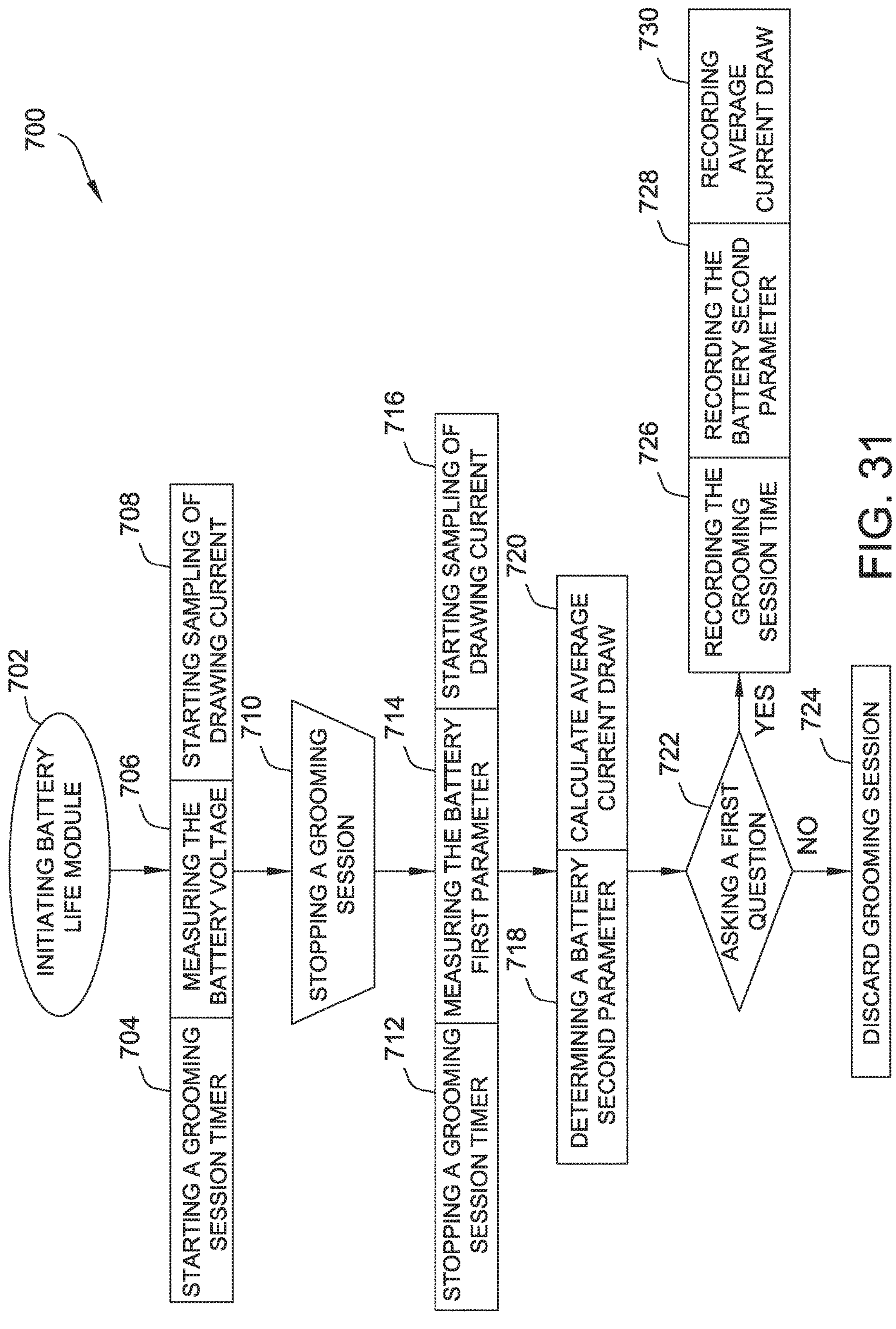
FIG. 31 is a flow diagram of a method of operating the electric grooming appliance and determining operating parameters of the electric grooming appliance shown in FIGS. 1-7 based on shave session information.

Referring to FIG. 31, the electric grooming appliance 100 includes a battery life module 700 stored within the memory 438. The battery life module 700 generally includes initiating battery life module 702, starting 704 a grooming session timer, measuring 706 a battery first parameter, starting 708 a sampling of current draw, stopping 710 a grooming session, stopping 712 the timer, measuring 714 a battery first parameter, stopping 716 the sampling of the current draw, determining 718 a voltage battery second parameter, calculating 720 an average current draw, determining 722 if the elapsed time is greater than a threshold, discarding 724 a grooming session, recording 726 the elapsed time, recording 728 the battery second parameter, and recording 730 the average current draw.

The controller 430 initiates 702 a grooming session when the electric grooming appliance 100 switches from OFF mode to ON mode. For example, the controller 430 (shown in FIG. 28) may initiate a grooming session when a user input to the user interface 432 causes the electric grooming appliance 100 to switch to the ON mode. At the time when a grooming session is initiated by the controller 430, the controller 430 starts a timer with an initial time of 0 seconds. The controller 430 measures 706 a first parameter relating to the battery 440 at the initial time. The first parameter may include, for example and without limitation, voltage, capacity, and/or time. The controller 430 samples the current draw from the battery 440 to the electric motor 166 (shown in FIG. 7) at a specified frequency for a plurality of samples. The controller 430 stops the grooming session when the electric grooming appliance 100 switches modes. For example, the controller 430 may stop the grooming session when an input to the user interface 432 (shown in FIG. 28) indicates a switch to the OFF mode. When the controller 430 stops the grooming session, the control 430 may stop the timer at that time and record the stop time in the memory 438 (shown in FIG. 28). The controller 430 may determine the elapsed time from the timer, record the elapsed time in the memory, and associate the elapsed time with the particular grooming session. Accordingly, the memory 438 may include a log of elapsed grooming times that are associated with identified grooming sessions.

The controller 430 measures 714 the first parameter related to the battery at the stop time. Stopping 716 the sampling of the current draw includes the controller 430 (shown in FIG. 28) recording a current draw from the battery to the electric motor 166 (shown in FIG. 7) at the stop time. Determining 718 a second battery parameter includes the controller 430 determining a second parameter associated with the battery 440 (shown in FIG. 7) based on the first parameter measurements at the start time and the stop time. The second parameter may include, for example and without limitation, average draw, an available capacitance, and/or a remaining battery time. The remaining battery life is an estimation of the time that the electric grooming appliance 100 could operate using the average draw until the remaining capacitance reaches the threshold level. Calculating 720 an average current draw includes the controller 430 summing the current draw samples for a plurality of samples and dividing the sum by the number of samples.

In some embodiments, the controller 430 determines a relationship between the first parameter and the runtime of the electric grooming appliance 100. For example, the controller 430 may determine a table or algorithm that relates the voltage or current draw from the battery to a runtime of the electric grooming appliance 100 for one or more battery charge cycles of the electric grooming appliance 100. Accordingly, the controller 430 may determine an average runtime for a battery charge cycle in view of the first parameter and determine the number of grooming sessions remaining by dividing the average runtime by an average duration of a grooming session.

The controller 430 (shown in FIG. 28) determines 722 if the elapsed time is greater than a threshold. The threshold may be in the range of about 30 second to about 60 seconds. If the elapsed time is less than the threshold, then the battery life module 700 discards the grooming session. If the elapsed time is greater than the threshold, then the battery life module 700 records 726 the elapsed time to the memory 438. Recording 728 the battery second parameter includes the controller 430 recording the second parameter associated with the battery to the memory 438. Recording 730 the average current draw includes the controller 430 recording the average current draw to the memory 438.

In this example embodiment, the elapsed times are recorded in the memory 438 for a plurality of grooming sessions. The controller 430 may determine an average elapsed time by averaging the elapsed times for a threshold number of grooming sessions. For example, the threshold number of grooming session may be in the range of about 10 to about 15 grooming sessions. If the memory 438 includes more grooming sessions than the threshold number, the controller 430 may only use the most recently performed grooming sessions in the average elapsed time calculation and discard earlier recorded grooming sessions. The controller 430 may continuously calculate and record the average grooming session elapsed time to the memory 438 for the most recent threshold number of grooming sessions. If the number of grooming sessions stored in the memory 438 is below the threshold number of grooming sessions, the controller 430 may determine the average elapsed time using other methods, such as averaging the grooming sessions for a number of grooming sessions less than the threshold number of grooming sessions. In alternative embodiments, if the number of saved grooming sessions is below the threshold number, for example, if the number of grooming sessions is between 1 and 9, then the controller 430 may set the average elapsed time to a baseline elapsed time. For example, the baseline elapsed time may be in the range of aboutl to about 5 mins.

The average elapsed time may be used by the controller 430 to predict the number of elapsed times (e.g., grooming sessions) that may be completed prior to a parameter of the battery reaching a threshold level. For example, the controller 430 may divide the remaining battery life by the average elapsed time to determine the number of grooming sessions that may be completed before there may be insufficient battery power to complete a grooming session. The controller 430 may transmit a signal to the user interface 432 to indicate to a user the number of grooming sessions remaining. In this example embodiment, the user interface 432 includes an array of light emitting diodes (LEDs) 454. The controller 430 may illuminate a number of the LED 454 to indicate to a user the number of grooming sessions remaining. In alternative embodiments, the user interface 432 may indicate the number of grooming sessions remaining using other components, such as a digital screen displaying a number indicating the number of grooming sessions remaining, in addition to or in place of the LED 454.

Figure 32:
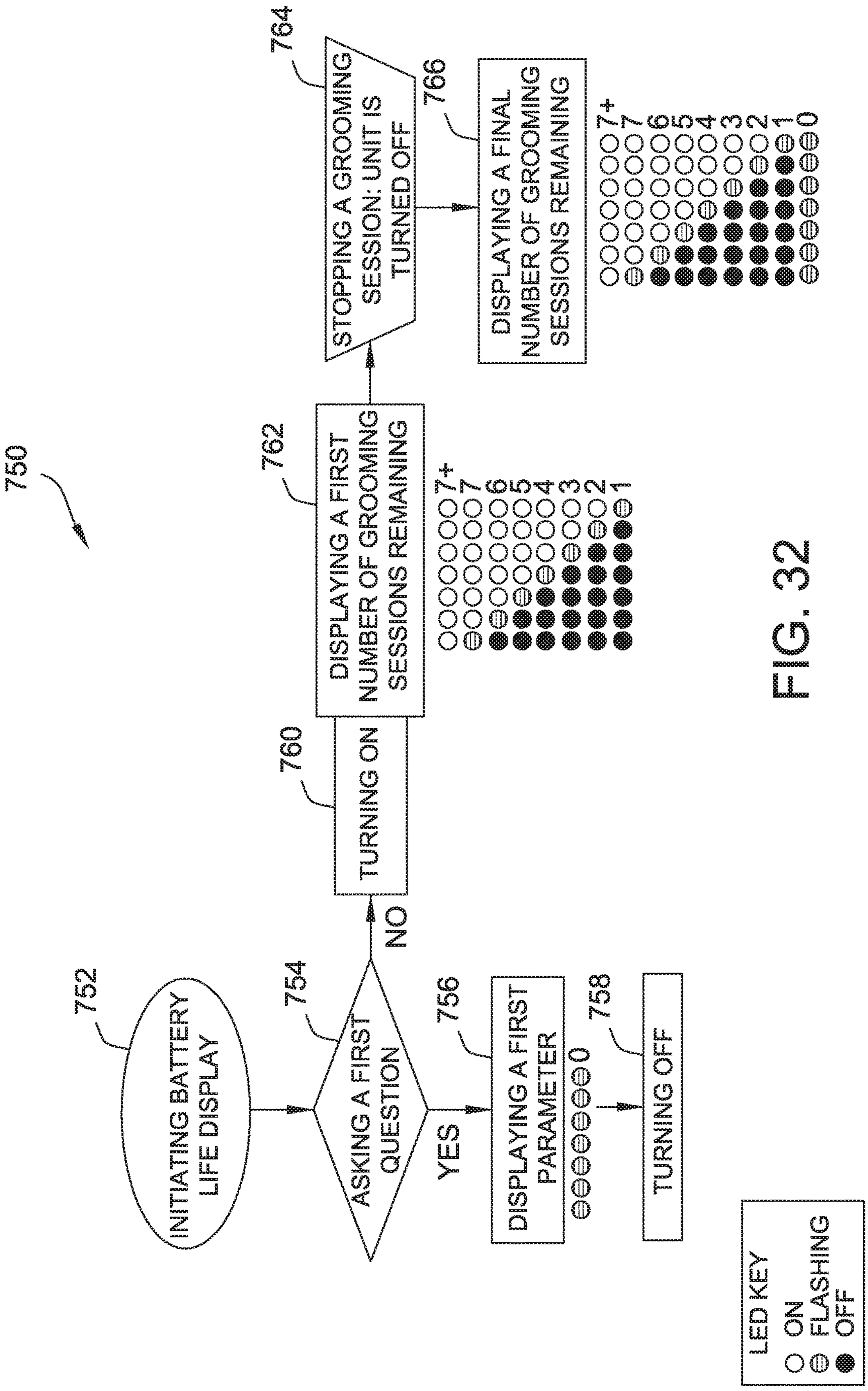
FIG. 32 is a flow diagram of a method of operating the electric grooming appliance shown in FIGS. 1-7 and providing user feedback based on shave session information determined by the electric grooming appliance.

Referring to FIG. 32, the electric grooming appliance 100 may include a battery display module 750. The battery display module 750 includes initiating 752 a grooming learning display program stored within the memory 438, asking 754 a first question, displaying 756 a first parameter, turning 758 the unit to the OFF mode, turning 760 the unit to the ON mode, displaying 762 a first number of grooming sessions, turning 764 the unit to the OFF mode, and displaying 766 a final number of grooming sessions.

The controller 430 (shown in FIG. 28) may initiate 752 the battery display program when the electric grooming appliance is turned to the ON mode using the user interface 432. The controller 430 may determine the number of grooming sessions remaining using the battery life module 700. In some embodiments, the controller 430 includes a preset value or a look-up table that provides a number of grooming sessions based on the battery level. The controller 430 asks 754 if the number of grooming session remaining is less than one. If the answer to the asking 754 the first question is positive, then the battery display module 750 continues to displaying 756 a low battery indication. After displaying the low battery indication, the controller 430 may continue to turning the 758 the electric grooming appliance 100 (shown in FIG. 1) to the OFF mode. Displaying 756 the low battery indication, includes the controller 430 transmitting a signal to the user interface 432 (shown in FIG. 28) to cause the set of LED 454 (shown in FIG. 4) to flash for a plurality of seconds. Accordingly, the controller 430 indicates to a user that there is insufficient battery power to complete a grooming session. Turning 758 the electric grooming appliance 100 to the OFF mode includes the controller 430 transmitting a signal to the electric motor 166 to cause the motor to stop or not to initiate rotation of the first drive shaft 168. In some embodiments, the controller 430 determines the remaining grooming sessions prior to transmitting the signal to electric motor 166 and does not transmit the signal if the number is below the threshold amount.

In some embodiments, the electric grooming appliance 100 includes an excess battery charge that may be used to provide power when there is insufficient battery power in the primary supply to complete a grooming session. The excess battery charge may be provided by a separate non-rechargeable battery that provides a limited number of uses and/or by a remaining power capacity of the primary battery. The user interface 432 may allow the user to select the excess or "emergency tank" power after the controller 430 determines that there is insufficient battery power to complete a grooming session. When the "emergency power" mode is selected, the electric grooming appliance 100 may operate for a set period of time or until the excess battery charge is depleted.

If the answer to asking 754 the first question is negative, and the number of grooming sessions is greater than one, the battery display module 750 turns 760 the unit to the ON mode and displays 762 a first number of grooming sessions. Turning 760 the unit on includes the controller 430 (shown in FIG. 28) transmitting a signal to the electric motor 166 (shown in FIG. 7) to cause the electric motor 166 to rotate the first drive shaft 168 (shown in FIG. 28).

Displaying 762 a first number of grooming sessions includes the controller 430 (shown in FIG. 28) transmitting a signal to the user interface 432 (shown in FIG. 28) to cause at least a subset of the set of the LED 454 (shown in FIG. 4) to illuminate. For example, if there are six grooming sessions remaining, one LED 454 may be off, one LED 454 may flash, and five of the LED 454 may be illuminated. In other embodiments, the number of illuminated/flashing lights may be proportional but not equal to the number of grooming sessions remaining. In other embodiments, the user interface 432 does not include distinct lights and the user interface 432 provides a gauge which displays a graphical representation of remaining grooming sessions using LED 454 or other display components.

Turning 764 the unit to the off mode includes the controller 430 (shown in FIG. 28) transmitting a signal to the electric motor 166 (shown in FIG. 7) to cause the electric motor 166 to turn off when the electric grooming appliance 100 (shown in FIG. 7) is switched to the OFF mode. Displaying 766 a final grooming session remaining includes the controller 430 transmitting a signal to the user interface 432 (shown in FIG. 28) to illuminate at least a subset of the set of LED 454 (shown in FIG. 4) to indicate to a user the number of grooming sessions remaining. The controller 430 may transmit a signal to the user interface 432 to illuminate a single of the LED 454 when there is one grooming session remaining or when the battery life is under a threshold time. For example, the threshold time may be in the range of 3 mins-5 mins.

Figure 33:
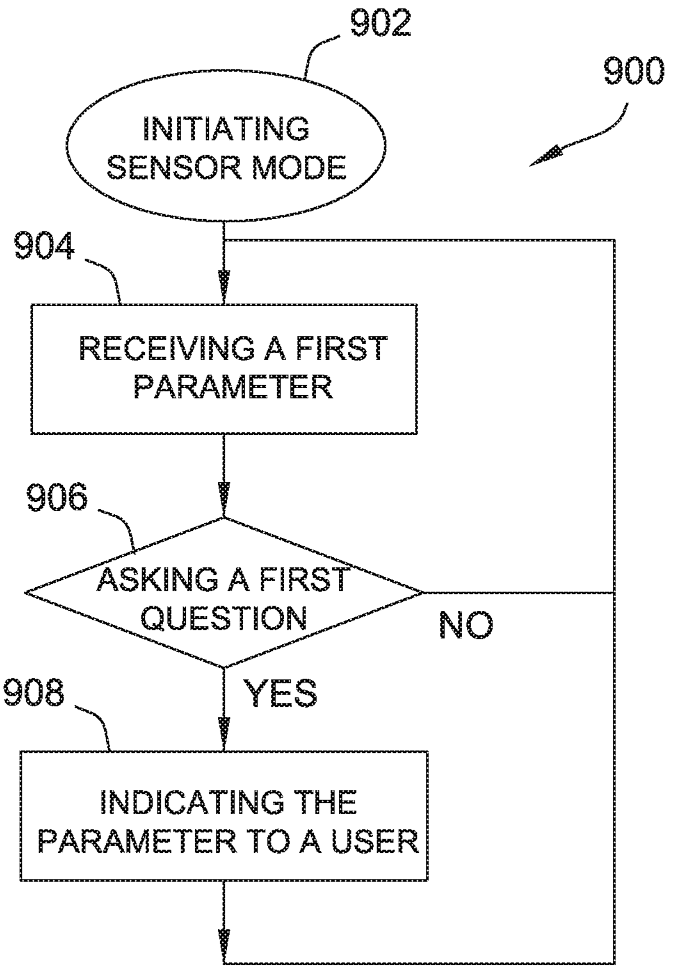
FIG. 33 is a flow diagram of operating the electric grooming appliance shown in FIGS. 1-7 in a mode selected by the user.

Referring to FIG. 33, the electric grooming appliance 100 includes a grooming sensor mode 900 which provides feedback to a user during a grooming session. The feedback may relate to the amount of force or pressure being applied to the blade assemblies 180 during a grooming session. In this example embodiment, the user interface 432 may allow a user to select the grooming sensor mode. The mode 900 may be selected or deselected prior to a grooming session or during a grooming session. When the grooming sensor mode is selected, the mode 900 operates in accordance with a preprogrammed routine retrieved from the memory 438. The mode 900 includes initiating 902 the sensor mode, receiving 904 a first parameter, asking 906 a first question, and indicating 908 a second parameter to a user.

The controller 430 (shown in FIG. 28) initiates 902 the grooming sensor mode when the electric grooming appliance is turned ON and the user has selected the grooming sensor mode using the user interface 432. In the grooming sensor mode, the controller 430 receives 904 a first parameter from the second sensor 458 (shown in FIG. 28). The first parameter may be associated with force, displacement, and/or pressure experienced by the blade assemblies 180 (shown in FIG. 12) during a grooming session. The controller 430 then asks 904 a first question based on the received first parameter. Asking 906 the first question may include the controller 430 determining if the first parameter is greater than a threshold value. If the first parameter has not exceeded the threshold value, the grooming sensor mode will return to receiving 904 the first parameter from the second sensor. If the first parameter has exceeded the threshold value, the grooming sensor mode will continue to indicating 908 to the user that the first parameter has exceeded the threshold value. In some embodiments, if the first parameter has exceeded the threshold value, the controller 430 may adjust a second parameter related to the electric grooming device. The second parameter may include adjusting the rotational speed of the moveable blades 194 (shown in FIG. 13).

Indicating 908 the parameter to a user includes the controller 430 (shown in FIG. 28) transmitting a signal to the vibratory unit 456 (shown in FIG. 28) to cause the vibratory unit to vibrate for a plurality of pulses. The pulses may be in the range of 2 to 5 pulses per second. The controller 430 will cease transmitting a signal to the vibratory unit 456 for a plurality of second to cause pauses between the pulses. Accordingly, the mode 900 provides an indication to the user that the second sensor 458 (shown in FIG. 28) has exceeded the threshold value and that the user is applying excessive force during the grooming session that may lead to discomfort and skin irritation. The indication may act as a warning signal that may motivate a user to adjust use of the electric grooming appliance 100, such as adjusting the amount force the user is applying from the cutting assembly 106 (shown in FIG. 12) to the user's skin. In alternative embodiments, the controller 430 may transmit a signal to the user interface 432 to cause the user interface 432 to generate at least one of an auditory signal, a visual signal, and a tactile signal (e.g. a vibration) to be interpreted by a user as an indication that the second sensor 458 has exceeded the threshold value. After indicating 908 the parameter to the user, the mode 900 will return to receiving 904 the first parameter from the second sensor 458.

Figure 34:
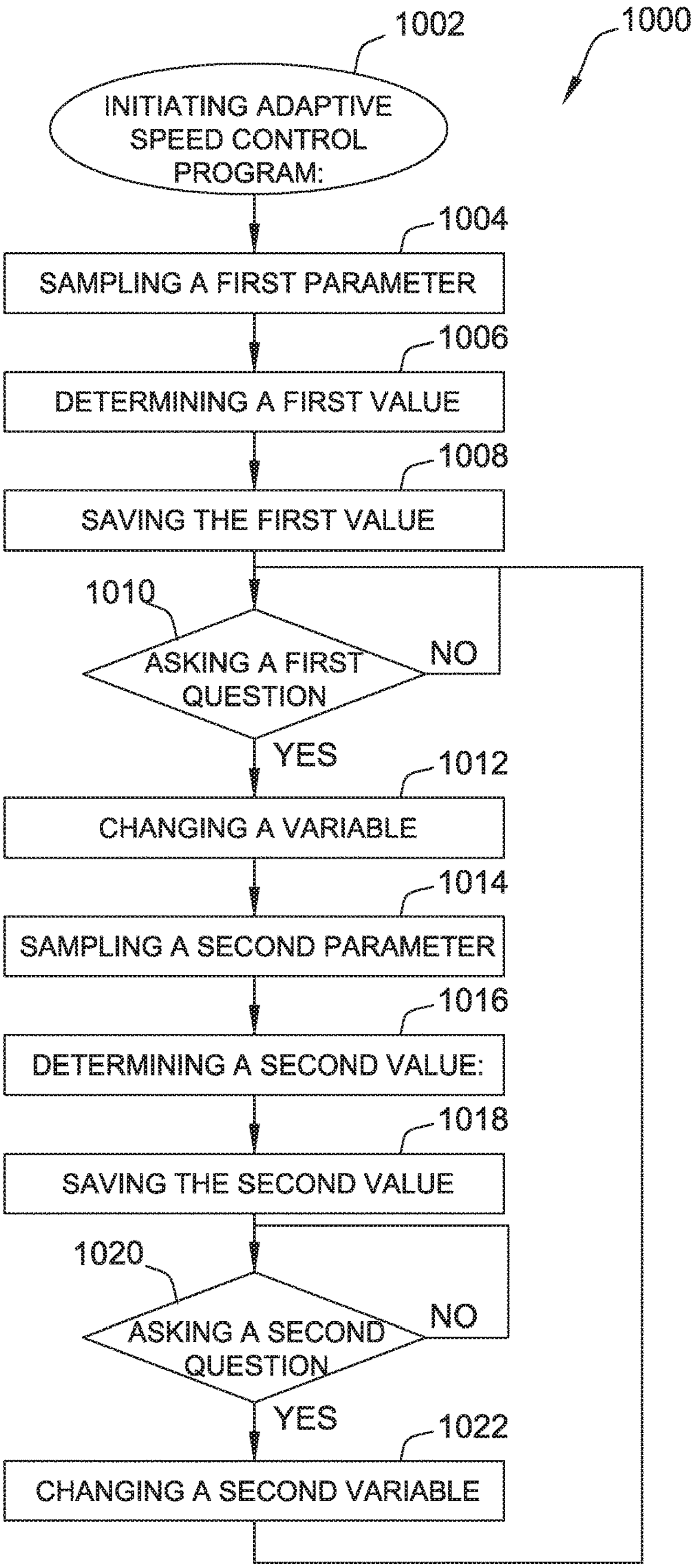
FIG. 34 is a flow diagram of a method of operating the electric grooming appliance shown in FIGS. 1-7, the electric grooming appliance including an adaptive speed control system.

Referring to FIG. 34, in this illustrated embodiment, the electric grooming appliance 100 (shown in FIG. 1) includes an adaptive speed control module 1000 which operates in accordance with a preprogrammed routine stored on the memory 438 (shown in FIG. 28). The adaptive speed control module 1000 includes initiating 1002 the module, sampling 1004 a first parameter, determining 1006 a first value, saving 1008 the first value, asking 1010 a first question, changing 1012 a first variable, sampling 1014 a second parameter, determining 1016 a second value, saving 1018 the second value, asking 1020 a second question, and changing 1022 the first variable.

The controller 430 (shown in FIG. 28) initiates 1002 the adaptive speed control module 1000 when the electric grooming appliance 100 (shown in FIG. 1) is switched to the ON mode using the user interface 432 (shown in FIG. 28). In some embodiments, the user may be able to select or deactivate the adaptive speed control module 1000 using the user interface 432. Sampling 1004 a first parameter includes the controller 430 measuring an unloaded current draw for a plurality of samples at a first sampling frequency. The unloaded current draw is the current draw of the electric motor 166 when the load on the electric motor 166 does not include a grooming operation, e.g., the grooming device is turned ON but is not being actively used to perform the grooming operation. The controller 430 may sample the unloaded current draws for a brief period time that is selected to be less than the amount of time required for a user to turn on the electric grooming appliance 100 and commence a grooming operation. For example, the unloaded current draw may be determined based on a measure of the current draw of the electric motor 166 during a brief interval of time, e.g., 1 to 5 seconds, starting immediately at the time at which the adaptive speed control is initiated 1002.

Determining 1006 a first value includes the controller 430 (shown in FIG. 28) determining at least one of an average unloaded current draw and/or a maximum unloaded current draw. The average unloaded current draw is the sum of the unloaded current draw samples divided by the number of samples and the maximum unloaded current draw is the maximum value of the unloaded current draw. Saving 1008 a first value includes the controller 430 saving at least one of the average unloaded current draw and or the maximum unloaded current draw to the memory 438 (shown in FIG. 28).

Asking 1010 a first question includes the controller 430 (shown in FIG. 28) determining if a present current draw is greater than one or more threshold values. The present current draw of the electric motor 166 may be received by the controller 430 from a sensor. One or more threshold values may be determined based on at least one of the maximum unloaded current draw and/or the average unloaded current draw. To determine a threshold value, the controller 430 may determine which is greater the maximum unloaded current draw or the average unloaded current draw and increase the greater value by a first threshold percent. The controller 430 then determines if the present current draw is greater than the one or more threshold values. For example, the present current draw may exceed a threshold value when a user is grooming coarse, thick, and or dense hair. Coarse hair, thick hair, and or dense hair patterns of a user, may impede the rotation of the moveable blades 194 during a grooming session, and increase the resistance, i.e., load, on the electric motor. As a result, the present current draw is increased to compensate for the increased resistance and allow the electric motor 166 to maintain the rotational speed of the moveable blades 194. In some embodiments, the threshold values provide a tiered system and the controller 430 increases the power supplied to the electric motor 166 when the present current draw exceeds each threshold value defining a tier.

In some embodiments, the controller 430 controls the electric motor 166 in accordance with an open loop system and operates the electric grooming appliance 100 to provide a preset duty cycle and/or voltage level for the electric motor 166 based on the speed profile determined by the module 1000. In other embodiments, the controller 430 controls the electric motor 166 in accordance with a closed loop system. For example, the controller 430 may compare and determine a difference between a measured current draw or power value and the expected current draw or power value for the desired motor speed. The difference may be multiplied by a gain value to determine if adjustments need to be made to maintain the operation of the motor within a duty cycle/motor voltage level. Alternatively or additionally, the controller 430 may utilize a proportional, integral, and derivative (PID) algorithm to determine the duty cycle or voltage level. In some embodiments, the controller 430 receives a measurement of the rotational speed of the electric motor 166 from an optical sensor, a Hall effect sensor, a characterization of the motor current and voltage waveform, and/or any other suitable sensor reading. The measured speed may be compared to the expected speed and the controller 430 may control the duty cycle and/or voltage level using a P algorithm, a PI algorithm, and/or a PID algorithm.

If the answer to asking 1010 a first question is negative, the adaptive speed module will return to asking 1010 a first question. When electric grooming appliance 100 is in the ON mode and the module 1000 is active, controller 430 (shown in FIG. 28) may continuously compare current draw to the threshold value. The present current draw may be continuously provided as a real-time stream or sampled at selected times. In some embodiments, the current draw is based on a sampling over a period of time and/or is averaged for one or more grooming sessions. The current draw values may be stored and updated to provide a user profile for one or more groom sessions. If the detected current draws remain below the threshold, controller 430 remains in the comparison stage. If a detected current draw exceeds the threshold value, then the adaptive speed module continues to changing 1012 a first variable. For example, the controller 430 changes 1012 a first variable by transmitting a signal and increasing the power supplied to the electric motor 166 by the power supply 434 and/or battery 440. The controller 430 may increase the supplied power to the electric motor 166 to increase the rpm of the first drive shaft 168 by a specified percent increase.

In some embodiments, the controller 430 controls the operating speed of the electric motor 166 in real time based the present current draw. For example, the controller 430 may determine a motor speed by multiplying the current draw by a set value, or by multiplying the current draw by the voltage and the set value. The controller 430 may include saturation values (i.e., maximum and minimum values for the operating speed) and continuously vary the operating speed based on the present current draw when the determined operating speed is within the saturation values.

Sampling 1014 a second parameter includes the controller 430 (shown in FIG. 28) measuring a loaded current draw for a plurality of samples at a second sampling frequency. The loaded current draw is the current draw of the electric motor 166 when the electric grooming appliance 100 is being used to perform a grooming operation. For example, controller 430 may determine the loaded current draw during an interval of time starting at the time at which the controller 430 executes sampling 1014 and ending at a second time. Determining 1016 a second value includes the controller 430 determining at least one of an average loaded current draw and or a maximum loaded current draw. The average loaded current draw is the sum of the loaded current draw samples divided by the number of samples. The maximum loaded current draw is the maximum value of the loaded current draw. Saving 1018 the second value includes the controller 430 storing at least one of the average loaded current draw or the maximum loaded current draw to the memory 438.

Asking 1020 a second question includes the controller 430 (shown in FIG. 28) determining if a present current draw is less than a threshold value. The present current draw of the electric motor 166 may be received by the controller 430 from a sensor. The threshold value may be determined based on at least one of the maximum unloaded current draw and/or the average unloaded current draw. To the determine the threshold value, the controller 430 may determine which is greater the maximum unloaded current draw or the average unloaded current draw and increase the greater value by a first threshold percent. The controller 430 then determines if the present current draw is less than the threshold value. For example, the present current draw may fall below the threshold value when a user is grooming thin or less dense hair or when the user is not actively grooming hair. As a result, the present current draw is decreased to compensate for the decrease in resistance and allow the electric motor 166 to maintain the rotational speed of the moveable blades 194 above a threshold speed.

If the answer to asking 1020 a second question is negative, the adaptive speed module will return to asking 1020 the second question. When electric grooming appliance 100 is in the ON mode and the module 1000 is active, controller 430 may continuously compare current draw to the threshold value. The present current draw may be continuously provided as a real-time stream or sampled at selected times. If the current draw remains above the threshold, controller 430 remains in the comparison stage. If the present current draw falls below the threshold value, then the adaptive speed module continues to changing 1022 a second variable.

Changing 1022 a second variable includes the controller 430 transmitting a signal to the power supply 434 to decrease the rpm of the electric motor 166 by a specified percent increase. After, changing 1022 a second variable, the adaptive speed control will return to asking 1010 a first question.

In some embodiments, the controller 430 receives one or more user inputs and determines operating parameters of the electric grooming appliance 100 based at least partly on the user inputs. For example, the user may select a mode of operation or operational directive for the electric grooming appliance 100 such as operating to provide increased power or operating to increase battery efficiency. The controller 430 may increase or decrease the motor speed and/or change one or more other operating parameters based on the user directive.

Figure 35:
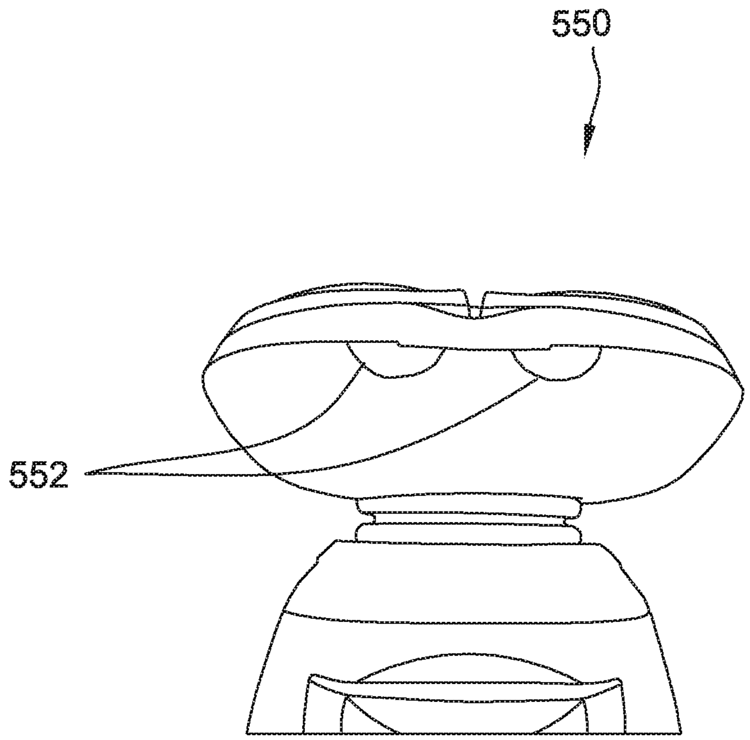
FIG. 35 is a side view of another suitable embodiment of an electric grooming appliance, the electric grooming appliance including a pair of washout ports defined by a head.
Figure 36:
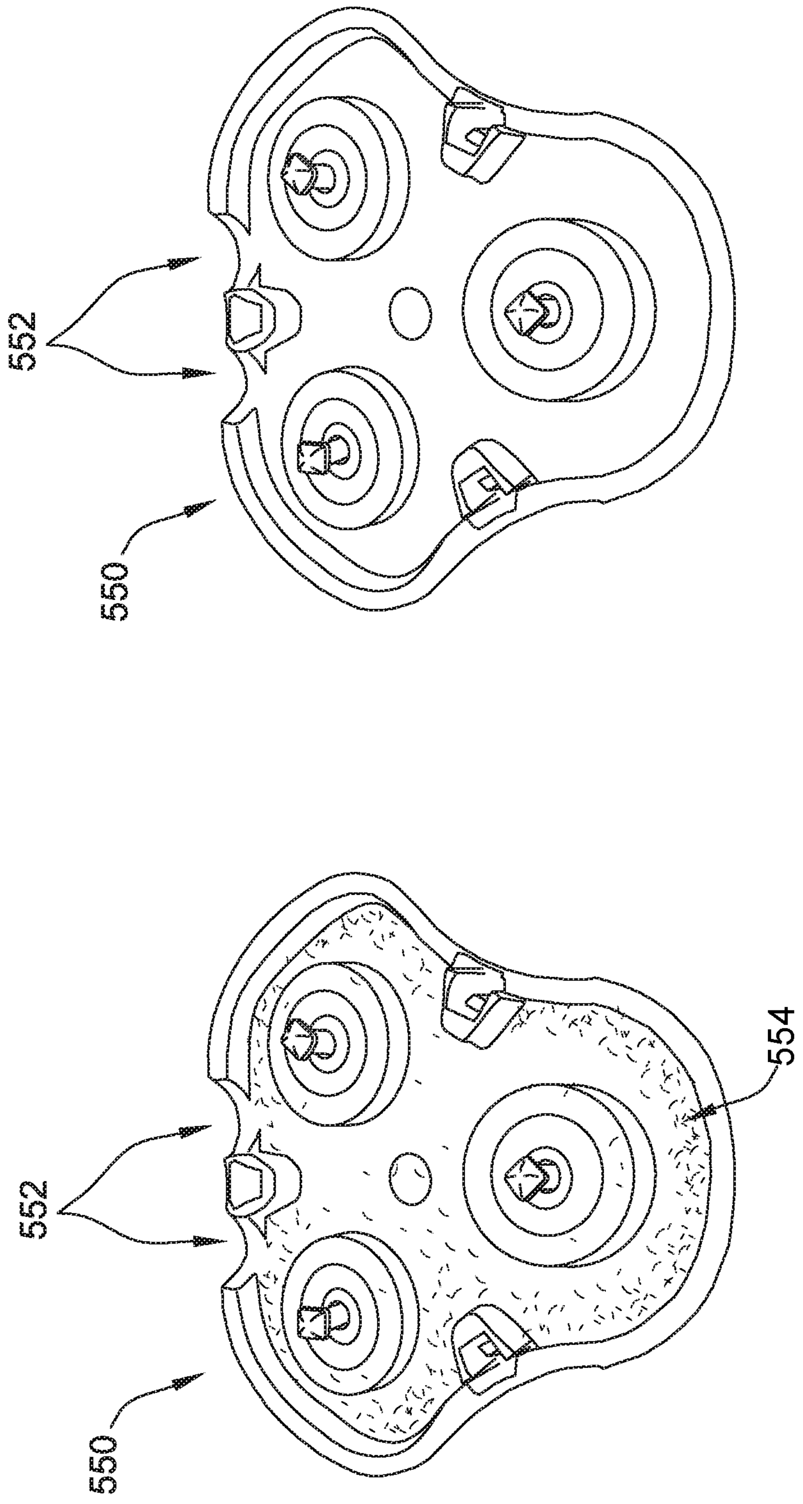
FIG. 36 is a top assembly view of the electric grooming appliance shown in FIG. 35, a cutting assembly of the electric grooming appliance being detached from the head to show a hair pocket before and after cleaning.

Referring to FIGS. 35 and 36, in another example embodiment, an electric grooming appliance, indicated generally at 550, may include at least one washout port 552 on at least one or both of the head or a cutting assembly. The washout port 552 may include an opening that passes from the hair pocket to the exterior of the electric grooming appliance 550. In this illustrated embodiment, the electric grooming appliance 550 includes two washout ports 552. The washout ports 552 are substantially semicircular in shape. In alternative embodiments, the washout ports 552 can be any shape or location which enables the electric grooming appliance 550 to function as described herein. A user may use the washout ports 552 to facilitate removal of hair and debris 554 from the hair pocket to the exterior. For example, a user may place the head and cutting assembly under a stream of water while the electric grooming appliance 550 is in the ON mode, the pulse clean mode, and/or the OFF mode.

Embodiments described above include grooming appliances that may be used in a number of different modes and may provide information to users relating to the grooming operations performed by the user. For example, a user may input a signal to the user interface to selectively turn on or off the electric grooming appliance or initiate a mode or module stored in the memory to be executed by the controller. The user may turn the electric grooming appliance to the ON mode to initiate a grooming session and then user may place the cutting assembly near or on the skin for a grooming operation. In some embodiments, the electric grooming appliance includes a casing which allows the cutting assembly to smoothly slide over the surface of the users skin.

The electric grooming appliance may determine the number of grooming sessions remaining prior to the battery power being insufficient to complete a grooming session and provide an indicator to the user relating to the number of grooming sessions remaining. For example, a user interface may include LEDs and the number of LEDs that are illuminated in the LED array may relate to the number of grooming sessions remaining.

In addition, a user may select a grooming sensor mode and the electric grooming appliance may provide a warning signal indicating to the user applying excessive force during the grooming session. As a result, the user may adjust the position of the electric grooming appliance or adjust the amount of force the user is applying from the cutting assembly to the skin to avoid excessive grooming forces that may cause skin irritation and discomfort.

Further, the electric grooming appliance will provide a signal to the user indicating that the electric grooming appliance has accumulated hair and debris that substantially fill the hair pocket, and should be cleaned in order to improve the performance of the electric grooming appliance. The user may then readily detach the cutting assembly from the head, by applying a force to detach the magnetic coupling, and subsequently rinse and/or remove the debris and trapped hair from within the hair pocket. In addition or alternatively, the user may clean the cutting assembly by selecting a pulse clean mode. The pulse clean mode will provide a signal to the user indicating that the pulse clean mode has been selected and the pulse clean mode will pause the electric motor for a few seconds, providing the user time to place the cutting assembly and head under running water. The pulse clean mode will pulse each of the blade assemblies in order to further agitate the water which may facilitate the removal of hair and debris trapped in and around the blade assemblies. In some embodiments, the electric grooming appliance includes washout ports to allow the removed hair and debris to be rinsed out from within the hair pocket through the washout ports.

In some embodiments, the electric grooming appliance includes a trimmer assembly that is positionable between a stored position and an operative position. A user may select to use the trimmer assembly for a detailed grooming operation. The user may apply a force to the trimmer assembly to release a catch and allow the trimmer assembly to transition from the stored position into the operative position for a grooming operation. The user may selectively stow the trimmer assembly after the grooming session is completed.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric grooming appliance comprising:

a housing;

a hair cutting device supported by the housing and including at least one moveable blade configured to cut hair;

an electric motor contained in the housing, wherein the electric motor is configured to drive the at least one moveable blade when the electric motor receives an amperage draw from a power supply;

a sensor configured to detect the amperage draw of the electric motor from the power supply; and a controller contained in the housing and configured to receive information from the sensor, wherein the controller is configured to compare the amperage draw to a threshold amperage, wherein if the amperage draw is greater than the threshold amperage the controller is configured to adjust a power output of the power supply, and wherein the controller is configured to receive a plurality of samples of the amperage draw detected at a first sampling frequency by the sensor and determine at least one of an average amperage draw and a maximum amperage draw.

2. The electric grooming appliance in accordance with claim 1, wherein the power supply comprises a battery contained in the housing, the controller configured to determine a relationship between the amperage and a runtime of the battery.

3. The electric grooming appliance in accordance with claim 1, wherein the controller is configured to compare the amperage draw to a plurality of threshold amperages and adjust the power output of the power supply when the amperage draw exceeds each threshold amperage.

4. The electric grooming appliance in accordance with claim 1, wherein the controller is further configured to determine the threshold amperage based on an unloaded amperage draw of the electric motor.

5. The electric grooming appliance in accordance with claim 1 further comprising a user interface configured to receive at least one user input relating to a speed control mode of the electric grooming appliance, wherein the controller is configured to adjust the power output of the power supply based at least partly on the user input.

6. The electric grooming device of claim 1, further comprising:

a housing;

a hair cutting device supported by the housing, the hair cutting device including at least one moveable blade configured to facilitate cutting of hair;

an electric motor contained in the housing, and wherein the electric motor is configured to drive the at least one moveable blade;

a battery forming the power supply, wherein the battery is configured to deliver a power output to the electric motor;

a user interface comprising a display, and wherein the user interface is configured to receive at least one input from a user to switch the hair grooming appliance between an ON mode and an OFF mode, wherein the electric motor drives the at least one moveable blade in the ON mode; and wherein the controller includes a memory, wherein the controller is configured to identify a plurality of grooming sessions and store a start time and an end time in the memory for each of a respective grooming session, wherein the start time is a time when the user selects the ON mode and the end time is a time when the user selects the OFF mode, the controller is further configured to:

determine an elapsed time for each grooming session, wherein the elapsed time is an amount of time from the start time to the end of the respective grooming session;

store in the memory the elapsed times that are greater than a threshold time, the elapsed times that are less than the threshold time are not stored in the memory;

determine an average elapsed time, wherein the average elapsed time is the average of the elapsed times stored in the memory; and determine a number of the elapsed times prior to a parameter of the battery falling below a threshold level, wherein the number of elapsed times remaining includes the battery life divided by the average elapsed time.

7. The electric grooming appliance in accordance with claim 6, wherein the controller is configured to send a signal to the user interface to display an indication relating to a number of elapsed times remaining.

8. The electric grooming appliance in accordance with claim 6 wherein the sensor is configured to detect at least one parameter of the battery during each groom session and send a signal to the controller.

9. The electric grooming appliance in accordance with claim 6, wherein the controller is configured to determine if the number of elapsed times remaining is less than one when the user selects the ON mode and provide an indication to the user if the number of elapsed times remaining is less than one.

10. The electric grooming appliance in accordance with claim 9, wherein the controller is configured to switch the electric grooming appliance to the OFF mode if the number of elapsed times remaining is less than one.

11. The electric grooming appliance of claim 1, further comprising:

a user interface;

wherein the controller is communicatively coupled to the electric motor, the user interface, and the sensor; and wherein the controller comprises a memory, and wherein the controller is configured to interpret a signal from the sensor to determine a parameter related to a force exerted on the moveable blades from a surface of a skin of a user, and wherein the controller is configured to send a signal to the user interface when the parameter reaches a threshold.

12. The electric grooming appliance in accordance with claim 11, wherein the controller is configured to adjust at least one operating parameter of the electric grooming appliance based on the determined parameter.

13. The electric grooming appliance in accordance with claim 11, wherein the user interface provides an indication to the user when the parameter reaches the threshold, wherein the indication includes at least one of an auditory signal, a visual signal, and a tactile signal.

14. The electric grooming appliance in accordance with claim 11, wherein the controller is configured to transmit a signal to a vibratory unit to cause the vibratory unit to vibrate when the parameter reaches the threshold.

* * * * *